United States Patent

Rice et al.

[15] 3,643,225

[45] Feb. 15, 1972

[54] MEMORY CONTROL SYSTEM

[72] Inventors: Rex Rice, Menlo Park; William R. Smith, Mountain View, both of Calif.

[73] Assignee: Fairchild Camera and Instrument Corporation, Syosset, N.Y.

[22] Filed: Apr. 2, 1969

[21] Appl. No.: 812,773

[52] U.S. Cl. ....................340/172.5

[51] Int. Cl. ....................G06f 9/20, G06f 7/10

[58] Field of Search ....................235/157; 340/172.5

[56] References Cited

UNITED STATES PATENTS

| | | | |
|---|---|---|---|
| 3,412,382 | 11/1968 | Couleur et al. | 340/172.5 |
| 3,444,525 | 5/1969 | Barlow et al. | 34/172.5 |
| 3,487,370 | 12/1969 | Goshorn | 340/172.5 |

*Primary Examiner*—Paul J. Henon
*Assistant Examiner*—Ronald B. Chapuran
*Attorney*—Roger S. Borovoy and Alan H. MacPherson

[57] ABSTRACT

A memory control system for controlling the communication between a plurality of users and a memory is disclosed. The memory which is random-access memory, is organized in a unique way in that it is divided into pages, each page containing a plurality of groups, each group including a plurality of addressable locations. Each page also includes page control words and a separate group link word for each group. Fields of the page control words are used for page linking to form page lists and to indicate the availability of groups for assignment, while the fields of the group link words are used for the linking of groups to form strings of groups. The memory also includes a specific addressable location in which a system control word is stored. Various fields of the system control word are used in controlling the initial assignment of pages, the reclamation of pages no longer needed by users, and the dynamic reassignment of pages to users. The memory also includes a separate user control word for each user. Various fields of a user control word are used to point to a user's page list, to point to a page in which group space is available for assignment, and to point to reclaimed groups. The memory control system includes a plurality of generators for generating, at clock cycle time, the addresses of any one of the control words. The memory control system also includes logic circuitry for automatically executing any one of a plurality of coded operations, commanded by any of the users.

5 Claims, 61 Drawing Figures

INVENTORS
REX RICE
WILLIAM R. SMITH
BY
Roger & Berry
Abraham Wasserman
ATTORNEYS INVENTORS
REX RICE
WILLIAM R. SMITH
BY
Coyne & Boone
Abraham Wasserman
ATTORNEYS INVENTORS
REX RICE
WILLIAM R. SMITH
BY
[signatures]
ATTORNEYS

INVENTORS
REX RICE
WILLIAM R. SMITH
BY
ATTORNEYS

INVENTORS
REX RICE
WILLIAM R. SMITH
BY [signature]
[signature]
ATTORNEYS

INVENTORS
REX RICE
WILLIAM R. SMITH
BY
[signature]
[signature]
ATTORNEYS

INVENTORS
REX RICE
WILLIAM R. SMITH
BY
Roger L Barry
Abraham Wasserman
ATTORNEYS INVENTORS
REX RICE
WILLIAM R. SMITH
BY
[signature]
[signature]
ATTORNEYS INVENTORS
REX RICE
WILLIAM R. SMITH
BY [signature]
[signature]
ATTORNEYS

INVENTORS
REX RICE
WILLIAM R. SMITH
BY
ATTORNEYS

INVENTORS
REX RICE
WILLIAM R. SMITH
BY
ATTORNEYS

INVENTORS
REX RICE
WILLIAM R. SMITH
BY
Roger L. Brown
Abraham Wasserman
ATTORNEYS INVENTORS
REX RICE
WILLIAM R. SMITH
BY
[signature]
[signature]
ATTORNEYS INVENTORS
REX RICE
WILLIAM R. SMITH
BY
Coyer & Bonny
Abraham Wasserman
ATTORNEYS INVENTORS
REX RICE
WILLIAM R. SMITH
BY
[signature]
[signature]
ATTORNEYS INVENTORS
REX RICE
WILLIAM R. SMITH
BY
Roger I Barry
Abraham Wasserman
ATTORNEYS

INVENTORS
REX RICE
WILLIAM R. SMITH
BY
ATTORNEYS

INVENTORS
REX RICE
WILLIAM R. SMITH
BY
ATTORNEYS

INVENTORS
REX RICE
WILLIAM R. SMITH
BY
[signature]
[signature]
ATTORNEYS

INVENTORS
REX RICE
WILLIAM R. SMITH
BY
ATTORNEYS

INVENTORS
REX RICE
WILLIAM R. SMITH
BY
[signatures]
ATTORNEYS

INVENTORS
REX RICE
WILLIAM R. SMITH
BY
ATTORNEYS

INVENTORS
REX RICE
WILLIAM R. SMITH
BY
Roger L Barany
Abraham Wasserman
ATTORNEYS INVENTORS
REX RICE
WILLIAM R. SMITH
BY
Roger A. Bowery
Abraham Wasserman
ATTORNEYS INVENTORS
REX RICE
WILLIAM R. SMITH
BY
Roger L. Brown
Abraham Wasserman
ATTORNEYS

INVENTORS
REX RICE
WILLIAM R. SMITH
BY
ATTORNEYS

INVENTORS
REX RICE
WILLIAM R. SMITH
BY
[signature]
[signature]
ATTORNEYS

INVENTORS
REX RICE
WILLIAM R. SMITH
BY
Roger L Brown
Abraham Wasserman
ATTORNEYS

INVENTORS
REX RICE
WILLIAM R. SMITH
BY
ATTORNEYS

INVENTORS
REX RICE
WILLIAM R. SMITH
BY
Roger L. Barry
Abraham Wanerman
ATTORNEYS

INVENTORS
REX RICE
WILLIAM R. SMITH
BY
ATTORNEYS

PATENTED FEB 15 1972 3,643,225

SHEET 32 OF 35

INVENTORS
REX RICE
WILLIAM R. SMITH
BY
ATTORNEYS

INVENTORS
REX RICE
WILLIAM R. SMITH
BY
ATTORNEYS

INVENTORS
REX RICE
WILLIAM R. SMITH
BY
ATTORNEYS

INVENTORS
REX RICE
WILLIAM R. SMITH
BY
ATTORNEYS

MEMORY CONTROL SYSTEM

BACKGROUND OF THE INVENTION

1. Field of the Invention

This invention generally relates to computer circuitry and, more particularly, to a new computer memory system organization and to memory control circuitry for controlling the communication between the computer memory and any one of a plurality of users.

2. Description of the Prior Art

Computer memories, which serve as the main computer data storing units, in which data is written or stored and from which data is retrievable, have greatly increased in size, since the early days of computer design. Typically, the increase in size has been accompanied by increased memory complexity and by requirements for complex and, generally expensive, control circuitry, needed to control the storing and/or retrieval of data or information into and from the computer memory. This is particularly true in computers which are designed to serve a plurality of users, each one of which may be called upon to perform one or more separate programs, before any one of the programs is completed.

Herebefore, in a computer system designed to serve a plurality of users, the computer memory is generally divided into a plurality of large blocks or memory portions. Each block, which is assigned to a different user, contains a plurality of locations identifiable by unique addresses into which data, often referred to in the art as words, may be stored, and from which the words may be read out by addressing the particular locations in which the words to be retrieved are located. These blocks are typically assigned to the users before any program is executed. Since the exact memory space requirement for the performance of any program is not always known prior to program compilation or during program execution, typically, each user is initially provided with large enough a block to insure sufficient memory space for all anticipated future storage space needs.

All known present-day computers operate on a base address system. In such a system the various locations or addresses in the memory, assigned to a user, follow in sequence from a base address. As data is received from a user for storage, the data words are sequentially entered in the addresses or locations following the assigned base address. Such a memory-organization feature has been found to be disadvantageous since it does not permit efficient dynamic use of the memory. The need to divide the memory into blocks, assigned to different users, is very undesirable since it results in dividing the memory into submemories, with each user having access only to the submemory assigned thereto. Consequently, if during the execution of a program, a user happens to require more memory space than has been initially assigned thereto, it cannot complete its program since it cannot dynamically access any of the submemories currently assigned to the other users. Also, the early or initial assignment by a user of memory locations or addresses in sequence from a base address is disadvantageous, since it limits the flexibility with which a user may utilize the memory portion assigned thereto.

For example, if it is anticipated that during the execution of a program, when a given word of data is stored in a specific address, that additional data may in the future have to be stored in relation to the first word, it is necessary to assign another or a few succeeding addresses for possible future use before initially proceeding with the program execution. Also, in such a memory organization, if during the execution of a program a need arises to insert a word or data after a specific word, located at a specific address, it is necessary to first shift all the data stored in addresses, succeeding the specific address, and then change all references to these addresses, in order to make room for the word to be added. The need to so manipulate a computer memory, organized as hereinbefore described, has led to the development of relatively complex memory control and software systems.

In many memory control systems, special programs, which are stored either directly in the main memory, or in an auxiliary memory, such as a read-only memory, are employed to control the assignment of space to any of the users. Some programs are also included in such systems for reclaiming space previously used by a user for future use thereby. The need for such stored programs is most disadvantageous. Although memory control systems, incorporating such stored programs, have operated with various degrees of success, they have been found to be complex, expensive and more importantly, time-consuming. Further, they do not allow dynamic space management at execution time. Another requirement in prior art systems is the manner in which addresses of locations in the memory are generally produced. Typically, addresses are provided by the users relative to an initial address and the useful address is generated by combining it with a base address which is either located someplace in memory or is derived from an addressing program. To generate a desired address from the base address it is first necessary to retrieve the base address and operate on it before the desired address is generated. Such an address-generating technique is disadvantageous since it always involves specific space allocation assignments initially and does not allow for dynamic and variable space assignment and reclamation at execution time.

Thus, a need exists, particularly in memory systems directed for use by a plurality of users, for a new memory organization and for a new memory control system, capable of dynamically controlling the assignment of space at program execution time to any of the users in a most efficient way, as well as one which is capable of controlling the reclamation of memory space, previously assigned to one or more of the users, but, which is no longer needed thereby.

OBJECTS AND SUMMARY OF THE INVENTION

It is a primary object of the present invention to provide a new computer memory organization.

Another object of the present invention is to provide a novel memory organization to enable most efficient use of memory space.

Still another object of the present invention is to provide a memory control system which includes all the circuitry necessary to generate a full address or portions thereof.

Yet another object of the present invention is to provide, in a computer system directed for use by a plurality of users, a memory, organized so that space is dynamically assigned therein, during the performance of a program by any of the users, as a function of user need and space availability.

A further object of the present invention is to provide a novel memory control system and memory organization in a computer system for use by a plurality of users, in which the memory control system automatically controls, during the performance of a program by any of the users, the assignment of space thereto as a function of dynamically arising user space requirements.

Yet a further object of the present invention is to provide a computer system, directed for use by a plurality of users, with a capability of assigning any memory space available in the memory to any user during the performance of a program thereby, without resort to special programs.

Still a further object of the present invention is to provide, in a computer system, directed for use by a plurality of users, a memory control system including all logic circuitry necessary to control the assignment of space, to any of the users, during the performance of a program thereby, as well as to control the reclamation of memory space previously assigned to the users and no longer needed for subsequent use by any of them.

These and other objects of the present invention are achieved by providing a uniquely organized memory system which is controlled by a novel memory control system which automatically employs its logic circuitry rather than prestored programs to control the assignment of memory space as required, dynamically, during program execution by any of the users. The memory system includes a conventional random-access memory, whose memory space is organized or divided in a unique manner, so that the memory control system is able to provide access to any portion or the entire memory to any user, depending on the user's activity or space need and the portion of the memory already filled or used by the other users. Also, the memory control system, by means of its logic circuitry, is capable of automatically reclaiming space which is no longer needed by any of the users, making such space available for subsequent assignment to any of the users as a need for additional memory space arises. The direct implementation of such capabilities in logic circuitry, rather than in stored programs, provides extremely fast logical decisions necessary to control the assignment and/or reclamation of memory space dynamically, during program execution. These unique features obviate the requirement for a user to predetermine space requirements at all since the controls assign space dynamically as required at program execution. The novel memory control system includes a plurality of generators whose function is to generate a complete address or portions thereof without resort to a base address, as is the case in the prior art.

The novel features of the invention are set forth with particularity in the appended claims. The invention will best be understood from the following description when read in conjunction with the accompanying drawings.

DESCRIPTION OF THE PREFERRED EMBODIMENTS

The description of the present invention may best be achieved by first explaining, in general terms, the basic novel features or concepts underlying the invention, before describing them in sufficient detail to enable those familiar with the art to practice the novel teachings disclosed herein. Basically, the present invention is directed to a memory control system of MCS which incorporates logic circuitry, hereafter referred to as hardware. The function of the MCS is to control the communication between a uniquely organized memory matrix of an otherwise conventional random-access memory or RAM and a plurality of users. Hereafter, in order to simplify the terminology the term memory will often be used for the memory matrix, although, as is appreciated by those familiar with the computer art, the term "memory" generally implies the memory matrix and all the circuitry necessary to store data in the matrix and to retrieve data therefrom.

The overall memory format or organization which, though implementable in more than one specific embodiment, is unique in that it includes control words which are designed to store or contain information representing addresses in the memory matrix. These addresses may consist of more than one part. The addresses are dynamically manipulated by the hardware of the MCS, as computation by any of the users progresses. The manipulated addresses enable the MCS to control the assignment of space in the uniquely organized memory from available space, to any of the users as a need for space arises. The manipulated addresses enable the MCS to control the storing of data received from a user in the memory, to retrieve data therefrom, or control the performance of an operation which may involve more than one of these tasks. Examples of the memory organization and different methods of address manipulation will now be described in conjunction with FIGS. 1–4*i*.

Figure 1:
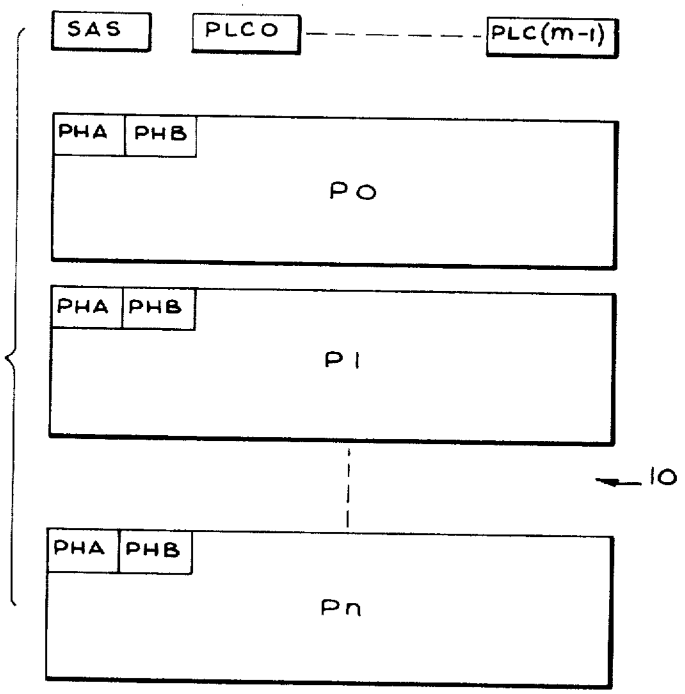
FIG. 1 is a format diagram of a memory matrix comprising a plurality of pages.

In FIG. 1, numeral 10 designates a memory, assumed to consist of pages designated P0, P1 through P*n*. Each page, which in essence is a block of the memory, comprises a plurality of addressable locations or words into which words of information or data may be stored. Hereafter the terms "locations" and "words" may be used interchangeably. For explanatory purposes it will be assumed hereafter that the memory contains $2^{16}$ pages and each page contains $2^8$=256 words. The memory includes a single-system control word designated SAS which is located at a fixed location or address and a separate control word designated PLC for each user. Thus, assuming *m* users, the memory includes *m* PLC words, designated PLC0–PLC ($m-1$). The location or address of each PLC word is related to the user number. As will be pointed out hereafter the SAS word and the PLC words may be stored in specifically designated pages. However, at this point in the explanation it suffices to appreciate the fact that someplace in memory, such words are available at addressable locations. Within each page are included two page header words PHA and PHB. Their function is to serve as page control words by storing information related to the availability of space in their page and to store addresses of other pages which may be in a particular relationship with their page as will be discussed hereafter in detail. The PHA and PHB words can be thought of as page-bookkeeping words.

Figure 1A:
FIG. 1*a* is a simplified multipart address format.

Reference is now made to FIG. 1*a* which is a simplified diagram of an address format which is employed in the system of the present invention in addressing any of the words in the memory 10. The address of any word in the memory consists of two basic parts. These are a page number (PN) as shown in the left rectangle or box and a relative address (RA) which represents the location or address within the page, whose number is in the PN part of the address. The PN address part which is the high-order binary set of bits is used to select the page which is addressed and the RA part, which is the lower order binary set of bits of the total address is used to select the word within that page. In accordance with the teachings of the present invention, both the page number (PN) and relative address (RA) parts are dynamically modified with the hardware of the MCS to control the addressing of any page or any word in the memory. The advantage realized by such an addressing technique will become apparent from the detailed description of the novel MCS of the present invention.

Figure 2:
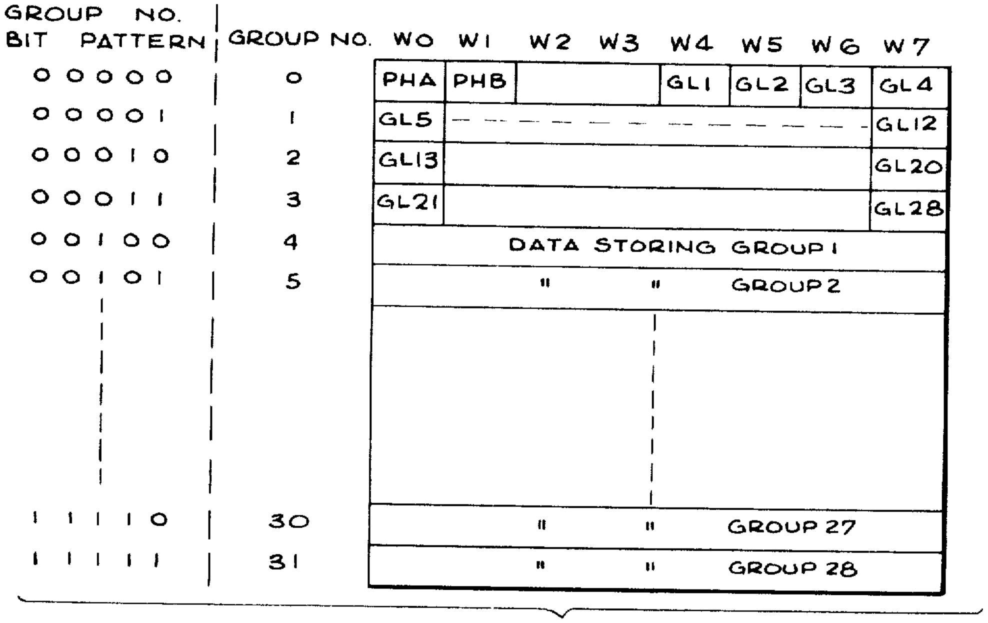
FIG. 2 is a page format in accordance with one embodiment of the invention.

Reference is now made to FIG. 2 in connection with which one example of the internal page organization will be explained. The words in each page are divided into a plurality of groups. In the example to be described, the 256 words per page are divided into 32 (10–31) groups. Each group consists of eight (W0–W7) words. Out of the 32 groups per page only 28 groups are used for data-storing purposes while the other four groups, comprising 32 words, are used to store the two page header words PHA and PHB of the page and a separate group-linking GL word for each of the 28 data-storing groups. Thus, the four groups store a total of 2+28=30 words, with two word addresses serving as spare addresses or locations. In such a page format groups 0–3 contain the various control words (PHA, PHB and the 28 GL words) and groups 4–31 serve as the data-storing groups 1–28.

Figure 2A:
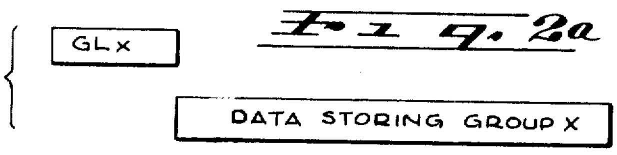
FIG. 2*a* is a format diagram of a data-storing group and its related group link word.

As shown in FIGS. 1 and 2, the PHA and PHB words of each page are stored in the page itself. As assumed in the description in connection with FIG. 2, they are actually stored as part of one of the four nondata-storing groups, such as the first page group. Also, each GL word, associated with a separate data-storing group is stored in the same page containing the data-storing group. FIG. 2*a* is a simplified schematic diagram of a data-storing group $x$ with its associated group link word GL$x$.

Figure 2B:
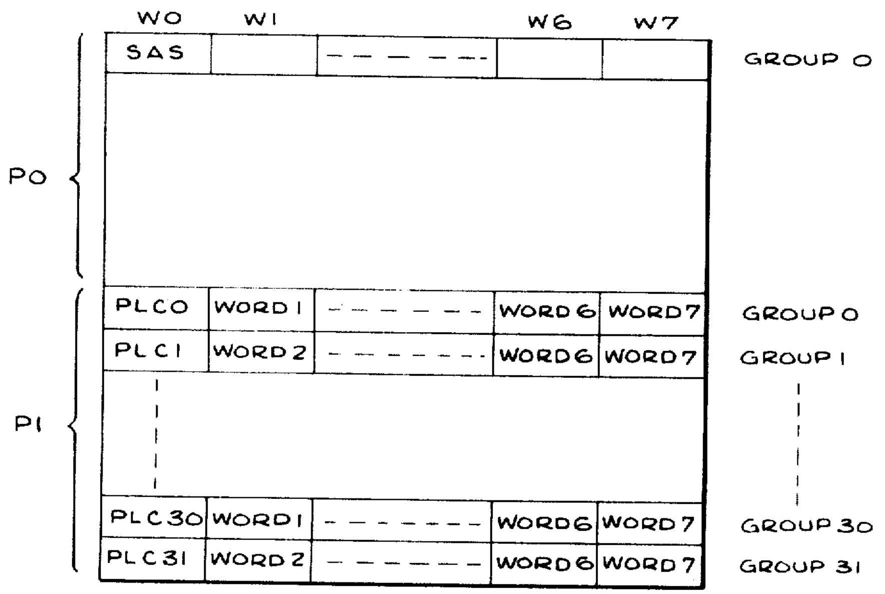
FIG. 2*b* is a format of two pages for storing an SAS word and users' PLC words.

Unlike the PHA and PHB words, the SAS word, and the various PLC words are shown in FIG. 1 outside any group or page format. If desired, the memory organization may include one or more specifically designatable pages in which these words may be stored. In a preferred embodiment, actually reduced to practice, the SAS word is stored at a fixed known address in the first page P0, as shown in FIG. 2*b*. In the same embodiment, designed to serve 32 (0–31) users, thus requiring 32 PLC words, these words are stored in the second page, P1. Since each page is assumed to contain 32 groups, each PLC word is stored in P1 in a separate group whose number in the page is related to the user number. That is, PLC0 for user 0 is stored in group 0 of the page, PLC1 for user 1 in group 1, etc. As shown in FIG. 2*b*, the SAS word is stored in page 0, group 0 and word 0. The rest of the page is used to store other words which do not pertain to the present invention and therefore, will not be described. Page 1 stores the 32 PLC words in the first word (W0) of the 32 groups. That is PLC0–PLC31, are stored in group 0–31, respectively.

In the foregoing described example of the memory organization, it is assumed that all the control words which include the system's SAS word, the user's PLC words and the page header words PHA and PHB and the group link words (GL), associated with the various data-storing groups are all in the same memory. It should be pointed out that this is but one example of a memory organization. If desired, and depending on memory availability, and cost consideration, the data-storing groups may be included in pages of one memory and the control words in one or more additional memories.

Figure 3:
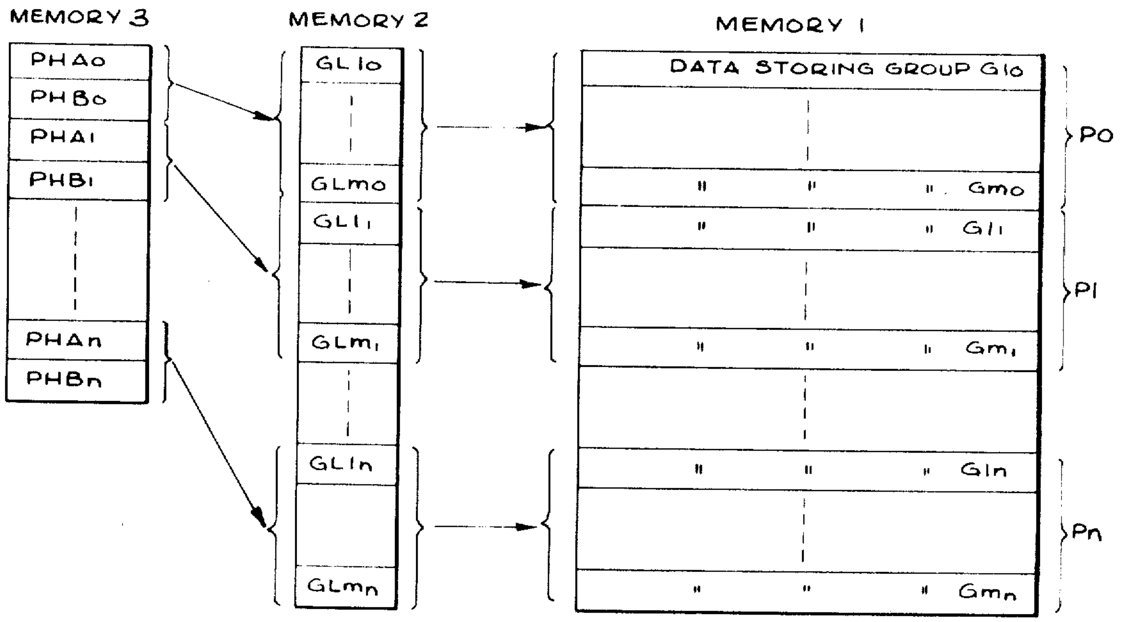
FIG. 3 is a simplified diagram useful in explaining the teachings of the present invention in connection with a multimemory embodiment.

For example, the memory organization may employ more than one memory as shown in FIG. 3. Therein, Memory 1 is assumed to contain only the data-storing groups of the various pages 0 through $n$, each page assumed to include $m$ groups. Relating $m$ to the format shown in FIG. 2, $m$ is equal to 28 since the page in FIG. 2 is assumed to contain 28 data-storing groups. The subscripts 0 through $n$ designate page numbers. Thus, groups $G1_0$ through $Gm_0$, are included in page 0, $G1_1$ through $Gm_1$ in page 1, etc. Memory 2 is assumed to contain all the group link words needed for Memory 1, while a Memory 3 is shown containing the PHA and PHB words of the various pages. The system's SAS word and the users' PLC words (not shown in FIG. 3) may be included in a fourth memory or in designated known addresses in either Memory 3 or Memory 2.

The key to such a multimemory format is that there is a fixed known address relationship between the page header words (PHA and PHB) of each page, and all the data-storing groups of the particular page. A like fixed address relationship exists between each group link word, such as $GL1_1$ in Memory 2 and the associated data-storing group, such as $G1_1$, in Memory 1.

From the multimemory organization of FIG. 3, it should be apparent that the control words need not be stored in the same memory in which data is to be stored, as long as they are stored in a unit from which they can be retrieved and restored after their content is used or after they are modified as the case may be. Ignoring memory construction cost, a multimemory organization would be a preferred embodiment since it would enable one to use high-speed memories at least for storing the control words which are addressed most often. This would further enable one to operate several of the memories simultaneously to achieve a great increase in system performance. However, since at the present state of the art, memory construction cost is very significant, the use of a multimemory organization has its cost limitation. It is for this reason that in one embodiment of the invention actually reduced to practice, a single memory is employed. However, the invention is clearly not limited thereto and is intended to include the multimemory organization. Thus, in defining the scope of the invention in the appended claims, the term memory should be deemed to include one as well as a plurality of distinct and separate memories.

The function of the SAS word, the PLC words, the PHA and PHB words and the various GL words is to store addresses of the page or group level as will be pointed out hereafter in greater detail. The availability of these control words in the memory and the capability to manipulate memory addressing, as herebefore briefly described in conjunction with FIG. 1*a*, provides the system with a large number of capabilities, including that of dynamically assigning memory space to any user during program execution using high-speed clock cycle logic as a function of user need and the availability of space in the memory. The system is further provided with the capability of reclaiming previously assigned space which is no longer needed by a user by using high-speed clocked logic. Alternately stated, the system is capable of dynamically relocating pages or groups at execution time rather than at compile time, which is typical in prior art computer systems which resort to instructions to determine how space should be assigned, or how assigned space is to be reclaimed.

Figure 4A:
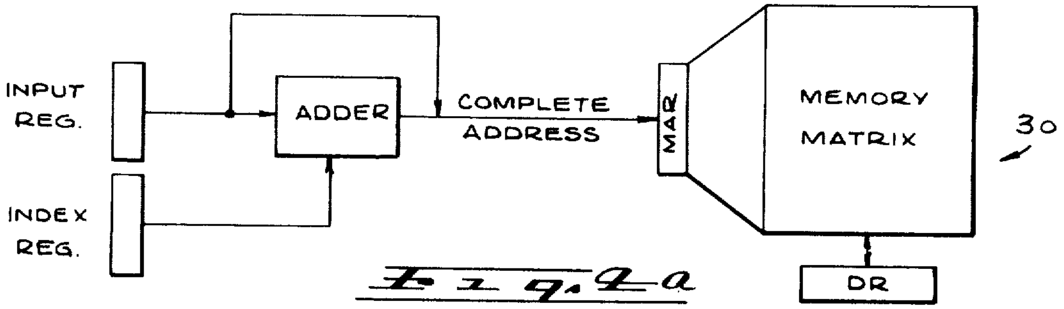
Fig. 4a PRIOR ART
FIG. 4*a* is a diagram useful in explaining a prior art addressing method.

The system's capabilities are realized by the incorporation of the control words herebefore described and by the address manipulation in any one of a plurality of addressing methods which will now be explained in conjunction with FIGS. 4a–4i. Therein numeral 30 represents a conventional RAM. FIG. 4a is a diagram useful in summarizing the characteristic addressing method employed in the prior art. As is appreciated in any RAM, the memory matrix is associated with a data register (DR) into which data is first entered to be stored in the matrix at an address, which is in the memory address register (MAR). Similarly, during data retrieval the DR is used to hold the data readout from the matrix from an address held in the MAR.

Typically, prior art computers receive a complete address which is entered from an address-supplying source into an input register. Such computers supply the complete address from the input register to the MAR either directly or after combining it, in an address combining circuit, such as an adder, with an address from an index register. In either case, however, a complete address is supplied to the MAR either directly from the input register or from the adder. In some, more complex prior art computers, some address modification is produced as part of an instruction stream from a central processor which modifies addresses for signal branching and other functions. However, such address modification must resort to instruction lists which have to be read out before any modification can be achieved.

Unlike such prior art addressing methods, in accordance with the teachings of this invention, the address supplied to the MAR comprises a plurality of parts which may be and often are, supplied from different sources to enable the system to manipulate the address in the MAR. As shown in FIG. 1a, in the present system the address comprises a higher order, first part, representing a page number (PN) and a lower order, second part representing a relative address (RA). In the example used herein, in which the number of pages is assumed to be $2^{16}$ and the number of words per page is 256, the PN address part comprises the first 16 bits and the RA part 8 bits of a 24-bit address. Assuming that the 256 words are divided into 32 ($2^5$) groups, the five higher order bits of the RA part represent the group address in the page whose number is in the PN address part, while the last three bits of the RA part represent the address of the word within an eight-word group.

Figure 4B:
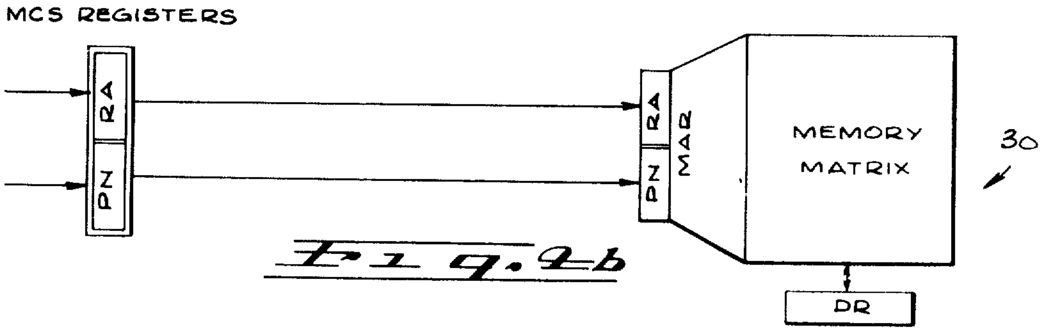
FIGS. 4*b*–4*i* are diagrams useful in explaining novel addressing methods in accordance with the present invention.

As shown in FIG. 4b in the present system the complete address to the MAR need not be supplied from a single source as is the case in the prior art. Rather, the PN and RA address parts may be supplied from two or more different sources. By manipulating or controlling the content of these sources, which in FIG. 4b are represented by blocks, designated MCS registers, the address in the MAR is easily controlled. Thus, in FIG. 4b, two arrows, each assumed to represent a plurality of lines (equal to the number of bits in the PN and RA address parts), point to the MAR to indicate that the address may be supplied from at least two sources. As will be pointed out hereafter, in some operations the address to the MAR may be supplied from a single register, in which case the addressing is similar to the direct addressing performed in the prior art.

Figure 4C:
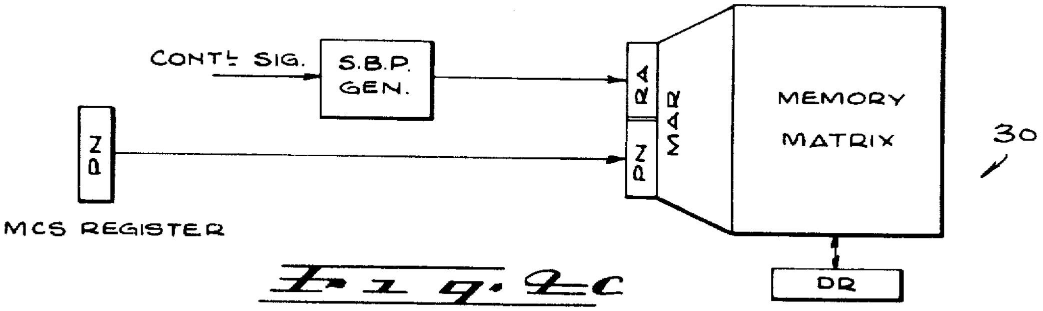

As shown in FIG. 4c, the content of the MAR may be controlled by providing the PN address part from a register of the MCS and by providing the RA part from a special bit pattern (SBP) generator controlled by a control signal. The function of the SBP generator is to provide a special bit pattern, such as a selected eight-bit pattern, to the RA to form the complete address of a selected word in a page, whose number is in the PN address part.

Figure 4D:
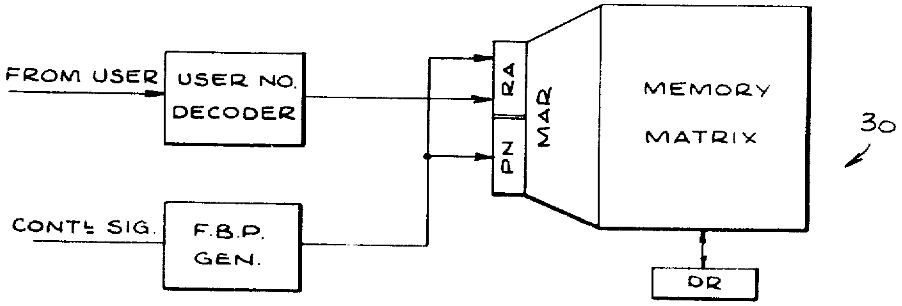

As diagrammed in FIG. 4d in another addressing method, the outputs of a decoder and a fixed bit pattern (FBP) generator, actuated by a control signal, are separately supplied to the MAR to form the desired address. As shown, the FBP generator's bit pattern is assumed to include the complete bit pattern for the PN address part as well as a part of the pattern for the RA part. The rest of the RA part is assumed to be supplied from a different source such as a decoder. Such an addressing method may be used to generate the address of a specific PLC word, all of which are assumed to be stored as shown in FIG. 2b. In such a case the output of the FBP generator's pattern would include the bit pattern to designate page 1, by providing the complete PN address part of P1, as well as a portion of the RA address part which defines the first word (W0) in a group. On the other hand, the group portion of the RA part would be provided by a user number decoder, which would decode a signal from a user and provide a multibit pattern, representing the user number which would be used to supply the MAR with the required group address. Assuming, for example, that PLC30 of user 30 is to be retrieved, the FBP generator would provide the address part of P1 and the address portion of W0 and the user number 30 would be used to address group 30 in p1 in which PLC30 is stored.

Figure 4E:
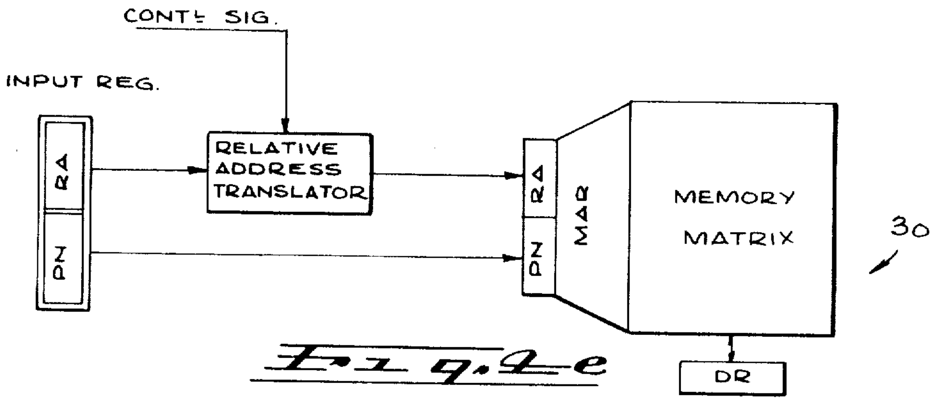

FIG. 4e is a diagram of another addressing method which is similar to the method described with FIG. 4b. However, in the method described in conjunction with FIG. 4b, the RA part is supplied directly from a source such as an MCS register, while in the method described in connection with FIG. 4e, the RA part of the address from any register is first translated by a Relative Address Translator before being supplied to the MAR. That is, the RA part which is supplied to the translator is modified, as will be explained hereafter, to supply to the MAR a RA part which is related to the address part supplied to it. In yet another addressing method, diagrammed in FIG. 4f, a complete address is supplied to the MAR from a fixed bit pattern (FBP) generator whenever an appropriate control signal is supplied thereto.

Figure 4F:
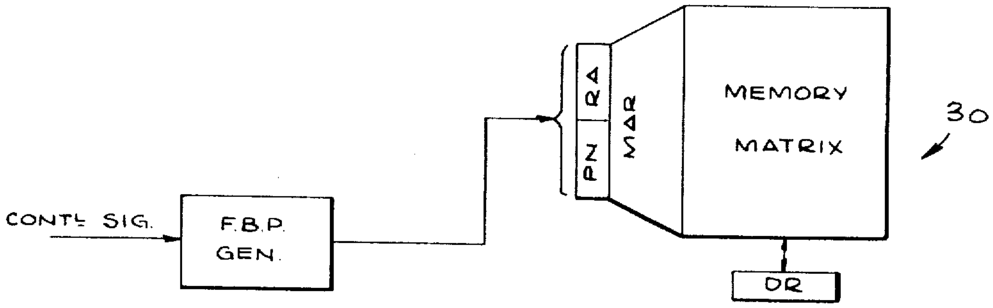

The MCS of the present invention incorporates the hardware such as special bit pattern (SBP) generators (FIG. 4c), fixed bit pattern (FBP) generators (FIGS. 4d and 4f), a Relative Address Translator (FIG. 4e), a plurality of registers and a source of control signals to enable the controls to manipulate the content of the MAR by any one of the methods, herebefore described in conjunction with FIGS. 4b–4f. For example, in the MCS of the present invention, a FBP generator is included which when activated by a control signal provides a fixed bit pattern, representing the address of the SAS word. Thus, the addressing method shown in FIG. 4f is employed to address the SAS word in memory. This is possible since the single SAS word is located at a single specified address such as that of page 0, group 0, word 0 (See FIG. 2b).

As previously pointed out, the addressing method, shown in FIG. 4d, is employed to address a PLC word of a specific user. The addressing method, explained in conjunction with FIG. 4c, is used in addressing either the PHA or PHB word of a designated page. The number of the designated page (PN) is supplied to the MAR from any one of a plurality of registers of the MCS, while the RA part is supplied from either of two special bit pattern (SBP) generators. Assuming that the PHA and PHB words are stored as the first and second words of the first group of a page, one generator which is used in the retrieval of a PHA word provides a bit pattern which represents the address portion of the first word of the first group. Another generator which provides the address portion of the second word of the first group is used to supply the RA part of the address, needed to retrieve a PHB word of a page whose page number is in the PN part of the MAR.

The addressing method, explained in connection with FIG. 4e, is employed whenever the address of a specific group in a specific page is available and it is desired to retrieve the group link (GL) word, associated with the particular group. In such a case the page number is directly supplied to the PN part of the MAR. However, the address of the specific group is supplied to the translator which converts the address of the group to the address of the group link word associated with the particular group. Assuming that each page of the memory is organized as shown in FIG. 2 in which data-storing groups 1–28 are stored as groups 4–31 of the page and the GL words, GL1–GL8 are stored as words W4–W7 of group 0 and in the 24 word locations of groups 1–3 of the page, the Relative Address Translator (FIG. 4e) is operated so that whenever it receives a page group address such as group 4 in which the data-storing group 1 is located, the page group address is converted or translated to that of word W4 of group 0 to enable the retrieval of group link word, GL1 which is associated with the dataestoring group 1 in the page.

Figure 4G:
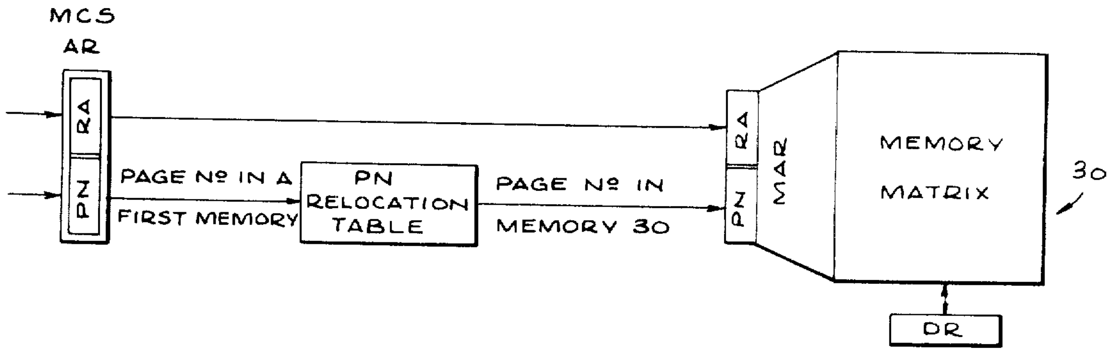
Figure 4H:
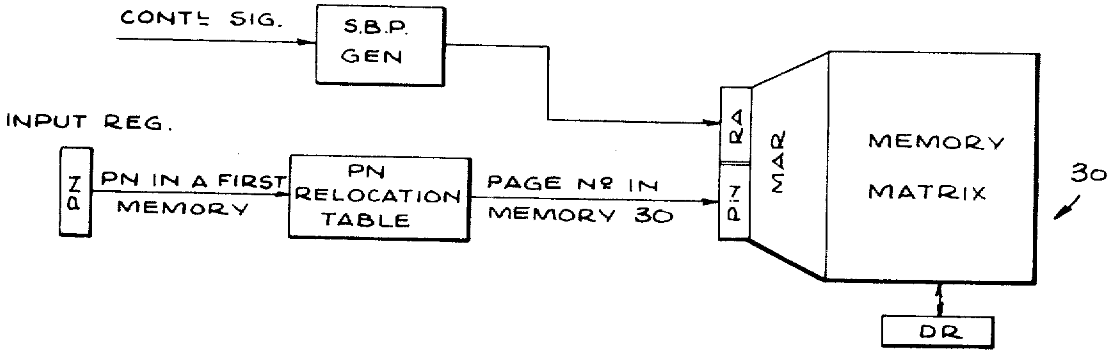
Figure 4I:
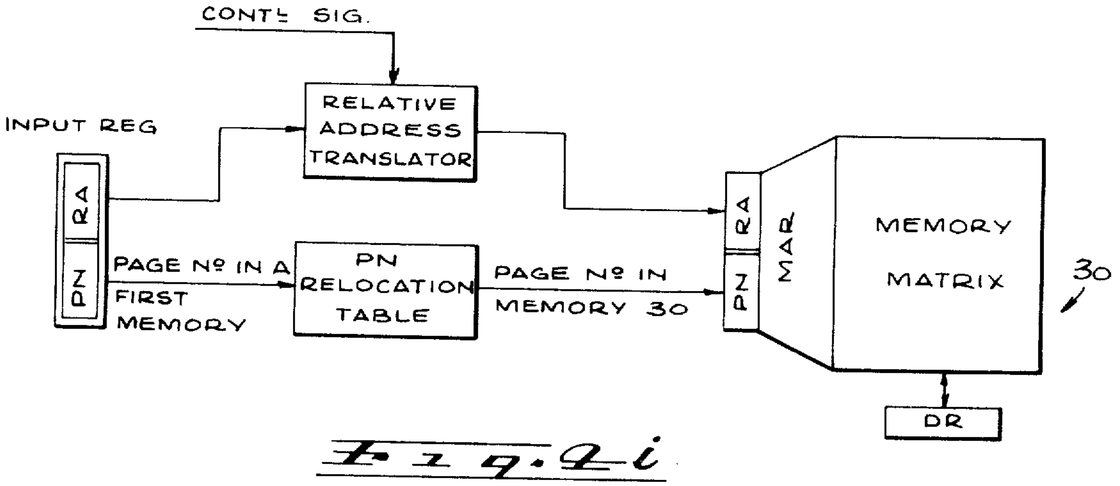

Reference is now briefly made to FIGS. 4g–4i which are simplified diagrams, useful in explaining three additional novel addressing methods, which are similar to those previously explained in conjunction with FIGS. 4b, 4c and 4e, respectively. In each of the arrangements of FIGS. 4b, 4c and 4e, the page number (PN) is supplied to the MAR directly from an appropriate register, containing the desired number of a page in terms of the actual page address in memory matrix 30. However, in each of FIGS. 4g, 4h and 4i, the page number to the MAR is shown supplied from a PN Relocation Table.

The function of the latter is to convert a page number which is supplied thereto into a related page address as related to the memory 30. Such a page number conversion is necessary, for example, in a system in which all the storable data, including the control words are stored in a first, relatively slow memory which, during user program execution, transfers selected pages, assigned to a user, for temporary storage to the memory 30 which is assumed to be faster. Thus, if the page number which is supplied from a user represents the address of the page in the first memory, before such a number can be used to locate the proper page in the memory matrix of memory 30 it is necessary to convert the page number in terms of the addresses in the first memory to the page addresses where that page is currently stored in the memory 30. In the following description, however, it will be assumed that a received page number represents a page address in the memory 30 so that the relocation of page numbers is not required.

From the foregoing it should thus be appreciated that in the present invention, the manipulation of an address supplied to the MAR is accomplished by means of hardware of the MCS. Such manipulation is performed dynamically, during program execution at clock cycle speed, rather than at compile time speed, involving the resort to instruction lists of special purpose programs. The ability to so modify or manipulate addresses enables the system to use the control words in the dynamic assignment of memory space, as a function of user need and space availability, as well as in the deletion of space, no longer needed, or in the reclamation of space at high speed.

Figure 5:
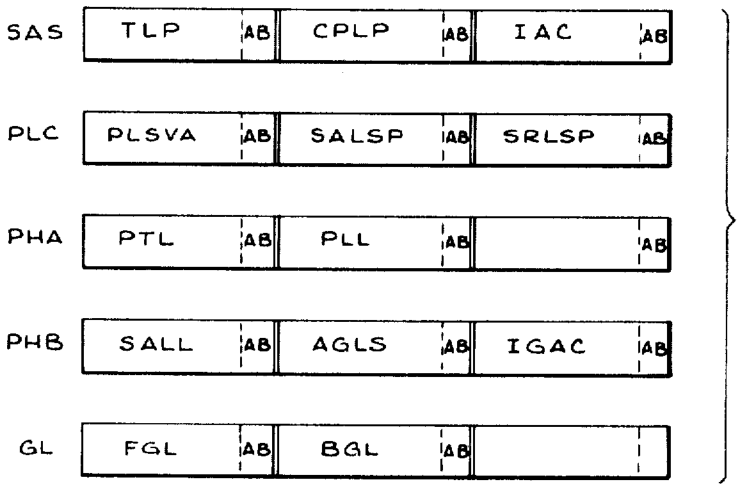
FIG. 5 is a diagram of formats of several significant control words which are basic to the teachings of the invention.

Before preceding to describe various system capabilities, attention is directed to FIG. 5 which is a simplified diagram of one example of the formats of the various control words herebefore referred to. Therein each word is shown comprising more than one word portion or field, designated by different memories whose meaning will become apparent from the following description. The fields are designed to contain page numbers or group addresses, which are used during program execution as part of the system's performance. Although the fields are shown of equal length, in practice they are not, since some store only page numbers which are assumed to be only 16 bits in length, while other fields are designed to store group addresses which in the present example are 21 (16+5) bits in length. However, regardless of the field length, each field further includes a lowest order bit which serves as a activity-indicating bit, designated AB. For explanatory purposes, the AB is assumed to store a binary "1" when the field contains a meaningful address portion, hereafter also referred to as being valid, while a binary "0" in the activity bit indicates an invalid field content.

Figure 6:
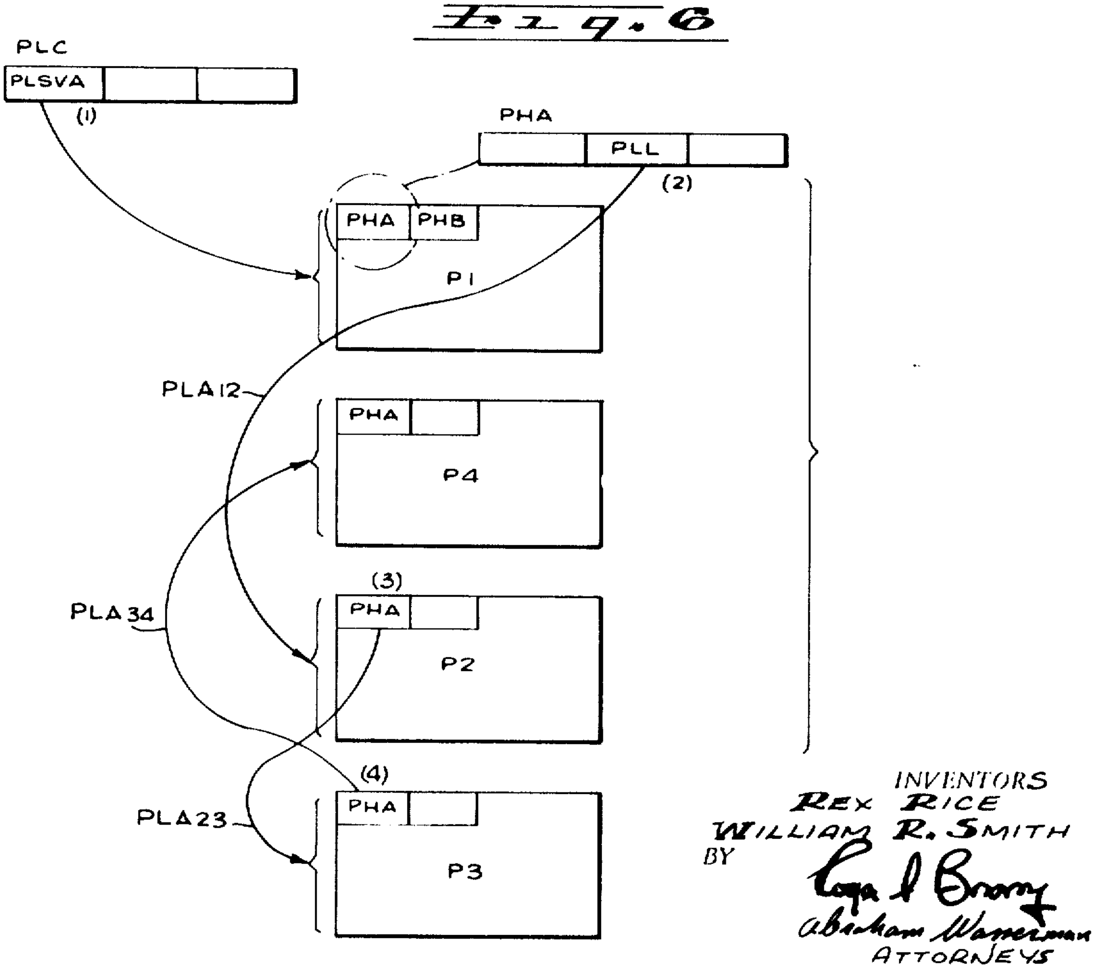
FIGS. 6 and 7 are multipage format diagrams useful in explaining the addition of a page to a Page List.

Reference is now made to FIG. 6 which is a simple diagram of a page list which the system of the present invention is capable of forming during program execution. Herein, it is assumed that all the pages, assigned to a user, are linked together to form a page list. The list is formed by using the PHA words of the pages, assigned to a user, to link the pages together. The list is linked to the user's PLC word by storing the address or number of one of the pages in the list in the Page List Start Virtual Address (PLSVA) field of the PLC word. In the particular example diagrammed, for each page in the list, except the last page, the Page List Link (PLL) field of its PHA word is used to store the page number of a different page in the list.

In FIG. 6, the list is assumed to comprise pages P1, P2, P3 and P4, P1 and P4 being the first and last pages, respectively. In the particular example P2 is linked to the top page P1 by storing the page number of P2 in PLL of the PHA word of P1. This is represented by the number 2 shown below the field PLL of the expanded format of the PHA word of P1. Likewise, P3 is linked to P2 and P4 to P3 by the page numbers 3 and 4 of P3 and P4 in the PLL fields of the PHA words of P2 and P3, respectively. The linkings between pages to form the list are represented by arrows $PLA_{12}$, $PLA_{23}$ and $PLA_{34}$, in which the two subscripts indicate the two pages which are linked together. In the particular example, the address or number 1 of the top page P1 is stored in the PLSVA field of the user's PLC word. Thus, the user is provided with a pointer to the page list by being provided with the number of one of the pages assigned thereto and which forms part of the list. In the particular example, it is the number of the top page in the list that serves as the pointer. The number stored in each field is indicated in parenthesis adjacent the field.

The system of the present invention is capable of adding a page to an existing page list of a user. The page may be added to the top or bottom of the list or between pages. In the embodiment diagrammed in FIG. 7 it is assumed that a page Px is to be added to the top of the list, shown in FIG. 6. The page addition is easily accomplished by removing the number 1 to P1 which is in the PLSVA field, thereby breaking the direct linkage of the PLC word with page P1 as represented by broken arrow 32, and by inserting it (the number 1 of P1) in the PLL field of the PHA word of the page Px to be added, as indicated by arrow 34. The page addition is completed by inserting the number of Px in the PLSVA field, as represented by arrow 36.

The system of the present invention, in addition to possessing the capability of forming a page list of all the pages assigned to a user is also capable of forming a space available list, by linking pages together on the basis of the availability of data-storing groups therein for assignment to the user, to which the pages are assigned and which form a page list. Such a capability is particularly significant in the present invention in which it is assumed that all the data-storing groups of the various pages assigned to a user have to be filled, i.e., unavailable for assignment, before a new page may be assigned to the user from the system if one is available for assignment. As herein defined a page is assumed to have space available for assignment if at least one of its data-storing groups is available for storing data.

Figure 8:
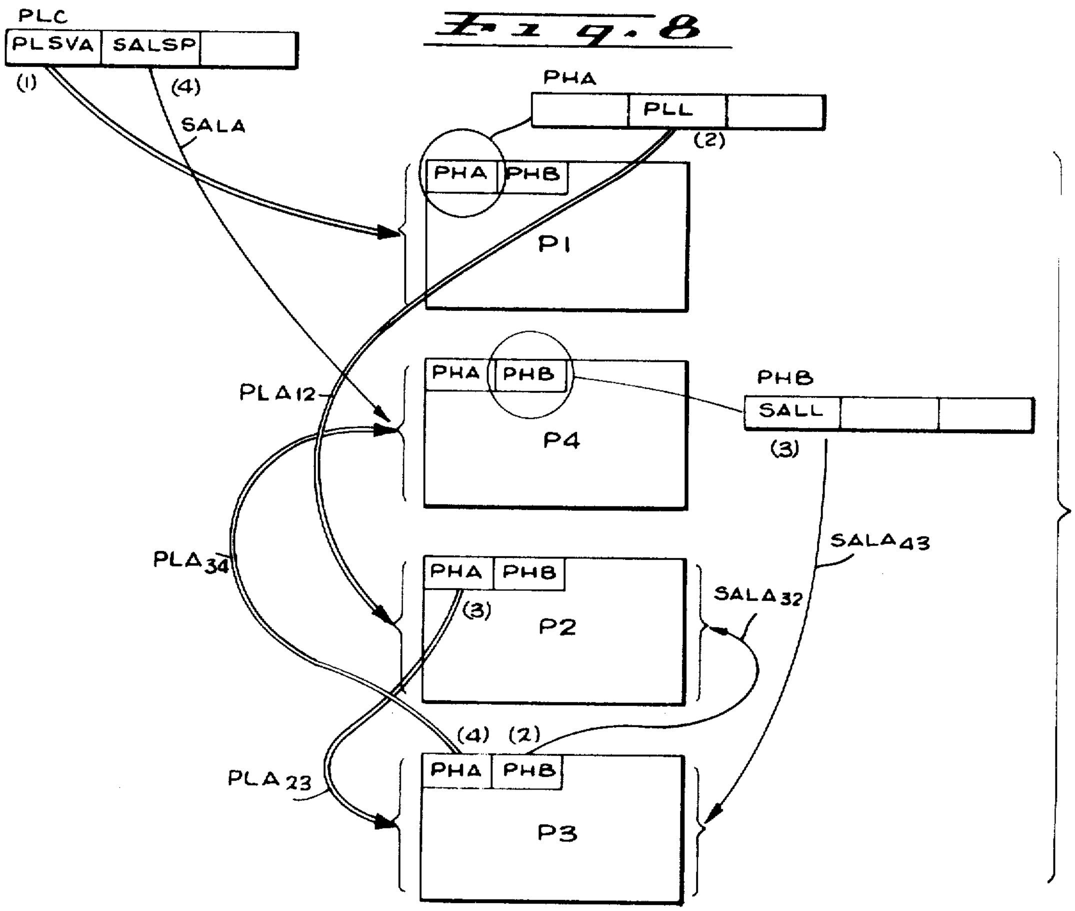
FIG. 8 is a multipage format diagram useful in explaining a Page List and a Page Available List of a user.

Referring to FIG. 8, for the purposes of forming a space available list, a Space Available List Start Pointer (SALSP) field of the user's PLC word is used to store the number of a page, such as P4, in which group space is available for assignment. In P4 the Space Available List Link (SALL) field of the PHB word may be used to store the number of another page, such as P3 in which space is available. In FIG. 8 the double-line arrows, designated PLA with appropriate subscripts, represent the page linkages for page list formation, while the single-line arrows, designated SALA (for Space Available List Arrows), represent the linkages necessary to form the Space Available List.

The space available list is subject to dynamic change during program execution. A page may be removed from the space available list if all its data-storing groups are filled. On the other hand, it may be added to the list, if during an automatically performed group reclamation operation, to be described hereafter, one or more groups thereof are made available for subsequent reassignment.

Figure 7:
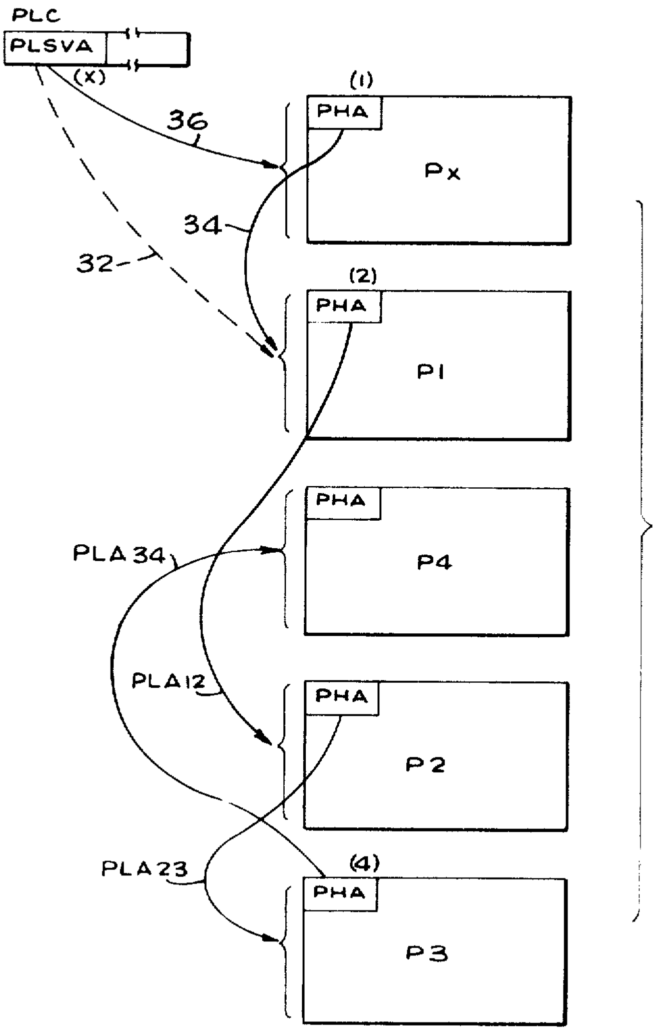
Figure 9A:
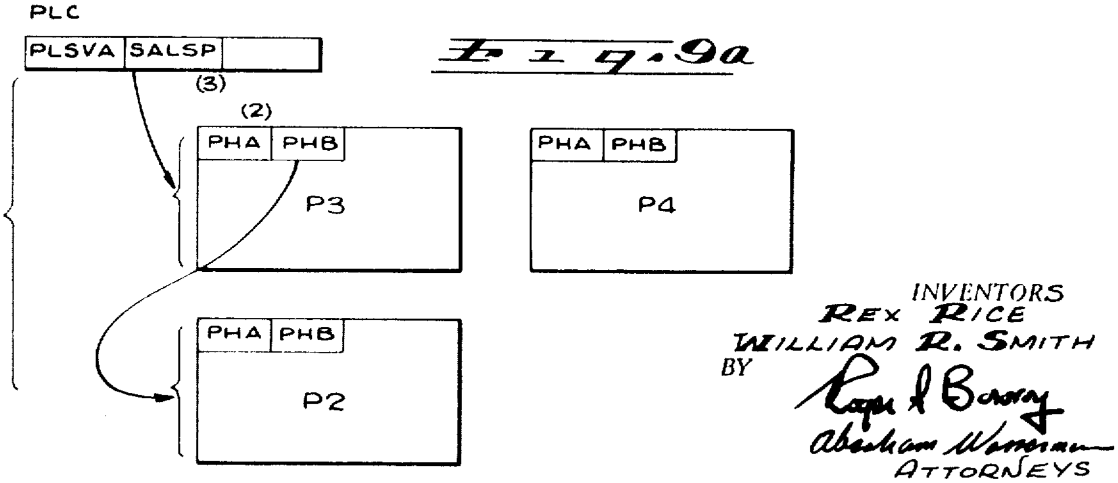
FIGS. 9*a* and 9*b* are multipage format diagrams useful in explaining the addition of a page to a Page Available List.
Figure 9B:
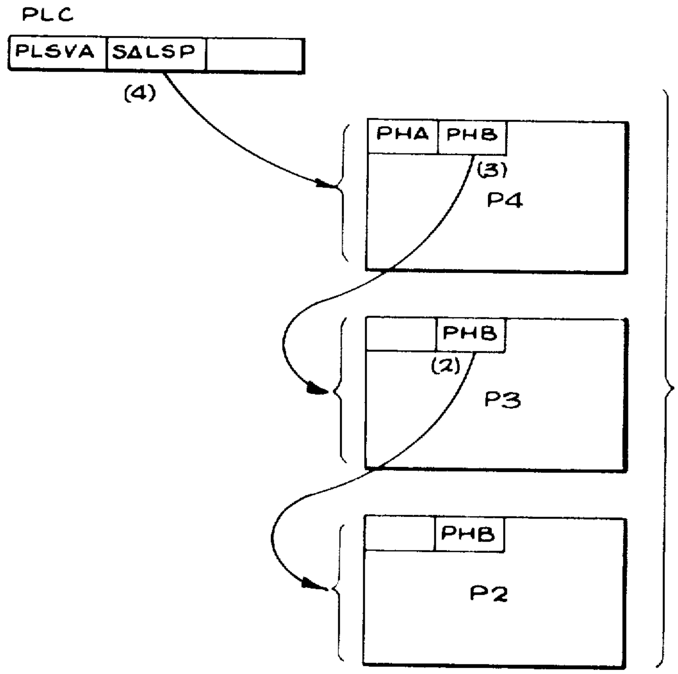

In the system described herein the addition of a page to the space available list is accomplished in a manner analogous to adding a page to the page list, previously described in conjunction with FIG. 7. Let it be assumed, that a space available list consists of pages P3 and P2 as shown in FIG. 9a and that the page to be added is P4. As shown in FIG. 9b, the number 4 of P4 is entered into the SALSP field and the page number 3, previously stored therein (See FIG. 9a) is entered into the SALL field of the PHB word of the added page P4. Thus, P4 is added to the top of the space available list.

Removal of a page is accomplished in an analogous, but opposite manner. In the system to be described it is always the top page in the space available list that is removed. For example, to remove P4 from the list diagrammed in FIG. 9b, all that is necessary is to delete the number 4 of P4 from the SALSP field, thereby breaking the pointing to P4. Thereafter, the number 3 of P3 in the SALL field of the PHB word of P4 is transferred to the SALSP so that the pointer of the space available list points to P3. Thus, page P4 is deleted from the list. It should, however, be pointed out that even though P4 is deleted from the space available list, in the particular embodiment which will be described, P4 is not deleted from the page list. It remains part of the page list until the page list, as a list, is deleted or altered in a manner to be explained hereafter in detail. It should further be pointed out that the order of the pages in the space available list is not related to their order in the page list. The only point to be stressed is that each page in the space available list is also a part of the page list.

As long as one page in the page list contains space available for assignment, a valid page number exists in the PLC's SALSP field. Only when all the pages assigned to a user are full is the content of SALSP invalid as indicated by a binary "0" in its activity bit. Only when all pages assigned to a user are full is advantage taken of the system's capability to assign a new page to a user if one is available. Whether a page is available is determined by utilizing the content of the SAS word.

As seen from FIG. 5, the SAS word has three fields, one of which is designated IAC for Initial Assignment Counter. Each field has a bit length sufficient to store a page number (plus one bit for the activity bit). The function of the IAC is to monitor or control the initial assignment of pages in the memory. When the system is first turned ON, the IAC activity bit is set to a binary "1" and the IAC stores a number which represents the number of the first page in the memory which is assignable to a user. When a need to assign a page to a user arises, in one particular embodiment in which page assignment is first performed from pages available for initial assignment rather than from reclaimed pages, the IAC activity bit is checked. Finding the IAC content to be valid (AB=1), the page whose number is in the IAC is assigned and the content of the IAC is incremented by one to point to the next page which may be initially assigned.

Figures 10A, 10B:
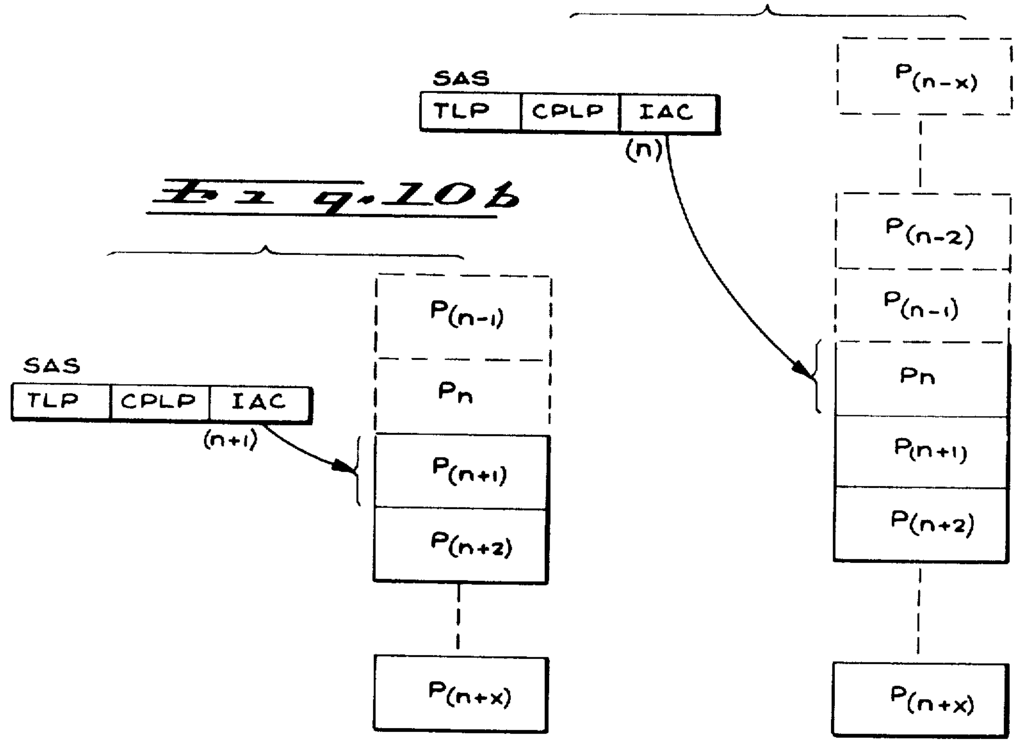
FIGS. 10*a* and 10*b* are multipage format diagrams useful in explaining initial page assignment.

Let us assume, for example, the number of the pages in memory which are initially available for assignment vary from $P(n-x)$ to $P(N+x)$ as shown in FIG. 10a and that at the point in the operation diagrammed in FIG. 10a, the IAC stores the number $n$ of page P$n$. If a page has to be assigned at this point, the number $n$ in the IAC is utilized to assign page P$n$ and the IAC is incremented by one to store $n+1$ and thereby point to page P$n$+1, as shown in FIG. 10b to which reference is made herein. Thus, FIGS. 10a and 10b represent the state of the IAC before and after page P$n$ is assigned.

The IAC is incremented each time a page is assigned until page $P(n+x)$, the last page, is assigned, when the number in the IAC is $n+x$. Once $P(n+x)$ is assigned the IAC is reset and its activity bit is set to a binary "0" to indicate that the IAC content is invalid. Thus, the IAC is invalid after all the pages have been initially assigned. If the IAC is found to be invalid, the validity of the field CPLP (Current Page List Pointer) is checked. The use of CPLP and TLP is described below. If CPLP is found to be invalid, the validity of the Tree List Pointer (TLP) field is checked. If both fields are found to be invalid, it indicates that there is not a single page, which has been previously assigned to a user and subsequently deleted thereby, available for assignment. Thus, when all three fields of the SAS word are invalid, it indicates that there is not a single page available for assignment. As will be pointed out hereafter, when such a condition is sensed a Memory Full signal is produced.

The TLP and CPLP fields of the SAS word provide the system with the capability of receiving one or more lists of pages deleted by one or more users, for subsequent page-by-page reassignment to any of the users. Page deletion and the use of the TLP field to provide the system with the capability of receiving deleted page lists will now be described in connection with FIGS. 11a, 11b and 11c.

Figure 11A:
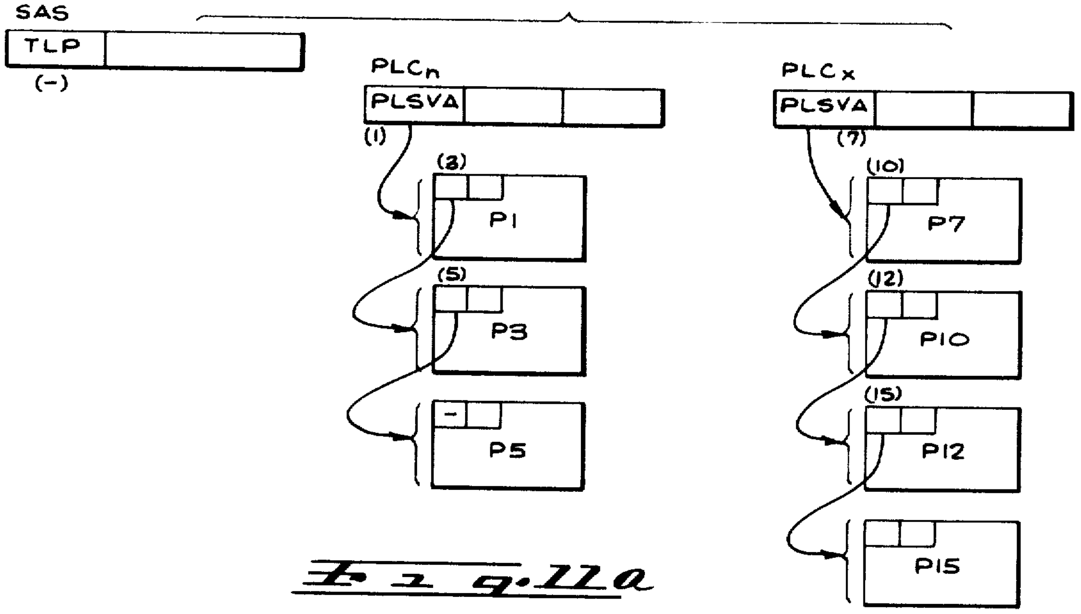
FIGS. 11*a*, 11*b* and 11*c* are multipage format diagrams useful in explaining the deletion of Page Lists.
Figure 11B:
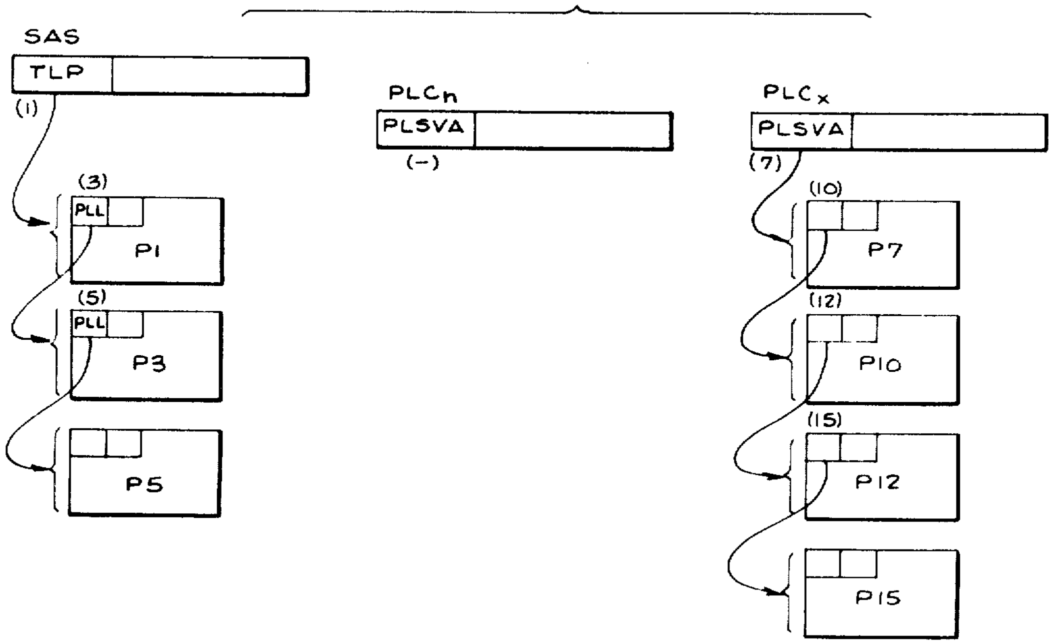

As shown in FIG. 11a, it is assumed that a page list consisting of pages P1, P3 and P5 exists for user $n$ with the number of the top page P1 in the list stored in the PLSVA field of the user's $n$ PLC word designated PLC$n$. A like page list, consisting of pages P7, P10, P12 and P15 exists for a user $x$ whose PLC word, designated PLC$x$, stores the number 7 of P7 in its PLSVA field. At this point the TLP field of the SAS word is assumed to be invalid as indicated by (−), under the TLP field of the SAS word. Let it further be assumed that user $n$ no longer needs the pages in the list and that a command is issued for the entire page list to be deleted. The system is capable of executing the command by merely transferring the number 1 in the PLSVA field of PLC$n$ to the TLP field of the system's SAS word, as shown in FIG. 11b, and by clearing the content of the PLSVA field of PLC$n$, indicated by (−). Thus, at this point in the operation the page list previously associated with user $n$ is no longer associated therewith. Instead, the page list, as a list, is associated with the system by storing the number 1 of the list's top page P1 in the TLP field of the SAS word.

Figure 11C:
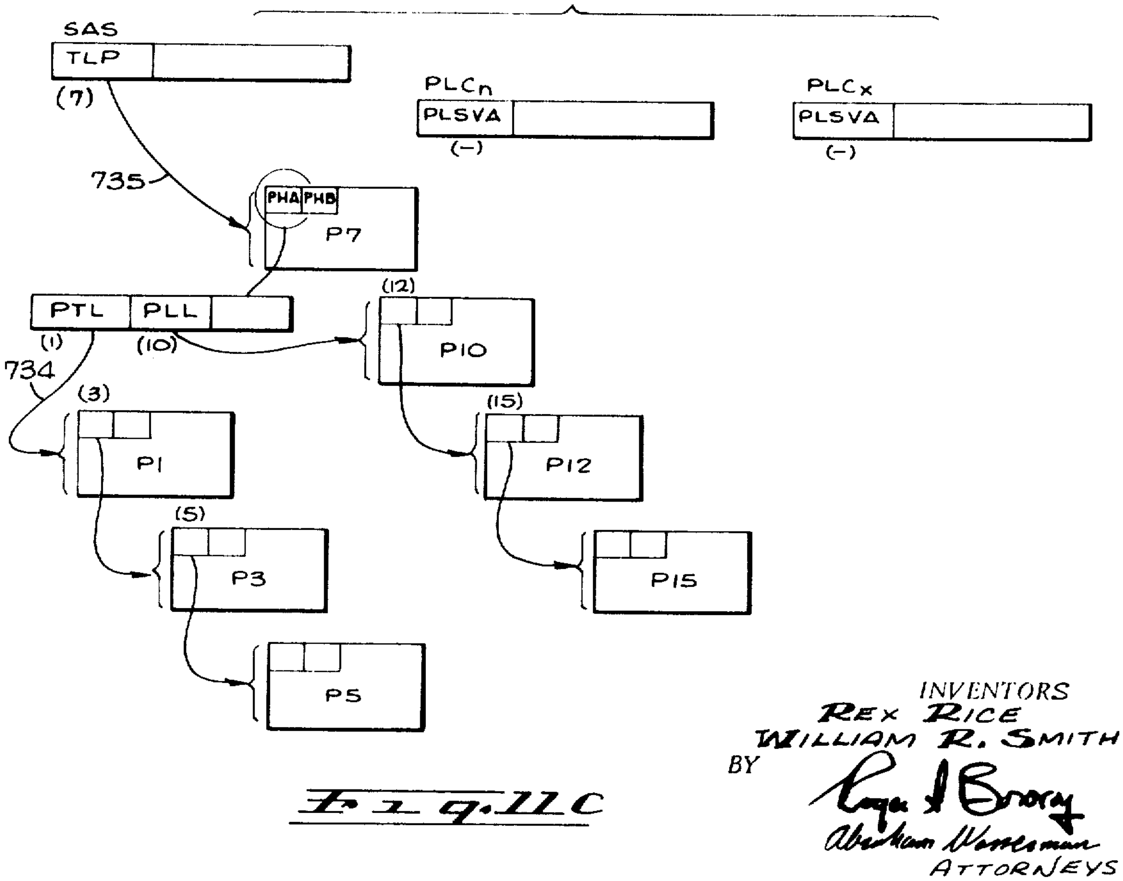

If, thereafter, user $x$ orders the deletion of its page list, consisting of P7, P10, P12 and P15, the number 7 of P7 is stored in the TLP field of the SAS word, and the content of PLSVA of PLC$x$ is cleared. However, in order to maintain proper linkage between the page list of P1, P3 and P5 with the system's TLP field, the Pointer Tree Link (PTL) field of the PHA word of the page whose number (7) is stored in the TLP field, i.e., page P7, is used to store the number, previously stored in the TLP field. In the present example this number is 1. This is shown in FIG. 11c, wherein the page list P1, P3 and P5 may be thought of as one branch of a tree while the list of pages P7, P10, P12 and P15 is a second branch. Thus, a branch or page list may be added to the system by merely inserting the number of a page, such as the top page in the list, in the TLP field of the SAS. The PTL field of the PHA word of the page whose number is entered in the TLP field is used to store any page number, previously stored in the TLP field.

All the branch(es) of deleted page list(s) remain linked to the TLP field until a need arises to assign a page and both the IAC and the CPLP are sequentially interrogated and found to be invalid. In such a case, the last branch or page list which was linked to the TLP is disengaged therefrom, and transferred to the CPLP. Then, the top page of the list which was transferred to the CPLP is assigned and a subsequent page in the remaining portion of the list is linked to the CPLP, by storing the page number of such a subsequent page therein.

Figure 12A:
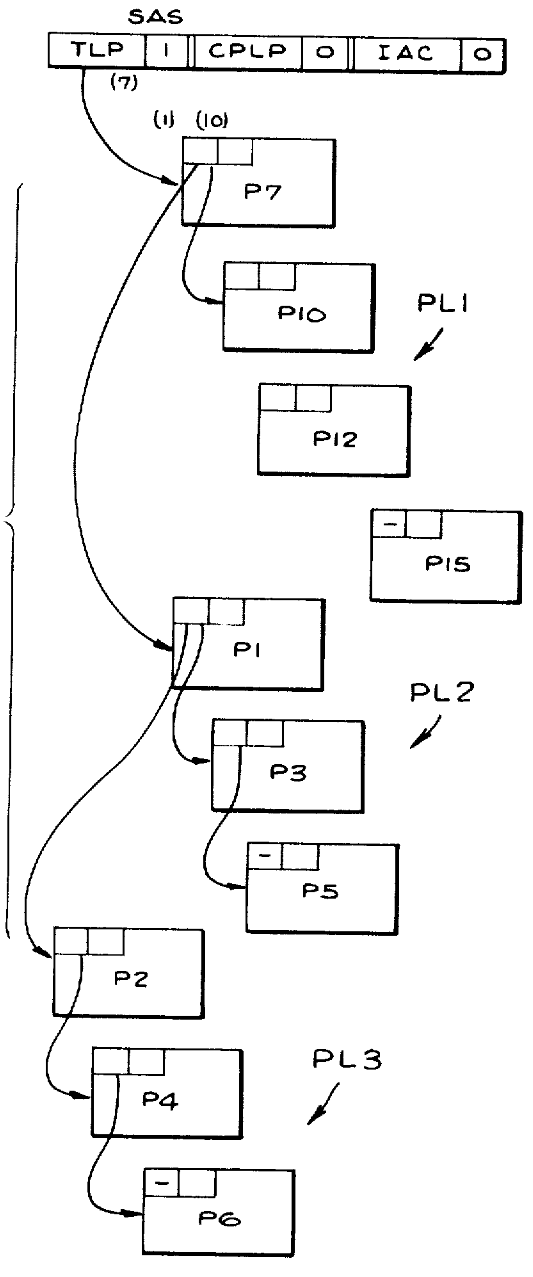
FIGS. 12*a*, 12*b* and 12*c* are multipage format diagrams useful in explaining the reassignment of pages which are included in previously deleted Page Lists.
Figure 12B:
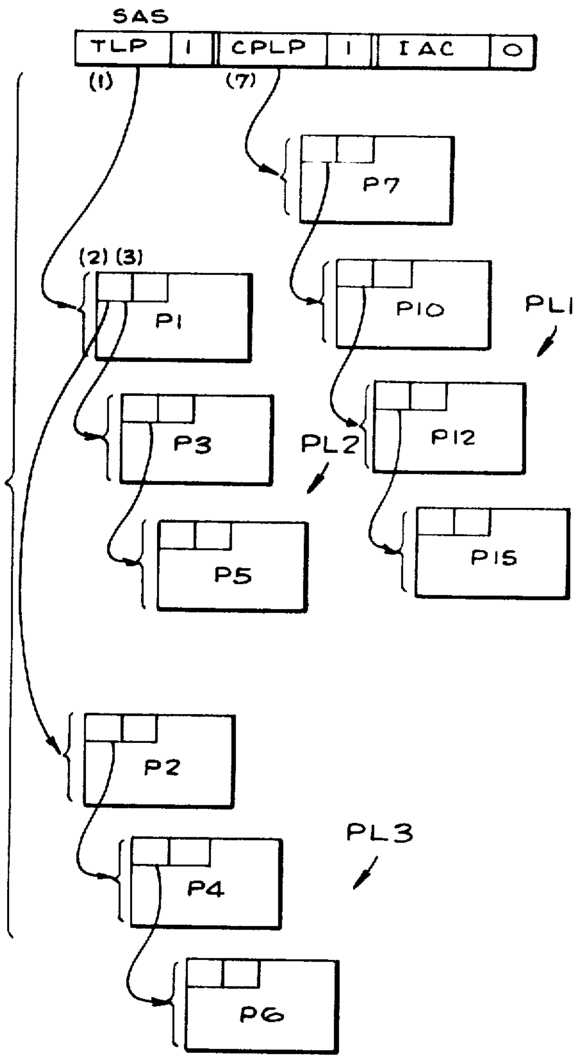
Figure 12C:
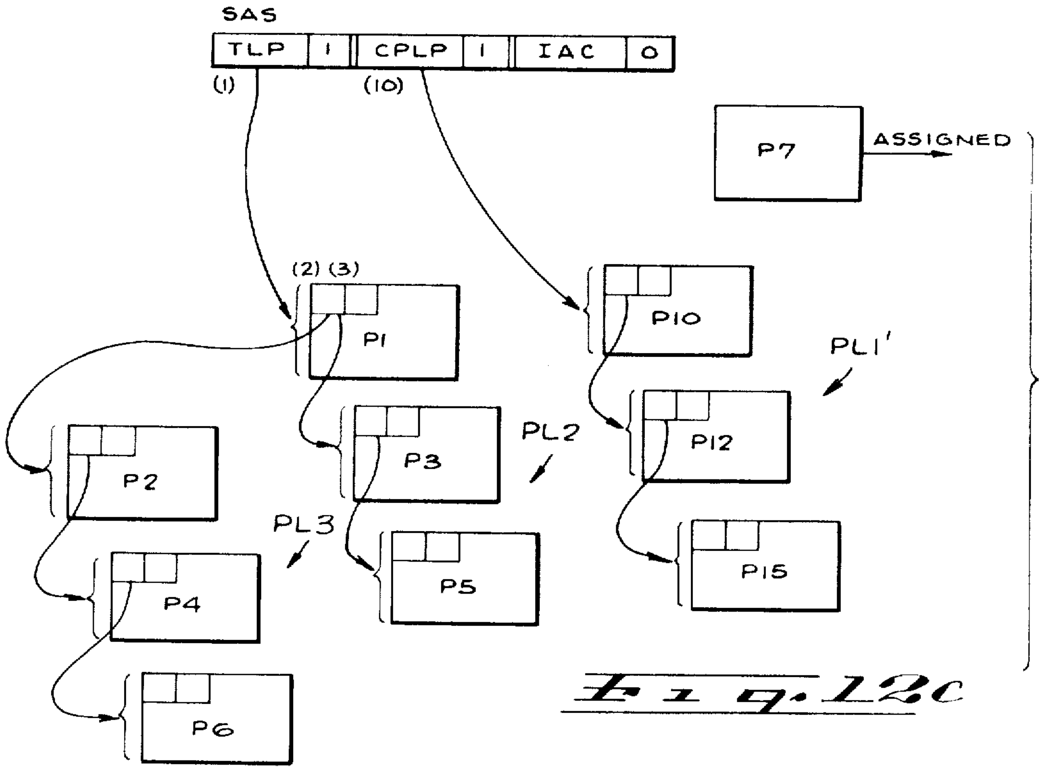

Referring to FIG. 12a, let it be assumed that three, previously deleted page lists designated PL1, PL2, and PL3 are linked to the TLP field with the page numbers in the various pages as shown. It is further assumed that all pages have been initially assigned so that the IAC is invalid. It is also assumed that the CPLP field is also invalid. The invalidity of each of fields IAC and CPLP is indicated by a binary "0" activity bit. Under such conditions, if a page has to be assigned, list PL1 is moved from TLP by deleting the number 7 stored therein. The TLP is then made to point to the next page list PL2 by storing therein the number 1 which is the number of the top page P1 of list PL2, as shown in FIG. 12b. Once the proper linkage of TLP with the remaining lists (PL2 and PL3) is completed, the removed list (PL1) is linked to the CPLP, by storing in the latter the number 7 of the top page (P7) of list PL1 (see FIG 12b). Only then is a page assigned from the list PL1 which is linked to the CPLP. In the present example it is page P7 which is assigned. After its assignment, only pages P10, P12 and P15 remain of the previous page list PL1 to form a partial list PL1' (FIG. 12c). The number (10) of the page P10) succeeding the assigned page (P7) is stored in the CPLP field. In the present example it is the number 10 of page P10, as shown in FIG. 12c.

The next page to be assigned, if such a need arises, would be P10, followed by P12 until the partial list PL1', linked to CPLP is exhausted. Once it is exhausted and a need again arises for the assignment of a page, list PL2 would be removed from the tree of lists linked to the TLP, and P1 would be the first to be assigned therefrom.

In the foregoing description, it has been assumed that the CPLP and TLP fields are only interrogated after all the pages in the memory have been initially assigned. That is, the IAC field must be invalid before a determination is made whether a page in a deleted page list is available for assignment. As described, only when IAC is invalid is the CPLP field interrogated, followed when needed, by the interrogation of the TLP field. If desired, however, the system may be operated so that after some pages are assigned to one or more users, to form one or more page lists, in the assignment of subsequent pages, deleted pages, if any, would first be assigned before resort is made to the IAC field to assign pages which were not assigned as yet.

From the foregoing it should thus be appreciated that the availability of the SAS word, serving as a system control word, the PLC words, one for each user, and the PHA words, one per page, provide the system with the capability of assigning pages to users to form page lists by the mere manipulation of page numbers, representing page addresses in different fields of these words as herebefore explained. The availability of these control words, combined with the ability to manipulate memory addressing in accordance with the various methods herebefore described in conjunction with FIGS. 4*f*, 4*d* and 4*c* which may be used to address the SAS word, a PLC word or a PHA word of a page specified in the PN address portion, enables the system to perform the various tasks, before described, at high speeds during program execution.

In addition to the aforedescribed capabilities, the system of the present invention is also operable to assign to a user data-storing groups, form strings of groups, delete strings of groups, no longer needed, as well as reclaim groups which are part of previously deleted group strings. However, before describing these capabilities attention is directed to FIG. 13, which is a block diagram of the novel MCS of the present invention. Therein, numeral 50 designates the MCS, shown associated with a RAM 30, which includes all of the circuits enclosed within dashed line 51. RAM 30 may comprise any of the known random-access memories or content-addressable memories, presently known in the art. Since no novelty is attached in the present application to the hardware of the RAM, all the components thereof are shown in block form. In accordance with the teachings of the present invention the novelty as related to the RAM 30 lies only in the unique organization or format of its memory matrix 10, as hereinbefore described.

Figure 13:
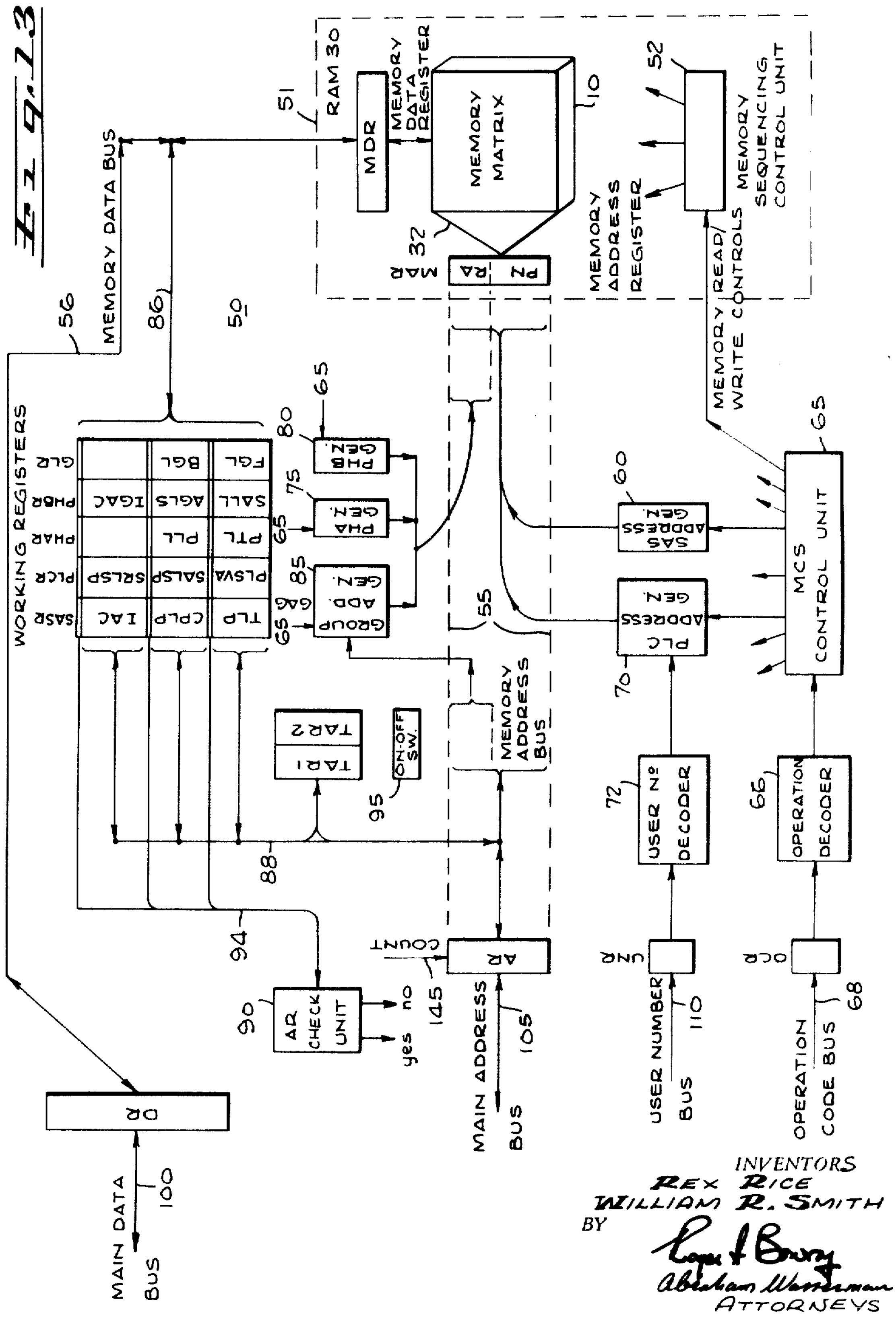
FIG. 13 is a basic block diagram of the novel memory control system of the present invention.

As shown in FIG. 13, the RAM 30 in addition to the memory matrix 10 includes the memory address register (MAR) and the memory data register (MDR), previously referred to. In addition, the RAM 30 includes a memory sequencing control unit 52, which, as appreciated by those familiar with the art, is responsive to memory Read-Write control signals. A Read control signal causes unit 52 to control the RAM to read out a word in memory 10 at an address, located in the MAR and place the readout word in the MDR. Similarly, a Write control signal causes the writing, into memory matrix 10, a word which is located in the MDR at an address, located in the MAR. Again, since no novelty is attached to unit 52, units like it being well known in the art, the unit will not be described in any detail. It should be pointed out that the MAR and MDR at RAM 30 in some embodiments may be located outside the block RAM 30 and combined in the logic of the computer system.

As shown in FIG. 13, the MCS 50 includes a main address register, designated AR and a main data register, designated DR. Also, the MCS 50 includes various busses which will be described hereafter. Although each of the busses is represented by a single line, in practice it comprises a number of lines, equal to the number of bits which may be transmitted therethrough in parallel. Assuming that each word in the memory matrix is 64 bits in length, each of the busses used to transmit data from the MDR or thereto is assumed to comprise 64 lines. Each address bus, used to transmit an address may include as many as 24 lines since, as hereinbefore assumed, a complete address in the matrix 10 is assumed to comprise 24 bits. Sixteen of the bits represent the PN address portion and eight represent the RA portion. In FIG. 13, numeral 55 designates a complete 24-line memory address bus which interconnects the AR with the MAR, while numeral 56 designates a complete 64-line memory data bus, interconnecting the DR with the MDR.

Figure 13A:
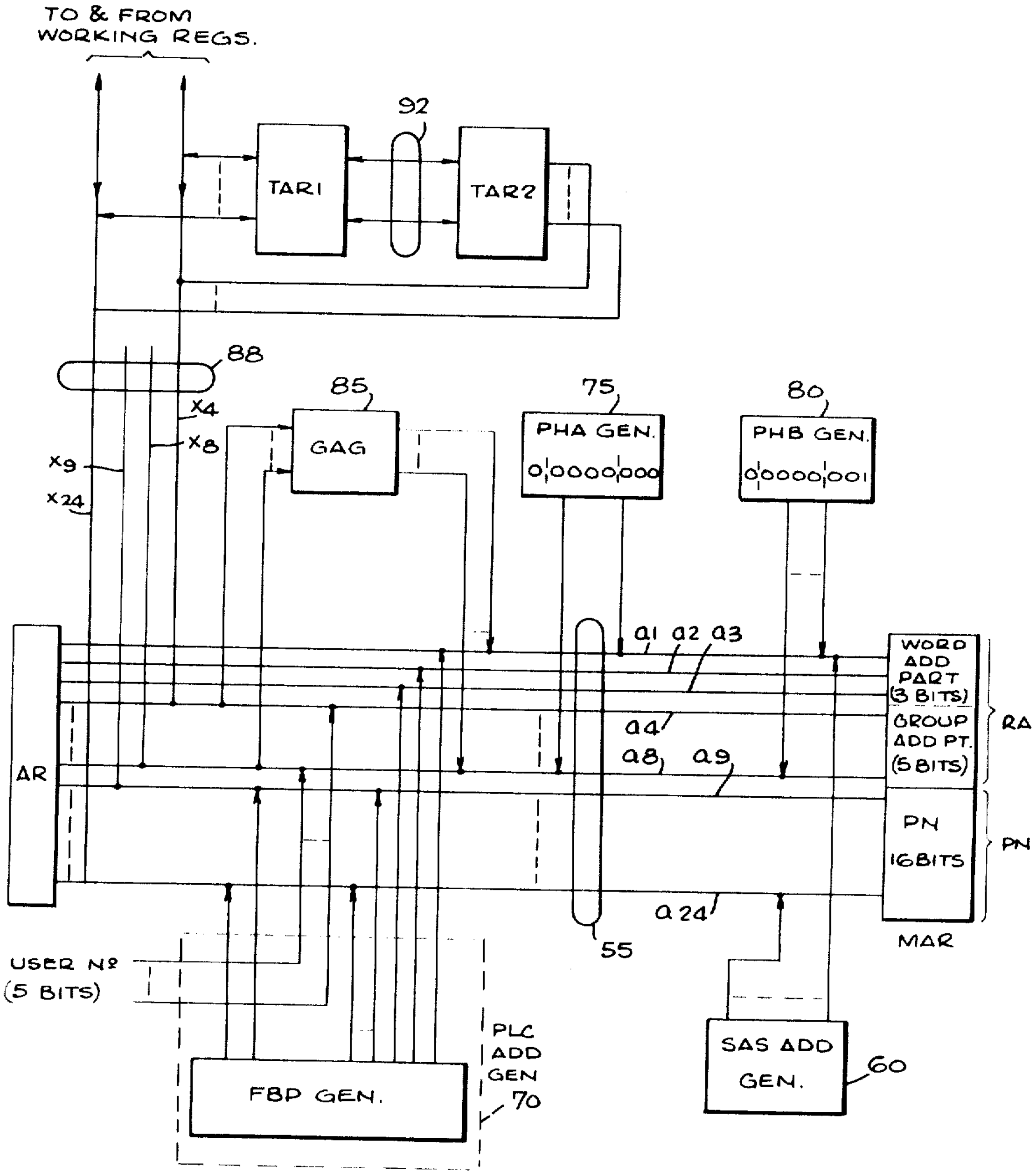
FIG. 13*a* is a partial block diagram of the system shown in FIG. 13.

FIG. 13*a*, to which reference is now made, is an expanded diagram of address bus 55 and the various hardware connected thereto. As shown, the bus includes 24 lines designated *a*1–*a*4. Lines *a*1–*a*8 are connected to the RA portion of the MAR while lines *a*9–*a*24 are connected to the PN portion of the MAR. Since in the assumed memory format, each page consists of 32 groups, each of eight words, the RA portion may be thought of as comprising a group address part of five bits, supplied to the MAR via lines *a*4–*a*8, which defines a specific group in the page whose number is in the PN portion, and a word address part of three bits, supplied via lines *a*1, *a*2 and *a*3, which defines the address of a word within the group whose address is in the group address part of the RA portion.

The MCS 50 also includes all the hardware, such as various generators, necessary to manipulate the address in the MAR in accordance with the various methods, hereinbefore described in conjunction with FIGS. 4*c* through 4*f*. These generators include an SAS address generator 60 which is shown controlled by a control signal from an MCS control unit 65 (see FIG. 13). As will be described hereafter in great detail, unit 65, in response to signals supplied thereto from an operation decoder 66, which in turn responds to an operation code in an operation code register OCR, provides all the necessary control signals to various hardware components of the MCS 50 to individually control their operations. Also, unit 65 supplies control signals to the RAM 30, such as Read or Write signals, to control the Read or Write operations therein.

At this point in the description, it is sufficient to state that the MCS control unit 65 supplies the SAS address generator 60 with a control signal, which is analogous to the control signal shown in FIG. 4*f*. Briefly, the SAS generator 60 operates as a fixed bit pattern (FBP) generator. When energized by the control signal from unit 65, it generates a fixed bit pattern of 24 bits which comprises the complete address of the SAS word in memory. As herebefore assumed (see page 2*b*) the SAS word is at the address of word 0, group 0 of page 0. Consequently, the fixed bit pattern may comprise 24 binary zeros.

This pattern is coupled to the MAR via lines *a*1–*a*24 of bus 55 (see FIG. 13*a*). Generator 60 is enabled whenever it is necessary to either retrieve the SAS word from the memory matrix, or store the SAS in it. Thus, when generator 60 is enabled, the SAS word address is generated by it, and is supplied to the MAR at clock cycle speed, thereby providing an address by the method, previously described in conjunction with FIG. 4*f*.

The MCS 50 also includes a PLC address generator 70 which, like generator 60, is also controlled by unit 65. However, unlike generator 60, the PLC address generator 70 is also provided with signals from a user number decoder 72 (FIG. 13) which is in turn supplied with signals from a user number register UNR. In this example, the signals are a five-bit pattern, representing a user number. Basically, the function of generator 70 is to generate in the FBP generator, in response to the control signal from unit 65, a selected fixed bit pattern which includes the *a*16-bit pattern of the PN address portion of the specific page in which are located all the PLC words (such as page 1 in FIG. 2*b*). This 16-bit pattern is supplied to lines *a*9–*a*24. Generator 70 also generates the word address part of the RA portion, which represents the address of a word, such as the first word (W0), within a group. This is achieved by supplying a three-bit pattern to lines *a*1–*a*3. The PLC generator also combines its fixed bit pattern with the output of decoder 72, which is the user number. The user number in essence provides the five-bit group address part of the RA portion which is supplied to lines *a*4–*a*8. The combined output of the PLC generator 70 which represents the complete address of the PLC word of the user whose number is supplied by decoder 72, is supplied via lines *a*1–*a*24 of bus 55 to the MAR.

Relating the operation of generator 70 to the previous description in connection with FIG. 4*d*, the PLC generator 70 may be thought of as comprising the fixed bit pattern generator, shown in FIG. 4*d*, as well as a path for the output of the decoder 72 to the memory address bus 55. Thus, when generator 70 is used, the addressing method hereinbefore described in conjunction with FIG. 4*d*, is practiced.

The MCS 50 also includes a PHA generator 75, a PHB generator 80 and a Group Address generator (GAG) 85. Each of the last three mentioned generators is connected to unit 65 to receive an appropriate control signal therefrom. As shown in both FIGS. 13 and 13*a*, the output of each of the generators is connected to the memory address bus 55. However, each of these generators is connected only to the lines in memory address bus 55 through which the lower order bits of an address, representing the RA portion of the address, are supplied. The reason for such connections is that the function of each of the three generators (75, 80 and 85) is to provide only the RA portion of the address to the MAR, which is supplied with the PN portion from another source. Thus, as shown in FIG. 13*a*, the output of each of these three generators is shown connected only to lines *a*1–*a*8 of bus 55.

Briefly, the function of the PHA generator 75 is to provide the RA portion of the address of a PHA word. Assuming that each PHA word is the first word (word 0) of the first group (group 0) in a page, the PHA generator 75 provides a special bit pattern of eight bits, 00000¦000, which represents the relative address (RA) of the first word of the first group of a page. However, which of the PHA words is actually addressed depends on the PN portion of the address, i.e., the page number, which is supplied from a source other than the PHA generator 75. Thus, in the MCS 50, in order to generate the address of a PHA word it is necessary to supply the Pn address portion from some source, while the relative address (RA) of the PHA word address within a page is provided by generator 75.

Likewise, the output of generator 80 represents the RA portion of the address of a PHB word within a page, whose number is supplied from a source other than generator 80. Assuming that the PHB word is the second word, (W1) of the first group (group 0) in each page, the bit pattern of generator 80 is 00000¦001. When either of generators 75 and 80 is actuated to supply the relative address (RA) portion to the MAR, while the PN address portion is supplied from another source, the addressing method, hereinbefore described in conjunction with FIG. 4*c* is practiced, since the complete address to the MAR is supplied from two separate sources. That is, the PN address portion is supplied from one source while the RA portion, representing the address of either a PHA word or a PHB word, within each page is supplied from either of generators 75 or 80, which in FIG. 4*c* is represented by the special bit pattern generator.

Unlike the previously described generators, the GAG 85, in addition to being provided with a control signal from unit 65, which activates the generator, is also provided with the lower order bits in the memory address bus 55, which represent the group address part of the RA portion. As shown in FIG. 13*a*, lines *a*4–*a*8 of bus 55 are connected to the input of GAG 85. The function of the GAG 85 is to convert the five bits supplied thereto into a related eight-bit pattern which represents the complete RA portion, which is supplied by the GAG to the MAR via lines *a*1–*a*8. Briefly described, the function of the GAG 85 is to respond to the part of the RA portion of the address which designates a Data-Storing group within a page, and convert it to the complete RA portion of the address of the Group Link (GL) word, associated with such a Data-Storing group.

For example, assuming that the memory matrix format is as shown in FIG. 2, when the GAG 85 is supplied with the part of the RA portion of the address which designates the address of anyone of Data-Storing groups 1 through 28 within a page, it converts it to a complete RA portion of the address of the GL word corresponding to the addressed Data-Storing group. It should be pointed out, that since all the GL words and the Data-Storing groups are located in the same page, the GAG 85 does not operate on the PN address portion which is supplied to the MAR from a source, other than the GAG. All that the GAG 85 does is convert a part of the relative address portion, supplied thereto via lines *a*4–*a*8 of memory address bus 55, to a complete related relative address (RA) portion.

For example, when the GAG 85 is supplied via lines *a*4–*a*8 with a five-bit relative address part 00101, representing group no. 5 in a page, which corresponds to the address of Data-Storing group 2 in that page, it converts such a relative address part into a bit pattern 00000101, which is the RA portion of GL2, since GL2 is assumed to be located at word 5 (101) in group 0 (00000) of the page. Likewise, if the relative address portion, supplied to GAG 85 is 11111 which is the address of group no. 31 in a page representing the address of Data-Storing group 28, GAG 85 provides a bit pattern 00011111 which is the relative address portion of W7 (111) in group 3, (00011) in which GL28, associated with Data-Storing group 28, is stored. Such an addressing manipulation operation is analogous to the method hereinbefore described in conjunction with FIG. 4*e*, wherein the PN address portion to the MAR is shown supplied from one register, while the RA portion is supplied to the MAR from a Relative Address Translator which translates the relative address supplied thereto into a related address portion. Thus, the GAG 85 is analogous to the Relative Address Translator shown in FIG. 4*e*.

From the particular page format shown in FIG. 2 the operation of the GAG 85 may be summarized by the following Table 1.

TABLE I

| INPUT | | | | | OUTPUT | | | | | | | |
|---|---|---|---|---|---|---|---|---|---|---|---|---|
| *a*8 | *a*7 | *a*6 | *a*5 | *a*4 | *a*8 | *a*7 | *a*6 | *a*5 | *a*4 | *a*3 | *a*2 | *a*1 |
| 0 | 0 | 1 | 0 | 0 | 0 | 0 | 0 | 0 | 0 | 1 | 0 | 0 |
| 0 | 0 | 1 | 0 | 1 | 0 | 0 | 0 | 0 | 0 | 1 | 0 | 1 |
| 0 | 0 | 1 | 1 | 0 | 0 | 0 | 0 | 0 | 0 | 1 | 1 | 0 |
| 0 | 0 | 1 | 1 | 1 | 0 | 0 | 0 | 0 | 0 | 1 | 1 | 1 |
| 0 | 1 | 0 | 0 | 0 | 0 | 0 | 0 | 0 | 1 | 0 | 0 | 0 |
| 0 | 1 | 0 | 0 | 1 | 0 | 0 | 0 | 0 | 1 | 0 | 0 | 1 |
| 0 | 1 | 0 | 1 | 0 | 0 | 0 | 0 | 0 | 1 | 0 | 1 | 0 |
| 0 | 1 | 0 | 1 | 1 | 0 | 0 | 0 | 0 | 1 | 0 | 1 | 1 |
| 0 | 1 | 1 | 0 | 0 | 0 | 0 | 0 | 0 | 1 | 1 | 0 | 0 |
| 0 | 1 | 1 | 0 | 1 | 0 | 0 | 0 | 0 | 1 | 1 | 0 | 1 |
| 0 | 1 | 1 | 1 | 0 | 0 | 0 | 0 | 0 | 1 | 1 | 1 | 0 |
| 0 | 1 | 1 | 1 | 1 | 0 | 0 | 0 | 0 | 1 | 1 | 1 | 1 |
| 1 | 0 | 0 | 0 | 0 | 0 | 0 | 0 | 1 | 0 | 0 | 0 | 0 |
| 1 | 0 | 0 | 0 | 1 | 0 | 0 | 0 | 1 | 0 | 0 | 0 | 1 |
| 1 | 0 | 0 | 1 | 0 | 0 | 0 | 0 | 1 | 0 | 0 | 1 | 0 |
| 1 | 0 | 0 | 1 | 1 | 0 | 0 | 0 | 1 | 0 | 0 | 1 | 1 |
| 1 | 0 | 1 | 0 | 0 | 0 | 0 | 0 | 1 | 0 | 1 | 0 | 0 |
| 1 | 0 | 1 | 0 | 1 | 0 | 0 | 0 | 1 | 0 | 1 | 0 | 1 |
| 1 | 0 | 1 | 1 | 0 | 0 | 0 | 0 | 1 | 0 | 1 | 1 | 0 |
| 1 | 0 | 1 | 1 | 1 | 0 | 0 | 0 | 1 | 0 | 1 | 1 | 1 |
| 1 | 1 | 0 | 0 | 0 | 0 | 0 | 0 | 1 | 1 | 0 | 0 | 0 |
| 1 | 1 | 0 | 0 | 1 | 0 | 0 | 0 | 1 | 1 | 0 | 0 | 1 |
| 1 | 1 | 0 | 1 | 0 | 0 | 0 | 0 | 1 | 1 | 0 | 1 | 0 |
| 1 | 1 | 0 | 1 | 1 | 0 | 0 | 0 | 1 | 1 | 0 | 1 | 1 |
| 1 | 1 | 1 | 0 | 0 | 0 | 0 | 0 | 1 | 1 | 1 | 0 | 0 |
| 1 | 1 | 1 | 0 | 1 | 0 | 0 | 0 | 1 | 1 | 1 | 0 | 1 |
| 1 | 1 | 1 | 1 | 0 | 0 | 0 | 0 | 1 | 1 | 1 | 1 | 0 |
| 1 | 1 | 1 | 1 | 1 | 0 | 0 | 0 | 1 | 1 | 1 | 1 | 1 |

From the foregoing Table 1 it should be appreciated that the function of the GAG 85 is to shift the five-bit pattern received from lines *a*4–*a*8 to lines *a*1–*a*5 while all zeros are supplied to lines *a*6, *a*7 and *a*8. Such a generator greatly simplifies the task of addressing a GL word, since it generates the RA portion of the word's address when supplied with the group address part of the address of the Data-Storing group with which the GL word is associated. Such a technique completely eliminates the need to store the addresses of the GL words, since their addresses are generated from the addresses of their corresponding Data-Storing groups.

In addition to the foregoing described hardware, the MCS 50 (FIG. 13) further includes a plurality of working registers, each one of which is designed to temporarily store or hold a different type of a control word, which may be supplied thereto. Each of the registers is designated by an acronym designating the type of the control word storable therein, followed by the letter R. Thus, SASR is sued to designate a register which may temporarily hold the SAS word, PLCR may be used to temporarily hold any of the PLC words, while PHAR may be used to hold any of the PHA words which may be read out from the memory during the performance of any of the operations to be described hereafter. Likewise, PHBR and GLR are designed to respectively store a PHB word and a GL word, whenever such words are needed in the performance of any of the operations.

As shown in FIG. 13, the working registers are also connected to the memory data bus 56 by a bus section 86 which is used to transfer the content of the MDR to any of the working registers, as well as transfer the content of any of the registers to the MDR. As is appreciated by those familiar with the art, the transferring of the content of one register to another is achieved by providing an Unload signal to the register whose content is to be transferred to another register, which is provided with a Load control signal. In the MCS 50, such Load and Unload control signals are supplied by MCS control unit 65.

The working registers are also connected by means of a bus 88 to either of two temporary address registers designated TAR1 and TAR2, as well as to the memory address bus 55. TAR1 and TAR2 are also connected to the memory address bus 55. The basic function of each temporary address register (TAR) is to store a field of one of the control words which may be supplied thereto from any of the working registers. The two temporary address registers are needed since, as will be appreciated from the following description, in some of the operations of the system, different fields of several control words of the same type are needed simultaneously for the system's operation. However, since only one working register is available for each type of control word, the temporary address registers are used to temporarily hold the needed fields of control words in excess of the one which finds its place in its corresponding working register. For example, in some operations, fields in as many as three GL words are operated upon. Since the working registers include only one GLR, fields of two of the three GL words are temporarily stored in the two temporary address registers.

The MCS 50 further includes an AB check unit 90. The function of check unit 90 is to interrogate the content of an activity bit in any of the working registers, when such an interrogation is required, to determine whether the field associated with that particular activity bit stores a valid address. A valid address is indicated when the activity bit stores a binary one. If the field is valid, unit 90 provides, at its output line designated YES, a true output. On the other hand, if the field is invalid, the NO output is true.

The working registers are of equal bit length, each being 64 bits long. The fields of the various control words which are storable in the corresponding registers are not all equal in length even through in FIG. 13 they are shown to be. The fields are of different lengths, since some are used to store or hold a page number which is represented by 16 bits, while other fields are used to hold the addresses of specific Data-Storing groups each one of which requires an address of 21 bits, 16 bits to designate the page and five bits to designate the group within the page. None of the fields of any of the control words stores the full address of a specific word which requires 24 bits. Consequently, the maximum number of lines of bus 88 is 21. These are designated by $x4$–$x24$ in FIG. 13$a$, wherein they are shown connected to liens $a4$–$a24$, respectively, and to each of registers TAR1 and TAR2. The latter two are also interconnected by a 21-line bus 92 which is used to transfer the content of one TAR to the other.

Lines $x4$–$x8$ are used to carry the group address part in any of the fields in the registers while lines $x9$–$x24$ carry the PN address portion. Thus, the connections between the working registers and bus 88 depend on the locations and lengths of the fields in each of them. For example, the bits of register SASR which are used to hold the TLP field are connected only to lines $x9$–$x24$ of bus 88 since the TLP field holds only a page number of 16 bits. Likewise, the bits of SASR, holding each of fields CPLP and IAC are connected only to lines $x9$–$x24$. On the other hand, in PLCR the bits holding field SRLSP in which a 21-bit group address is stored are connected to lines $x4$–$x24$. The bits of PLCR holding each of fields PLSVA and SALSP are only connected to lines $x$ 9–$x24$ since each of these fields holds only a 16-bit page number.

Even though the fields of the various control words are not of equal length, they are selected so that the activity bits of the various fields are held in corresponding bits of the various working registers. This simplifies the connection between these register bits and AB check unit 90. In FIG. 13, numeral 94 designates a three-line bus which connects the unit 90 to three corresponding bits in all the registers into which activity bits are entered.

The MCS 50 further includes an ON-OFF switch 95. The function of this switch will be explained hereafter in conjunction with the detailed description of some of the coded operations which the MCS is capable of executing. If desired, switch 95 may be incorporated in unit 65.

While the MCS 50 is connected to the RAM 30 by means of the memory address bus 55, and the memory data bus 56, four separate busses connect the input registers of the MCS 50 to the users which the system is designed to serve. A 64-line main data bus 100 serves to supply data, such as a 64-bit word, from any of the users to the DR for subsequent storage in the memory matrix as well as to supply a word from the DR to a user. Likewise, a 24-line main address bus 105 interconnects the users to the AR to either supply a user-designated address to the MCS for use in its operation or to supply the user with an address, provided by the MCS. The address supplied from a user or thereto may comprise the address of a specific word, in which case a 24-bit pattern is supplied, or the address of a data-storing group requiring a 21-bit pattern. If only a page address is involved, only a 16-bit pattern is provided. The user which is in communication with the MCS is designated by the user number which is supplied to the UNR, via a five-line user number bus 110. The operation code bus 68 is used to supply, from any of the users which happens to be in communication with the system, an operation code which designates the type of operation requested by the user. Each code is defined by a four-bit pattern.

Before proceeding to describe how the hardware of the MCS 50 operates to provide the system with the various capabilities, hereinbefore described and those to be described subsequently, its content could be summarized as comprising a plurality of registers, including working registers and temporary address registers, whose function is to temporarily hold various ones of the control words or selected fields thereof, while their content is being interrogated or modified at clock cycle speed. The MCS 50 further includes a plurality of generators which are designed to provide either the complete bit pattern, necessary for a complete address, or a portion thereof, which are utilized in the various addressing methods, as hereinbefore described. The MCS 50 is under the control of the control unit 65 which, as a function of the operation code supplied thereto, provides sequences of control signals to both the registers and the generators to control the execution of any of the operations, each one of which is performable in a unique sequence of steps.

Although hereafter, each of the coded operations which the MCS 50 is capable of performing will be described in great detail, the foregoing description of the MCS 50 can be made more meaningful by describing one or two examples of how its hardware is used to provide some of the capabilities, hereinbefore described. For example, as explained, one of the system's capabilities is to add a page to a page list, associated with a particular user. This capability has been described in conjunction with FIGS. 6 and 7, in which an existing list is assumed to comprise pages P1, P4, P2 and P3 and the page to be added is P*x*. In operation, when a need to add a page to a page list arises during the execution of an operation, requested by a user whose number is supplied via bus 110 to the MCS, the first series of steps that is performed involves the retrieval of the user's PLC word and its temporary storage in the working register PLCR. This is achieved by using the user number in UNR, decoding it in decoder 72 and then actuating the PLC generator 70 to provide the complete address of the particular user's PLC word. Once the address is available in the MAR, a Read control signal is supplied to the RAM 30 to transfer the particular user's PLC word to the MDR. This is followed by an Unload MDR and a Load PLCR control signal, provided by unit 65 which results in the transfer of the PLC word from the MDR to the PLCR.

For explanatory purposes, let it be assumed that the number of page P*x* which is to be added to the list, i.e., *x*, is present at the IAC field of the SASR which is assumed, at this point in the operation, to temporarily hold the SAS word. As previously explained, the addition of an available page to a page list is performed by transferring the page number (such as *x*) of the added page to the PLSVA field of the user's PLC word, and by storing, in the PLL field of the PHA word of the newly added page, the number, previously present in the PLSVA field, which represents the number of the previous top page in the list. In the present example, this number is assumed to be 1. Let it be assumed that the SAS word is in the SASR and the PLC word of the particular user is in the working register PLCR, and therefore the number *x* of the added page is in the IAC field of SASR, while the number 1, representing the page number of the top page of the existing list is available in the PLSVA field of PLCR.

Before the number *x* in the IAC field can be transferred to the PLSVA field, represented in FIG. 7 by arrow 36, it is first necessary to transfer the number 1 from the PLSVA field to the PLL field of the PHA word of P*x*. However, to accomplish such a transfer, it is necessary to retrieve the PHA word of the page (P*x*) whose number *x* is in the IAC. In the present invention, this is easily accomplished by transferring the number *x* from the IAC to the PN portion of the MAR, while at the same time enabling the PHA generator 75 to provide the RA portion of the address of a PHA word. Thus, the *x* from the IAC field is used to designate the addressed page, while the output of generator 75 is used to address the PHA word of the page, designated by *x* from the IAC field.

Once the full address of PHA word of P*x* is in the MAR, a Read operation is performed followed by the transferring of the content of the MDR to PHAR, thereby temporarily transferring the PHA word of P*x* from the matrix 10 to PHAR. Only then can the content of the PLSVA field (1 in the present example) be transferred to the PLL field in the PHAR to thereby form the linkage, represented by arrow 34 in FIG. 7. Once this linkage is formed the content of the field IAC (*x* in the present example) is transferred to the PLSVA field to form the linkage represented in FIG. 7 by arrow 36.

Thereafter, the PHA word of P*x*, which is now in the PHAR, is rewritten into memory at an address which is provided from two sources. The PLSVA field supplies the number *x* to the PN portion of the MAR and the PHA generator 75 provides the relative address of the PHA word within the page. Once the PHA word of P*x* is restored in memory, the PLC word of the particular user, which is in PLCR, is restored by an address provided by the PLC address generator 70. This is followed by restoring the SAS word which is in the SASR into the memory, by enabling SAS address generator 60 to provide the particular specific address of the SAS word. This, in essence, completes the addition of the page P*x* to the list. It should be pointed out that all of these steps are performable at high speeds, since they all involve only the transferring of control words between the matrix and the working registers, or the transferring of the content of one field of a register to another field of another register, or the actuation of any one of the various address generators which provide fixed or selected bit patterns.

The various other system capabilities, hereinbefore described, are similarly performable by the hardware of the MCS 50. For example, the formation of the space available list (SAL) hereinbefore described in conjunction with FIG. **9*b*, is similarly performable by retrieving the user's PLC word and placing it in its corresponding PLCR in order to have access to the content of the SALSP field of the PLC word. The PHB word of the page to be added to the space available list (P4 in FIG. 9*a***) is also retrieved in order to store therein the previous content of the SALSP field, before the page number of the page which is to be added to the space available list is stored in this field.

It should thus be seen, that the various capabilities are realized by utilizing the various registers in the MCS to temporarily hold several different types of control words and by transferring the contents of the different fields thereof from one to the other. The retrieval of any of the control words from the memory matrix 10 as well as the restoring of such control words after their contents have been properly modified, are easily achieved in the present system by the hardware, in the form of the various address generators, which are capable of manipulating and generating addresses, in any one of the foregoing described methods, to retrieve or store any of the control words in their appropriate addresses at high speeds.

The single SAS word located at a specific address in the matrix (such as page P0, word 0 in group 0), shown in FIG. **2*b*, is provided by generator 60 by merely supplying it with a control signal from unit 65. The address of the PLC word of any user, which is in communication with the system is produced by the PLC address generator 70 by merely enabling it with a control signal and supplying it with the user number to provide the complete address of the user's PLC word. Each of generators 60 and 70 provides a complete control word address. On the other hand, the addressing of a PHA word or a PHB word is produced by supplying the MAR with the page number (PN) from any one of the various fields of the registers, such as the IAC field of SASR, or the PLSVA field of register PLCR, while at the same time providing the relative address (RA) portion from either generator 75 for the retrieval of a PHA word, or from generator 80** for the retrieval of a PHB word.

Figure 14:
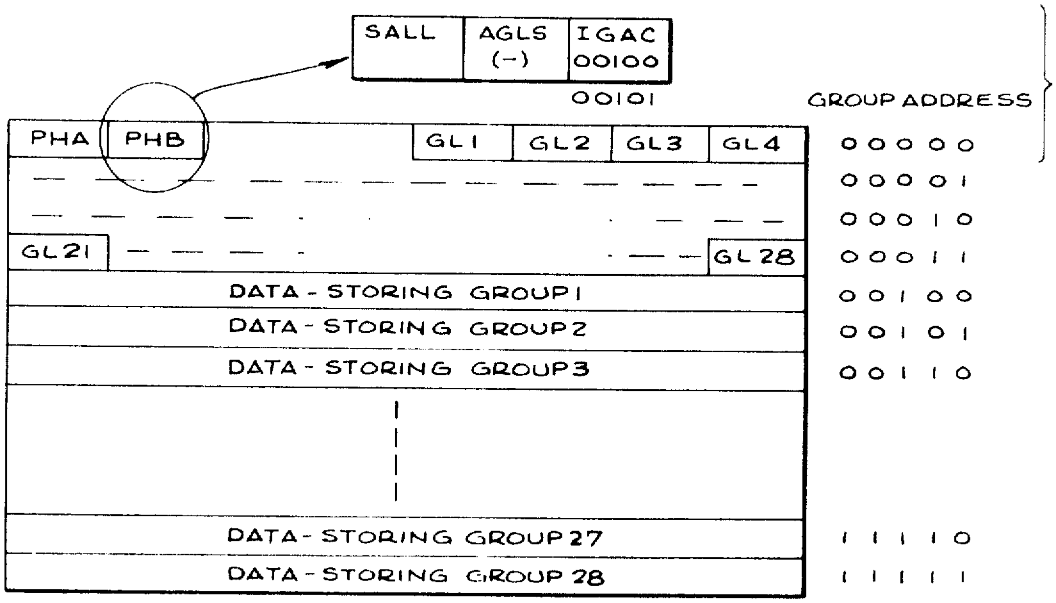
FIG. 14 is a page format diagram useful in explaining the initial assignment of data-storing groups in a page.

Attention is now directed to FIG. 14 which is a simple diagram of a page format, useful in explaining the capability of the system to automatically and dynamically assign a data-storing group to a user, as a need arises, from a new page which may be added to a user's page list. The addition of a page to a page list has been described in connection with FIG. 7. The format is the same as that shown in FIG. 2, except that the various fields of the PHB word are diagrammed in the enlarged block of the PHB word. Basically, when a new page is added to pages assigned to a user, it is added to the user's page list as well as to the space available list, as hereinbefore explained. When a new page is first added, the AGLS field of its PHB word is inactive as indicated in FIG. 14 by the (−) in the AGLS field. The IGAC, serving as a counter, is initialized to represent a count or bit pattern such as 00100 which represents page group 4 which corresponds to the address of data-storing group 1 in the newly assigned or added page. Then, data-storing group 1, being the first data-storing group in the added page, whose address is in the IGAC field of the PHB word is assigned and the IGAC is set to store the address of the second assignable data-storing group in the page, i.e., the address of data-storing group 2. The address of data-storing group 2 is represented in FIG. 4 by the bit pattern 00101 below the IGAC field of PHB2.

Subsequently, when a need arises for the assignment of another data-storing group of the page, it is group 2 which is assigned and the IGAC is incremented by one to store the address 00110 of a succeeding group, i.e., data-storing group 3. Thus, the IGAC, serving as a counter, is incremented by one each time a group is assigned from the page. When the count in the IGAC represents the address such as 11111 of the last assignable data-storing group 28, and this group is assigned, the IGAC is incremented by one, which results in the IGAC field becoming inactive. This represents that all the data-storing groups in the page have been initially assigned. This operation is analogous to that performed in the initial assignment of all the pages in the system as controlled by the IAC field of the SAS word, an operation hereinbefore explained in conjunction with FIGS. 10*a* and 10*b*.

While the SALL field of the PHB word is used to provide proper page linkage in the space available list (SAL) and the IGAC field, just described, is used in the initial assignment of data-storing groups of a new page, the AGLS field is used in the assignment of groups in the page which have been previously assigned, but subsequently deleted and thereafter reclaimed by the system for subsequent use by the user. The manner in which this field is used in the assignment of groups, may best be explained by referring to FIGS. 15*a* and 15*b*. Basically, the AGLS field stores the address of a group in the page which is available for assignment, while the FGL field of the GL word of this group may store the address in the page of another group which is available for assignment. For example, let it be assumed that the page shown in FIG. 15*a* includes groups *n*, *m* and *p* which have been reclaimed in a manner to be described hereafter, and are available for assignment. Let it further be assumed that the AGLS field of the PHB word stores the address of group *n* while GL*n* stores in its FGL field the address *m* and the GL*m* stores in its FGL field the address *p*. The linkages between the three groups, which are available for assignment are designated in FIG. 15*a* by arrows 121 and 122.

Figure 15A:
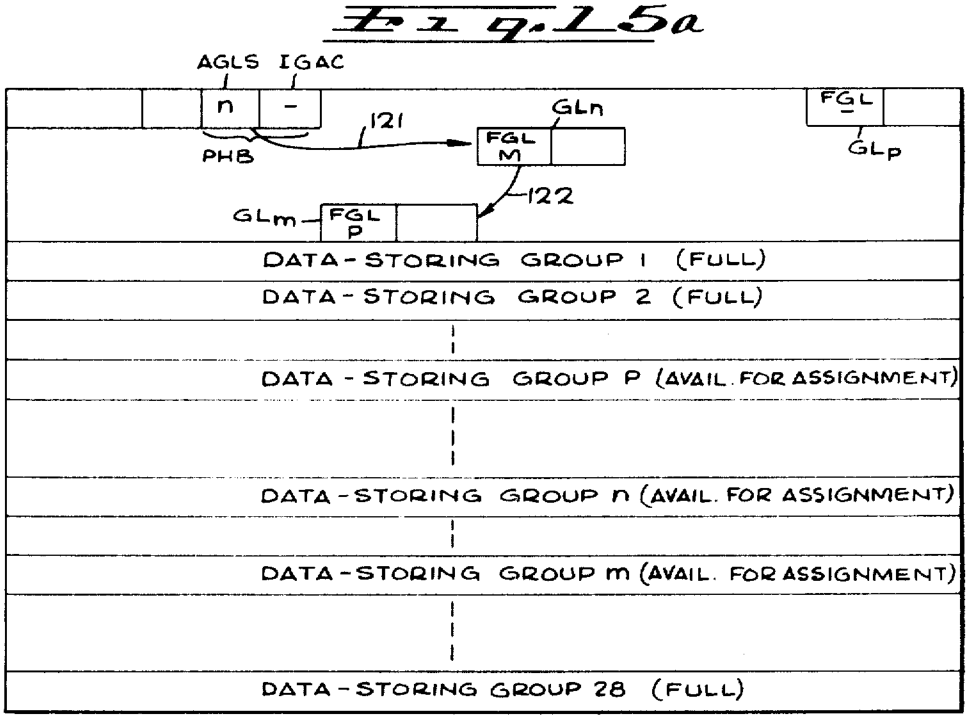
FIGS. 15*a* and 15*b* are page format diagrams useful in explaining the assignment of reclaimed data-storing groups in a page.

When a group has to be assigned from the page shown in FIG. 15*a*, the IGAC is interrogated. Found to be inactive, designated by (−) which indicates that all the groups in the page have been initially assigned, the AGLS field is interrogated. Found to be valid by containing a meaningful address, i.e., the address *n* of group *n*, group *n* is assigned. However, the assignment is not completed until the group address *m*, located in the FGL field of the GL word of the assigned group, i.e., GL*n*, is transferred to the AGLS field (See FIG. 15*b*) and the FGL field of GL*n* is inactivated as shown by the minus (−) sign in the FGL field of GL*n*.

The next group to be assigned is group *m*, the assignment of which is not completed until the address of group *p* in the FGL of GL*n* is entered into the AGLS field to be present there for use in a subsequent group assignment operation. It should be pointed out, that whereas in the initial assignment of groups, successive groups in the page are assigned, when groups are assigned by utilizing the AGLS field, the assignment is controlled by the linkages between the groups rather than by their locations within the page. This is represented in FIG. 15*a* by the noncontiguous locations of groups *n*, *m* and *p* in the page.

Figure 15B:
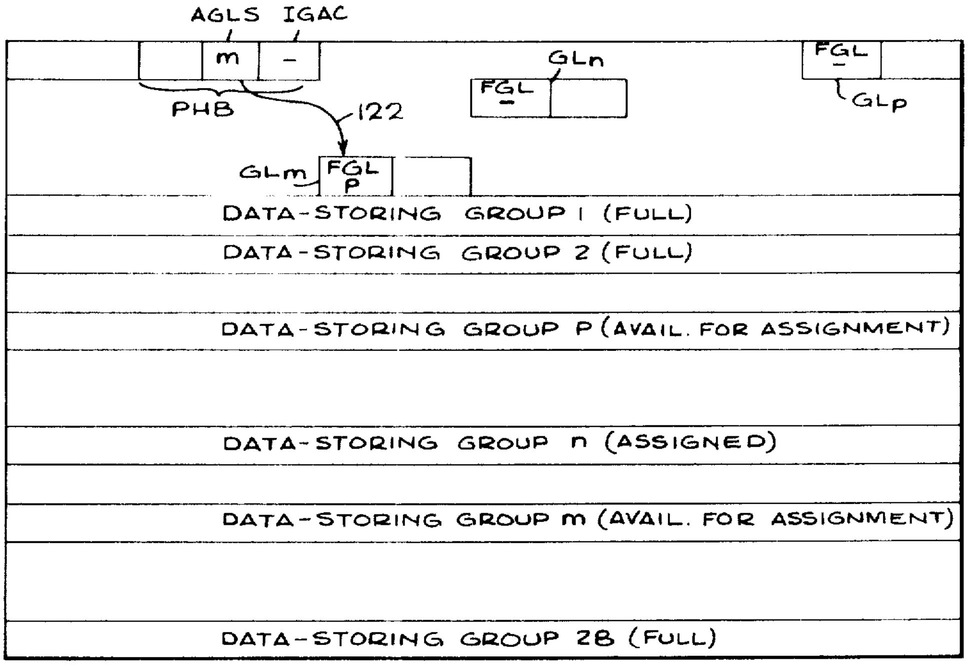

From the foregoing description of FIGS. 15*a* and 15*b* it should be appreciated that the manner in which the words GL*n* and GL*m* are used to store addresses of groups, other than those which they are associated, results in the formation of a list or string of groups. In the particular example, the string includes groups *n*, *m* and *p*. During the assignment of the top group in the string, such as group *n*, it is in a sense removed from the string in a manner analogous to that of removing a page from a page list, pointed to by the CPLP field of the SAS word, hereinbefore described in conjunction with FIGS. 12*b* and 12*c*. It should be pointed out, that the string of groups *n*, *m* and *p*, shown in FIGS. 15*a* and 15*b*, includes only data-storing groups in the same page since all the groups in the string represent groups which belong to the same page and which are available for assignment.

The system of the present invention, has the capability of forming strings of groups which include groups from different pages, all of which are assumed to be assigned to the same user and are linked together in a page list. The usefulness of such strings will be highlighted hereafter in detail. To appreciate such a capability, reference is made to FIG. 16 wherein five groups designated G*ia*, G*im*, G*jc*, G*ka* and G*jb* are diagrammed together with their associated GL words. The first lower case letter of the designation such as *i*, in G*ia*, designates the page in which the group is located, while the second lower case letter '*a*' designates the group within the page. In the particular arrangement shown in FIG. 16, group G*ia* is assumed to be the top group in the string followed by group G*im*.

Figure 16:
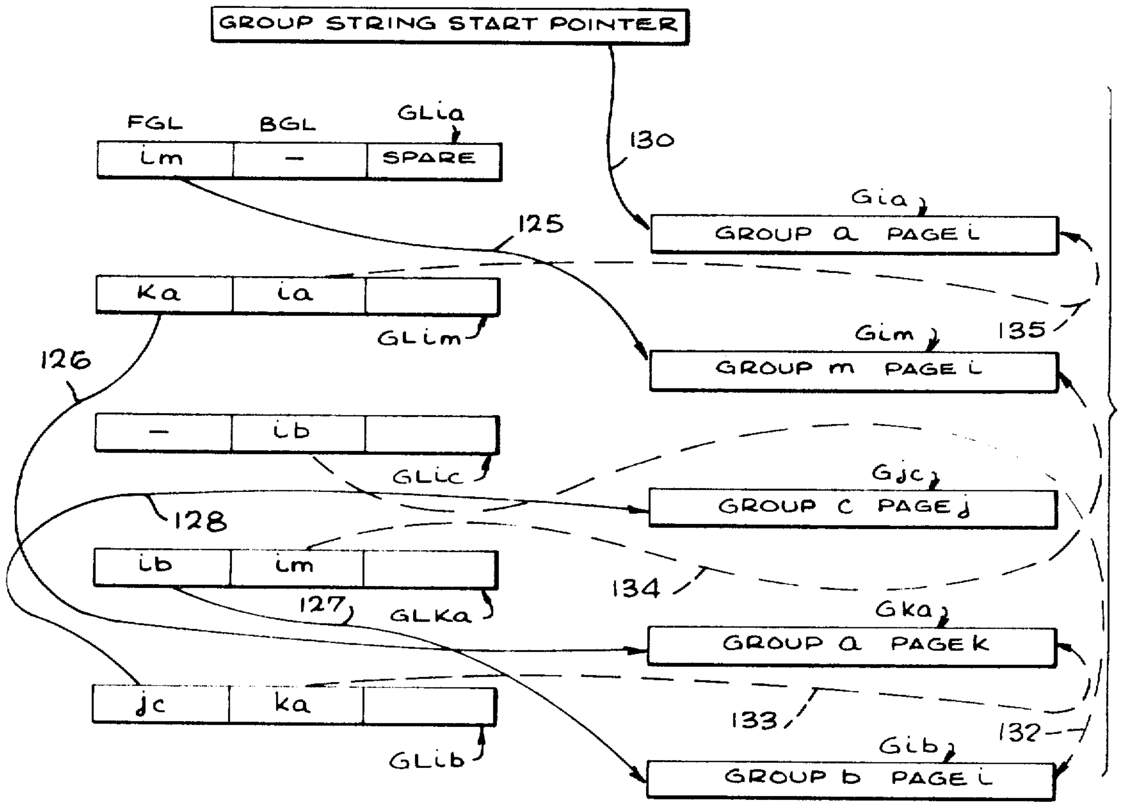
FIG. 16 is a multigroup format diagram, useful in explaining the formation of a string of groups in accordance with the teachings of the present invention.

Forward linking between the two groups is provided by storing GL*ia*, the address *im*, of group G*im*. Forward linking with succeeding groups in the string is performed in an analogous manner by utilizing the FGL field of the GL word, associated with each group, to store the address of a succeeding group in the string. This is analogous to the formation of a page list in which the PLL field of a PHA word of a page is used to store the address of a succeeding page in the list. In FIG. 16, solid-line arrows 125 through 128 represent the forward group linking between the various groups to form a string in which the order of the groups is G*ia*, G*im*, G*ka*, G*jb* and G*jc*. In the same figure, arrow 130 represents the fact that the address of the top group in the string, G*ia*, is available in a group string start pointer which may be included in a special table or in a special register in order to provide the user to which the string of groups belong means for accessing the string by addressing the top group.

In accordance with the teachings of the present invention, the system, in addition to being capable of providing forward group linking between groups in a string, is also capable of providing backward group linking between the groups in the string. That is achieved by using the BGL field of the GL word of each group to store the address of a preceding group in the string. Thus, in the example, in which group G*jc* is assumed to be the last in the string, its GL word, GL*jc* stores in its BGL field the address of a preceding group, namely, that of group G*ib*. The linking between the two is represented by arrow 132. Like backward linking is produced between the groups as represented by arrows 133, 134 and 135.

It should be pointed out that in the group string shown in FIG. 16, the string includes groups from different pages, such as pages *i*, *j* and *k*. Also, all the groups that may belong to the same page, such as page *i*, need not be successively positioned within the group string. As shown, group G*ib* does not follow group G*im*, both being of page *i*. Rather, group G*ib* follows group G*ka* which, as hereinbefore assumed and designated, represents group a in page *k*.

Once a group string is created, the system is capable of adding a group to the string. The group may be added to the end of the string or be inserted between any two groups, following a designated group. Briefly stated, in the particular example shown in FIG. 16, a group may be added to follow the last group G*jc*, or may be inserted to follow any of the other groups, not necessarily the last one.

Figure 17:
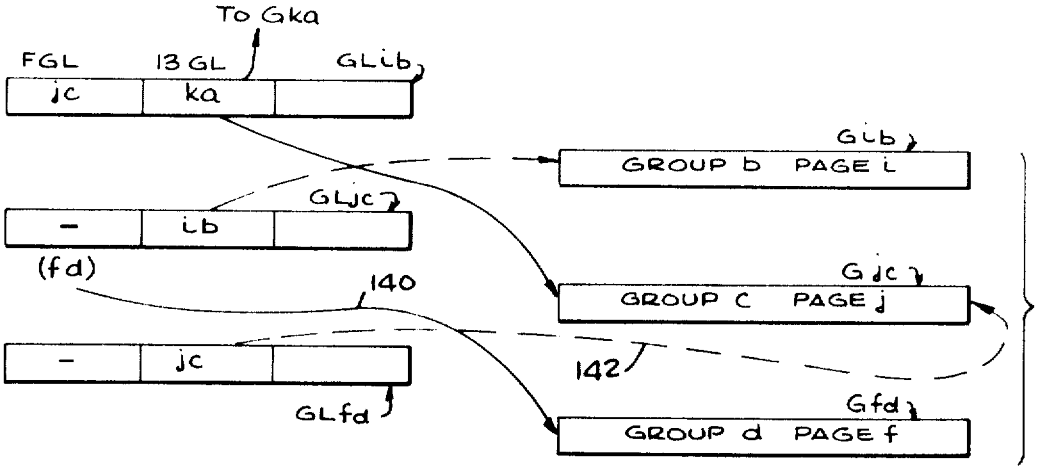
FIG. 17 is a multigroup format diagram, useful in explaining the formation of a string of groups from different pages.

The addition of a group to the end of the string may best be explained in conjunction with FIG. 17 in which the last two groups of the string shown in FIG. 16 are diagrammed. Therein, the group to be added to the string is represented by group G*fd*, representing group *d* in page *f*. Prior to adding group G*fd* to the string, since group G*jc* is assumed to be the last one, the FGL field of its GL word, GL*jc*, does not store a group address. The addition of group G*fd* to the end of the list is performed by storing the address *fd* of this new group in the FGL field of GL*jc* (as indicated in parenthesis below the FGL field of this word in FIG. 17) in order to provide the proper forward linking between the previous last group GL*jc* in the string, and the new last group in the string, namely, G*fd*. The linking is designated in FIG. 17 by arrow 140. Since group G*fd* is now the last in the list, the FGL field of its GL*fd* does not store the address of any group. However, the BGL field of GL*fd* stores the address of the preceding group, i.e., G*jc*. Such an address in the BGL field provides the backward linking between the new, last group, G*fd* in the string and the one before the last, G*jc*, as represented by arrow 142.

Figure 18:
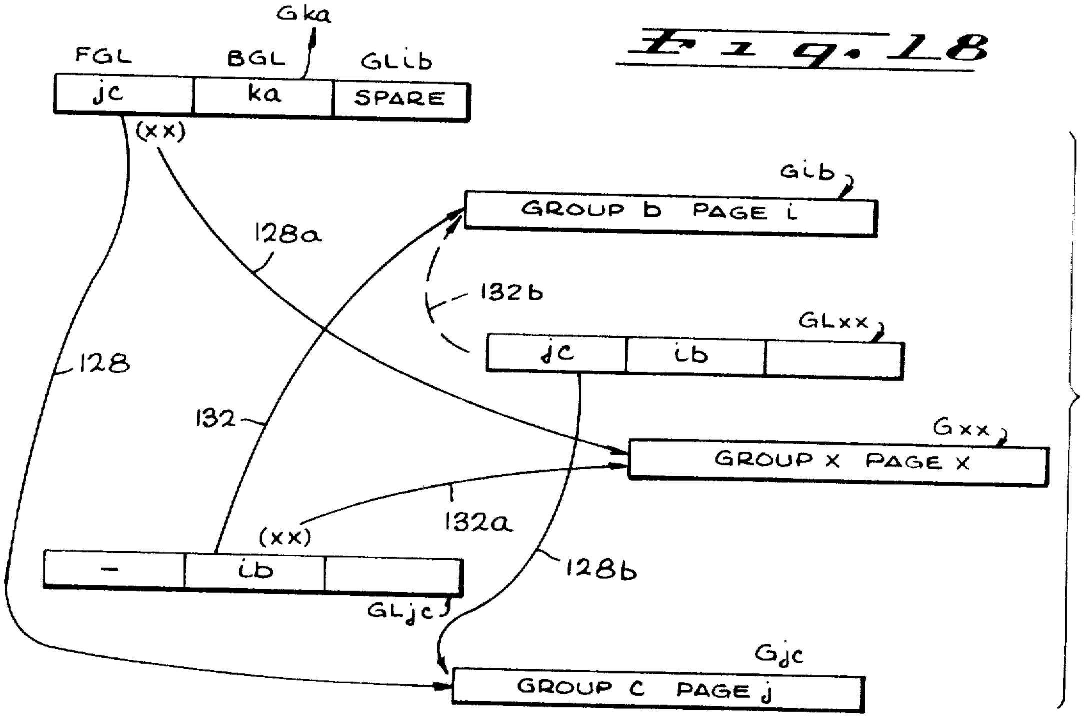
FIG. 18 is a multigroup format diagram useful in explaining the insertion of a group in a string.

While FIG. 17 is useful in explaining the addition of a group to the end of a string, FIG. 18, to which reference is made herein, is useful in explaining the insertion of a group, such as G*xx* (group *x* in page *x*) between two groups, such as G*ib* and G*jc*. As will be pointed out hereafter, when a user-commanded operation is performed which involves the insertion of a group, the group is inserted after a group, whose address is provided by the user. In the example in FIG. 18, the address which the user would supply is that of group G*ib*. In FIG. 18 arrows 128 and 132 represent the forward and backward linkings between the groups G*ib* and G*jc* before group G*xx* is inserted. After the insertion, the prior forward linking, represented by arrow 128, is replaced by linkings, designated by arrows **128*a* and 128*b*, while the previous backward linkings, represented by arrow 132, is replaced by the linkings, designated by arrows 132*a* and 132*b***.

The insertion of a group is actually performed by storing in the FGL field of the GL word associated with the inserted group G*xx*, the group address located in the FGL field of the GL word, associated with the preceding group, such as G*ib*. In FIG. 18, this address is represented by *jc*, which is stored in FGL of GL*xx*. Likewise, the group address *ib* in the BGL field of GL*jc*, associated with the group to follow the inserted group is inserted in the BGL field of GL*xx*. Then, the address (*xx*) of the inserted group G*xx* is stored in the FGL and BGL fields of the GL words associated with the groups preceding the following respectively, the inserted group.

As should be appreciated, in the insert group operation just described, the transfer of group addresses between fields of three different GL words is involved. When such a group insertion is performed by MCS 50, previously described in conjunction with FIG. 13, it is desirable to temporarily hold in the MCS all three GL words in order to minimize the time required for shifting the contents between their various fields. Since the working registers contain only one GLR in which a GL word may be stored, the two temporary address registers, TAR1 and TAR2 are utilized to store necessary fields of the two other GL words. This operation will become clearer hereafter in conjunction with specific examples to be described.

Figure 19:
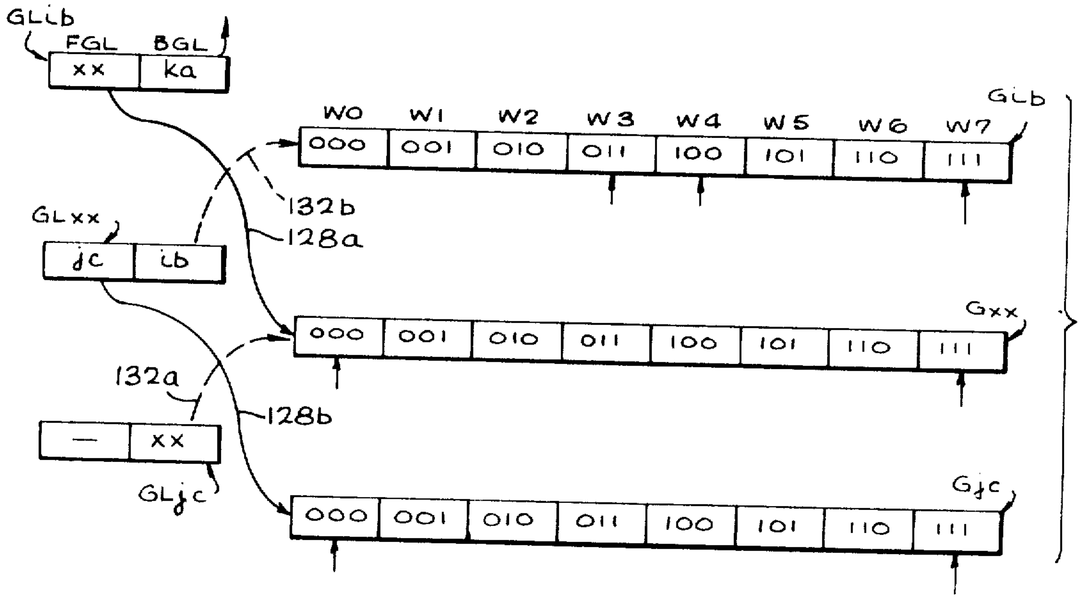
FIG. 19 is a multigroup format diagram useful in explaining the advantages of forward and backward group linking.

The advantages realized by forming a string of groups which are linked in either or both a forward and a backward direction may best be summarized in conjunction with FIG. 19, wherein the three groups, which are diagrammed in FIG. 18, with Group G*xx* inserted between groups G*ib* and G*jc*, are shown. In addition the eight words W0 through W7 of each of the groups are diagrammed in terms of the states of the three bits which represent the word address part of the RA portion, indicating their respective locations within the group.

As will be pointed out hereafter, the system is capable of performing one or more coded operations which involve a "-Follow" aspect. In performing the "Follow" aspect of the operation, an address of a word, such as W3 of G*ib* is received from a user and held in the AR (FIG. 13). The three lowest order bits of the address represent the word address part within group G*ib*. When an address is in the AR the three lowest order bits are interrogated. If they are not in an all-one state (111), it indicates that the address is not of the last word (W7) of a group. Consequently, the three bits of the AR are incremented by one, to represent the address of the next word in the group. For example, if the address received from the user is that of W3 of G*ib*, the three lowest order bits are 011. Since they are not all ones (111), the three bits of the AR are incremented by one to contain the bit pattern 100, which together with the higher order bits represent the address W4 in G*ib* The incrementing of the three lowest order bits of the AR is represented in FIG. 13 by arrow 145, and the word "-COUNT". These three lowest order bits are entered in the three lowest order bits of the AR which form a three-bit counter. The new address in the AR may then be used to read out or retrieve the word W4 of G*ib*.

If, however, the address of a last word of a group, such as W7 of G*ib*, is received, a condition sensed by detecting that all the three lowest order bits are ones (111), the system automatically retrieves from the memory the GL word GL*ib*, associated with addressed group G*ib*. Once GL*ib* is retrieved, its FGL field is interrogated. Being found to be active since it stores the address (*xx*) of group G*xx*, this address is then returned to the user. The returned address is that of W0 of group G*xx*. The "Follow" operation may continue until W6 of G*jc* is read out. Then, when the last word W7 of G*jc* is addressed, GL*jc* is retrieved to determine the address located in its FGL field. However, since G*jc* is assumed to be the last group in the string, the FGL field of GL*jc* is inactive. Thus, an inactive address is returned to the user to indicate that the end of a string has been reached.

It should be appreciated that such a group stringing technique enables one to follow the words stored in the various groups in the string in the sequence in which the groups are strung together. It should be appreciated further that this capability of following from group to group is not limited to cases in which the groups are contiguous on the same page. Rather, the ability is present regardless of the actual locations of the groups in the various pages, as long as all of them are in pages tied together in a single page list, assigned to the same user. It should be further pointed out that while the addresses in the FGL fields of the various GL words enable one to follow in a forward direction, the address in the BGL fields of the various GL words enable one to follow the words stored in the various groups in a reverse direction.

In such a case, for example, when a particular word in a group is addressed, if it is not the first word in the group, i.e., the three bits are not all zeros (000), the three lowest order bits of the address are decremented by one. Then, when the first word of a group is sensed, i.e., the three bits are all zeros (000), the GL word of the addressed group is retrieved from the memory and its BGL field is interrogated. The address therein is then used to point to a preceding group in the string. This aspect of the invention will also be described hereafter in further detail to enable those familiar with the art to practice the novel teachings disclosed herein.

The novel system of the present invention further possesses the capability of deleting any string of groups and returning it to the user for subsequent reassignment or reclamation. The system is also capable of deleting only a portion of a string of groups, starting with a group, following a designated group, to the end of the string. The manner in which a string of groups is deleted and returned to the user, for subsequent use thereby, may best be explained in conjunction with FIG. 20 to which reference is made herein. Therein, the SRLSP field of the user's PLC word is diagrammed, as well as two strings of groups designates S1, which includes groups *a* and *e*, and S2 which includes groups *c*, *f* and *h*. These two groups are assumed to have been previously deleted. As shown, the groups within each string are interlinked by means of their addresses, stored in the FGL fields of their respective GL words, as hereinbefore explained. In addition, however, the two strings are coupled together to the SRLSP field to form a tree of strings, somewhat analogous to the page list tree, hereinbefore explained in conjunction with FIG. **11*c***.

Briefly, the SRLSP field stores the address (such as *c*) of the top group of a last deleted string (such as S2). However, if a previous string (such as S1) was deleted, the BGL field of the GL word (GL*c*), associated with the group (G*c*) whose address (*c*) is stored in the SRLSP field is used to store the address, (such as *a*), of the top group (G*a*) of the previously deleted string (such as S1).

Figures 20, 22:
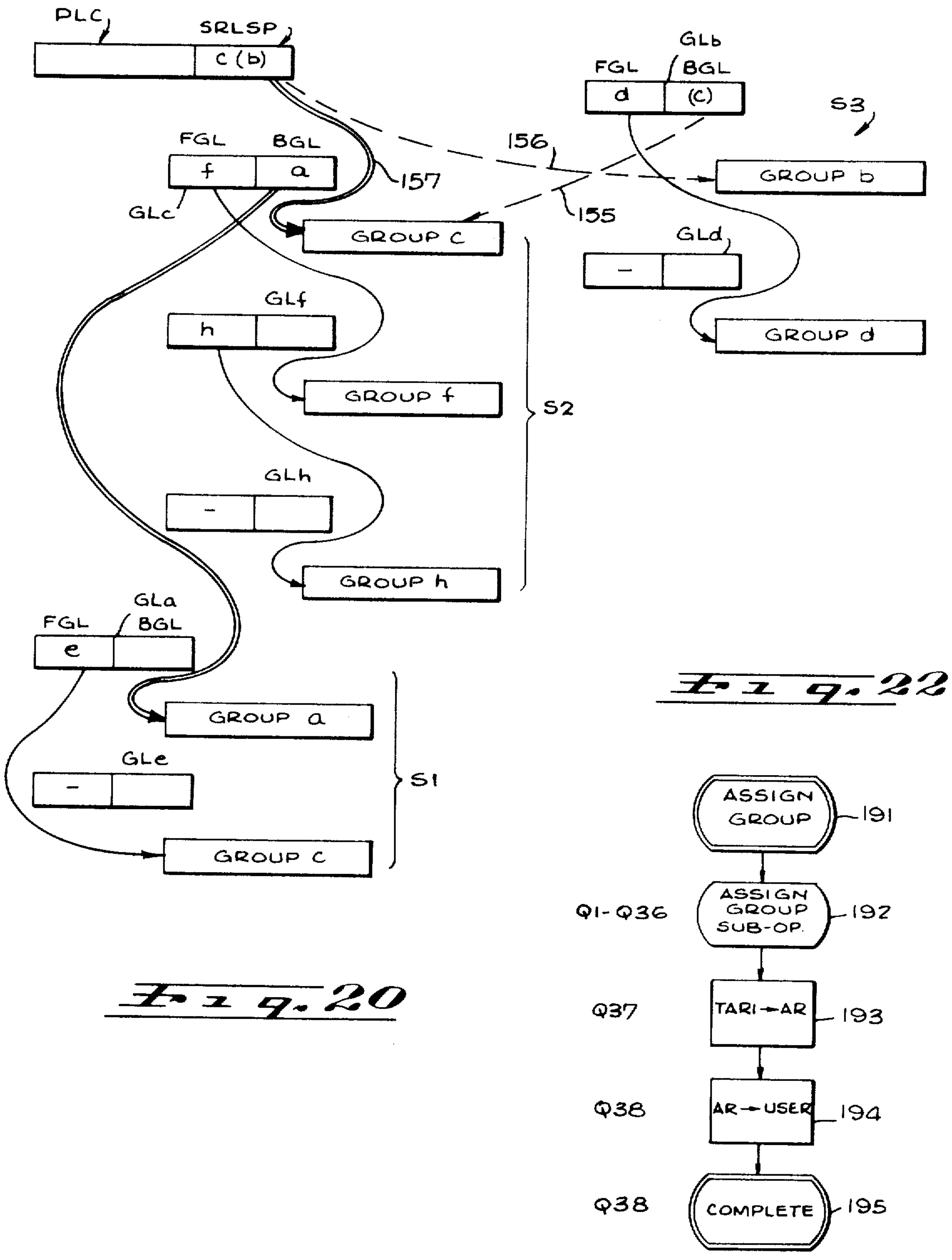
FIG. 20 is a multistring format diagram useful in explaining the deletion of strings or portions thereof.
FIGS. 22, 23 and 24 are detailed flow charts of the Assign Group operation.

Let it be assumed that when the SRLSP field points to G*c* of S2, and the BGL field of GL*c* points to G*a* of S1 by storing the address *a*, as shown in FIG. 20, the user deletes a string S3, consisting of groups *b* and *d*. The deletion of such a string is only complete after string S3 is properly linked to the SRLSP field. This is achieved by causing the latter-mentioned field to point to G*b* of deleted string S3 as shown by (*b*) in SRLSP. In addition however, BGL field of GL*b* is used to point to the top group G*c* of S2, which was previously directly pointed to by the SRLSP field content.

Such new linkings are easily accomplished by placing the content of the SRLSP field, i.e., the address *c* in the BGL field of the GL*b* which is associated with group *b*, the top group of the newly deleted string S3. Such a step provides linking between the newly deleted string S3 and the previous last deleted string S2. This is represented in FIG. 20 by arrow 155. Then, the address *b* of group *b*, the top group in the newly deleted string S3, is inserted in the SRLSP field to point to the top group of the last deleted string, S3. The pointing is represented in FIG. 20 by arrow 156. Thus, the function of the SRLSP field is to store an address of the top group of a last deleted string. The BGL field of the GL word of such a top group is in turn used to point to the top group of a previously deleted string. In essence, the addition of the deleted string S3 to the treelike structure of strings, pointed to by the SRLSP, is performed by substituting the linkings, represented by arrows 156 and 155 for a prior linking, represented in FIG. 20 by arrow 157.

The treelike structure of deleted strings, which is pointed to by the SRLSP field of the PLC word of a user is analogous to the treelike structure of page lists which are pointed to or coupled to the TLP field in the SAS word, as previously explained in connection with FIGS. 11*c* or 12*a*. It should be stressed, however, that the pages in the various lists, forming the tree coupled to the TLP field, belong to the system as a whole. And, when a need for a page assignment arises, a page from any of the lists which is transferred from the TLP field to the CPLP field of the SAS word may be assigned to any user. However, in the strings forming the tree structure, coupled to the SRLSP field of a PLC word of a particular user, groups from those deleted strings could only be reclaimed and reassigned to the specific user. This is accomplished in the present system by performing an automatic group reclamation operation in which the groups in the deleted strings are individually and separately separated from the tree structure and returned to their respective pages for potential subsequent reassignment.

In the example shown in FIG. 20, let it be assumed that string S3 is properly connected to the tree structure so that the SRLSP field, in a sense, points to S3 which in turn points to S2 which in turn points to S1. During the reclamation operation, the first group to be reclaimed is group *b*, the top group of string S3, the top string. This is accomplished by returning the group *b* to its respective page by adding it to the group of strings in its page which are pointed to by the AGLS field of the page's PHB word, as hereinbefore described in conjunction with FIG. 15*a*. Let it be assumed, that the page shown in FIG. 15*a* contains three groups *n*, *m* and *p* which are available for assignment and that the AGLS field of the PHB word contains the address of group n as shown and that group *b* of S3 belongs to that page. Group *b* would be reclaimed by being added to the page for subsequent assignment by storing its address, *b*, in the AGLS field of the page's PHB word and by using the FGL field of the GL*b* to store the address *n*. This is necessary in order to provide proper linking between the newly added group *b* and the previous groups (*n*, *m* and *p*) in the page which are available for assignment.

Once group *b* is removed from the deleted string S3 it is necessary to provide new linkings between the SRLSP field and the remaining groups in S3 as well as proper linking between S3 and the other strings S2 and S1. For the example shown in FIG. 20, this is achieved by placing the address of group *d*, which follows group *b* in S3, in the SRLSP field and by using the BGL field of GL*d* to store the address of group *c*, which is the top group of string S2. As seen in FIG. 20, the addresses of group *d* and group *c* are located in the FGL and BGL fields, respectively, of the GL*b*. Thus, the new linking is provided by merely transferring the address *d* from the FGL field of GL*b* to the SRLSP field and transferring the address in the BGL field of the GLb to the BGL field of the GL*d*.

The automatic reclamation of groups proceeds to sequentially return or reassign each group to its respective page. After all the groups of S3 are returned, the operation proceeds to sequentially reclaim or reassign the groups in the next string, i.e., S2 at the end of which the groups in string S1 are reclaimed. In summarizing the system's capability of deleting strings of groups and then reclaiming the individual groups by returning them to their respective pages for subsequent reassignment, it should be pointed out that since the strings of groups comprise only groups in pages, linked together by a page list which is assigned to the same user, the deletion of strings and the reclamation of groups is performable on a user rather than a system basis. That is, the strings are returned to the user by utilizing the SRLSP field in its PLC word. Then, when time is available, an automatic reclamation of groups is performed by separating the various groups in the deleted strings and returning them one at a time to their respective pages, assigned to the same user for subsequent reassignment thereto. Again, it should be stressed that the string deletion and group reclamation involve the transferring of addresses between various control words, which as hereinbefore explained are retrievable from the memory and storable in their respective working registers or in the temporary address registers, hereinbefore explained in connection with FIG. 13. Thus, both string deletion and group reclamation are performable at high speeds.

The foregoing described system capabilities are utilized to perform any one of a plurality of coded operations which any of the users, which the system is designed to serve, may request or command. The user in communication with the system always provides its number to the MCS 50 (See FIG. 13) via bus 110, while at the same time it provides the code of the desired operation via bus 68. Some of the operations may involve the supply of data to the MCS 50, via bus 100, and/or an address via bus 105. The operation code received by the OCR of the MCS 50 is decoded by decoder 66 and is supplied to the MCS control unit 65. It is the latter that controls the MCS 50 to perform the operation indicated by the supplied code. In the following Table 2 are listed various operations and their respective codes, which any of the users may request to be automatically performed by the MCS 50 at clock cycle speeds.

TABLE 2

| OPERATION | CODE |
|---|---|
| Assign Group | 0001 |
| Insert Group | 0010 |
| Delete Page List | 1110 |
| Delete String | 1101 |
| Delete to End of String | 1100 |
| Store Only | 1001 |
| Store and Assign | 1000 |
| Store and Insert | 1010 |
| Fetch Only | 0111 |
| Fetch and Follow | 0100 |
| Follow and Fetch | 0110 |
| Fetch and Reverse Follow | 0011 |
| Reverse Follow and Fetch | 0101 |

Since one of the primary novel features of the present invention is related to the system's capability of dynamically assigning group or space to a requesting user by means of the MCS's hardware, attention will now be directed to the steps involved in the performance of an Assign Group Operation. The terms space and group may be used interchangeably. In accordance with the teachings of the present invention it is assumed that a user, if desired, may request the assignment of a group without indicating any preference as to the page from which the group should be assigned. However, a user may provide the address of a preferred page from which space should be assigned if space is available therein. Thus, in the latter case, the requesting user, in addition to providing the code of the Assign Group operation, also provides the address or number to the AR of the preferred page. For the following description, it is further assumed that when an Assign Group operation is requested a group is assigned from group space which is available in previously assigned pages to the user, which form the user's page list, rather than from a new assigned page. That is, the system automatically determines the availability of space in previously assigned pages and assigns a group to the user. Only when all the previously assigned pages are full is an attempt made to add a page to the user's list and assign a group from the new added page. The various conditions or cases which may exist when an Assign Group operation is requested by a user, as well as the various steps necessary to assign a group, based on such conditions, are best summarized as follows

ASSIGN GROUP

Case A. User Does Not Provide an Address of A Preferred Page From Which the Group Should Be Assigned.

1. Page List Exists
   a. Space Available List (SAL) Active
      i. Assign a group from the top page in the SAL in which space is available.
      ii. Return address of assigned group to user.
   b. Space Available List (SAL) Inactive
      i. Assign a page (from SAS word).
      ii. Add the page to Page List and the SAL.
      iii. Assign Data-Storing Group 1.
      iv. Return Address of Data-Storing Group 1 to user.
2. Page List Does Not Exist
   a. follow Steps A1*bi*–A1*iv*

Case B. User Designates Preferred Page

1. Space is Available in the Designated Page
   a. Assign a group
   b. Return address to user
2. Space Unavailable in Designated Page
   a. Space Available List Active
      i. Perform steps A1*ai* and A1*ii*
   b. Space Available List Inactive
      i. Perform steps A1*bi* through A1*iv*

When an Assign Group operation is requested without providing the address of a preferred page from which the group should be assigned (CASE A), it is first necessary to determine whether group space is available in any of the pages which may have been assigned to the user. Clearly, if a page list does not exist it indicates that pages have not been assigned to the user as yet. Consequently, no group space could be available. However, even if a page list is in existence space may not be available, if all the pages are full. This determination is made by retrieving the user's PLC word and interrogating its SALSP field which is active whenever a Space Available List (SAL) is present. Assuming that the SALSP field is active, i.e., the SAL is active, it is utilized to locate the first or top page in the SAL which has group space available for assignment.

It should be pointed out that in the present invention it is assumed that once a page is added to the SAL of a user, it remains as part of the list even though at some time subsequent to its addition to the list all its group spaces have been assigned. Such a page, however, is deleted from the SAL during the Assign Group operation. Thus, a page is addable to the SAL and remains part thereof until an attempt is made to assign a group therefrom and the page is found to be full. For discussion purposes, however, let it be assumed at this point that when the SAL is active (Case A1*a*) one of the pages in the list contains available group space. In such a case, the system automatically assigns a group from such a page (A1*ai*) and thereafter returns the address of the assigned group to the user, thus completing the operation.

If, however, the SAL if found to be inactive, i.e., SALSP is inactive, it indicates that all the previously assigned pages to the user are full. Consequently, the steps of case A1*b* need be followed. That is, it is necessary to assign a page to the user, if it is determined from the SAS word that a page is available for assignment. Assuming that the page is available, it is first added to the page list as explained in conjunction with FIG. 7. The page is also added to the Space Available List, since at this point all its data-storing groups are available for assignment. Then, the first data-storing group of the newly assigned page is assigned (by incrementing its IGAC, as previously explained in connection with FIG. 14) and the address of data storing group 1 of the new page, is returned to the user. These steps are summarized in lines A1*bi* through A1*iv*.

As shown in Case A2, it is possible for the Assign Group Operation to be commanded by a user who does not have a page list. That means that either the user has not been assigned a single page as yet, or that all the previous pages assigned thereto, and which form a page list have been deleted by the user and returned to the system. In either case, all the steps shown under case A1*b* are performed.

It should be pointed out that whenever the Assign Group operation involves the assignment of a new page to a user, either to be added to an existing page list, or to form the first page of a list, a possibility exists that all the pages of the memory have already been assigned to other users. This would be evident if all three fields of the SAS word are inactive. In such a situation, a "Memory Full" signal is supplied to the user to indicate that even though a request was made for the assignment of a group, the system is unable to assign a group since the pages previously assigned to the user, if any, are full, and the rest of the pages in the memory are already assigned.

Case B in the foregoing list designates the situation where the user designated a preferred page form which a group should be assigned. Two possible conditions may exist under such circumstances. One is that the designated page contains space available for assignment. In such a case, a group is assigned from the designated page and the address returned to the user, as shown in steps B1*a* through B1*b*. If, however, as shown in Case B2, even though the user designates a page, the page is found to be full, and no space is available therein for assignment, the system proceeds to assign a group as if the user did not provide any preferred page designation. In such a situation, the steps shown under A1*a* or A1*b* are performed.

Figure 21:
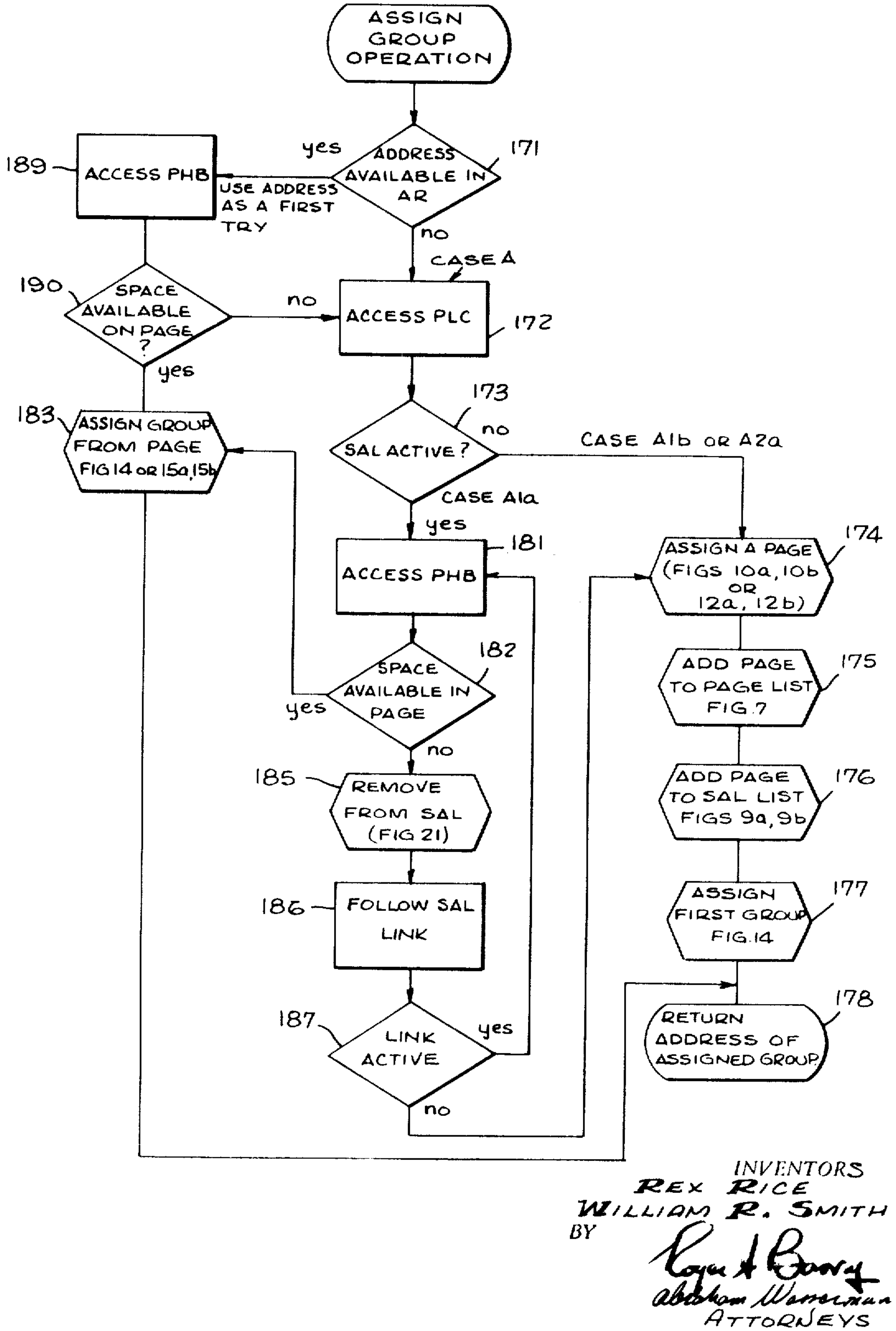
FIG. 21 is a basic flow chart of the Assign Group operation.

The foregoing described Assign Group operation and the different conditions under which it may have to be performed may best be summarized in connection with FIG. 21 which is a simplified flow chart for the Assign Group operation. The flow chart is of the type well known and extensively used by those familiar with computer operations and their programming. In FIG. 21, different numerals are used to designate the various blocks of the flow chart, which designate only selected steps performed during the operation.

As seen therefrom, in the first step (block 171) which is performed a determination is made whether an address is available in the AR. An address is available therein if the user designates a preferred page from which a group should be assigned. Assuming that no address is available, thereby indicating the lack of a page preference by the user, the user's PLC word is accessed (block 172) and is temporarily stored in the PLCR (see FIG. 13) of the MCS 50. The SALSP field of the PLC word is then interrogated to determine whether an active space available list (SAL) is in existence (block 173). If the field is inactive, it indicates that none of the pages, which may have been previously assigned to the user, contains available space. Consequently, the steps shown in Case A*b* are performed. That is a page is first assigned to the user from the SAS word, as hereinbefore explained in connection with FIGS. 10*a*, 10*b*, 12*a*, and 12*b*. If a page is not available for assignment, a "Memory Full" signal is supplied to the user. Assuming, however, that a page is available and is assigned, either from the IAC field (See FIGS. 10*a* and 10*b*) or from the CPLP field (See FIGS. 12*a* and 12*b*), the page is added to the user's page list (block 175), as hereinbefore explained in conjunction with FIG. 7. It should be pointed out that if a page list is not in existence for the user, the assigned page would form the first page of a list by having its number or address entered in the PLSVA field of the user's PLC word. In addition to adding the page to a list, if one is in existence, the page is also added to the user's space available list (block 176), as hereinbefore explained in connection with FIGS. 9*a* and 9*b*. Thereafter, data storing group 1 of the newly added page is assigned (block 177). The assignment of the first group of the new page has been described hereinbefore in connection with FIG. 14. The address of this assigned group is placed in the AR and is supplied to the user (block 178) via bus 105 (See FIG. 13). Thus, the Assign Group operation is completed.

If, however, in interrogating the SALSP field of the PLC word (see block 173) the field is found to be active, the steps hereinbefore explained in connection with Case A1*a* are performed. That is, the PHB word of the page whose address is located in the SALSP field, such as P4 shown in FIG. 9*b*, is retrieved and transferred to its respective PHBR of the working registers (block 181). Once the PHB word of the top page in the space available list is available in its respective working register PHBR, its IGAC and AGLS fields are interrogated (block 182) to determine whether space is available in the page. If it is, a group is assigned therefrom (block 183). If all the groups in the page have not been initially assigned as yet, so that its IGAC is active, a group is assigned from the IGAC, as hereinbefore explained in conjunction with FIG. 14. If, however, all the groups have been initially assigned, as indicated by an inactive IGAC field, a reclaimed group is assigned from the AGLS field, in a manner as hereinbefore explained in connection with FIGS. 15*a* and 15*b*. The address of the assigned group is then returned to the user (block 178).

In the present system, it is possible that the SAL may be active and yet no space is available in any of the pages in the list. This can occur since, as hereinbefore explained, pages are added to the SAL whenever they are added to the page list, but they are not automatically deleted from this list as soon as they are filled up. Rather, they are deleted from the SAL if, in attempting to assign a group therefrom, they are found to be full. In the SAL, shown in FIG. 9*b*, the list is shown comprising pages P4, P3 and P2. In the foregoing description in connection with FIG. 21 it has been assumed that when interrogating the IGAC and the AGLS fields of the PHB word of page P4, which is the first page in the SAL, space is available therein (see block 182). If, however, the two fields of the PHB word are both inactive, thereby indicating that space is not available in the page, page P4 has to be removed from the SAL (block 185). The removal of P4 from the space available list is performed in a manner analogous with the removal of a page from a page list connected to the CPLP field of the SAS word, as hereinbefore explained in connection with FIG. 12*b*.

In the presently described example, the address of P3 (see FIG. 9*b*) which is located in SALL field of the PHB word of P4 is transferred and stored in the SALSP (block 186 in FIG. 21). Then, the SALSP is again interrogated (block 187). Found to be active, since it now contains a meaningful address of P3, the operation proceeds to access the PHB word of P3 as shown in block 181. Then, if page P3 contains available space (block 182) a group is assigned therefrom (block 183). If however, P3, like P4, is found to be full (in the step represented by block 182), it is in turn removed from the SAL and the address of P2 is inserted in the SALSP field. It in turn is used to retrieve its PHB word in order to determine whether space is available therein.

If P2, like P3 and P4 which preceded it, in the SAL and have been previously deleted therefrom, is found to be full, the content of the SALL field of its PHB word of P2 is stored in the SALSP field. However, since P2 is the last page in the SAL, the SALL field of its PHB word of P2 does not contain a meaningful address. Consequently, when the SALSP field is interrogated (block 187) and found to be inactive it indicates that all the pages previously forming part of the SAL are full. Consequently, the Assign Group operation proceeds to assign a page to the user (block 174), as if the user did not have an active Space Available List (SAL).

The following described steps are performed for all the possible conditions under Case A in which the user does not provide an address of a preferred page from which a group should be assigned. If, however, the user designates a preferred page (Case B), when interrogating the content of the AR (block 171) a valid address is found therein. The address is that of the preferred page. Consequently, the system proceeds to access the PHB word of the user-designated page (block 189) and store it in its corresponding working register PHBR. The IGAC and AGLS fields of the PHB word are then interrogated to determine whether space is available in the designated page (block 190). If space is available, a group is assigned therefrom (block 183), as hereinbefore explained. If, however, in interrogating the IGAC and AGLS fields of the PHB word of the designated page (block 190) both fields are found to be inactive, thereby indicating that neither initial groups nor reclaimed groups are available for assignment, the system continues to access the user's PLC word (block 172) as if the user never designated a preferred page from which space should be assigned.

From the foregoing description, the Assign Group operation may be summarized as comprising the operation of assigning a group to a user by providing it with an address of a group. The operation proceeds to assign a group to the user from pages previously assigned thereto, which have group space available for assignment. Only if no such space is available is a new page added to the user, if a page is available in the system, as determined by its SAS word. The operation may further attempt to assign a group to the user from a specifically designated, preferred page, if such a page has space available, before proceeding to assign a group from another page if the designated preferred page is found to be full.

Another operation which the system is capable of performing is the Insert Group operation which in Table 2 is represented by a code 0010. Briefly, in this operation the system proceeds to assign a group to the user, as hereinbefore explained. In addition, however, it links the newly assigned group to a group whose address is supplied by the user, to form a string of groups. If the group designated by the user is the last group in a string, such a group G*jc* in FIG. 17, the newly assigned group is added to the end of the string, as hereinbefore described in connection with the addition of group G*fd* to the bottom of the string, shown in FIG. 17. If, however, the designated group is not the last group in a string such as group G*jb* in FIG. 18, the assigned group is inserted into the string, in a manner identical with the insertion of group G*xx*, as hereinbefore described in connection with FIG. 18. Thus, the Insert Group operation is the same as the Assign Group operation plus the addition of the linking of the assigned group to a specific group whose address is provided by the user.

As shown in Table 2, the system is capable of performing several operations involving deletion. The Delete Page List operation, coded 1110, involves the deletion of the complete list of pages assigned to a user, in a manner as hereinbefore explained in connection with FIG. 11*b*. The Delete String operation, coded 1101, involves the deletion of a complete string of groups. This operation is performed by linking the top group of the string to be deleted to the SRLSP field of the user's PLC word, as hereinbefore described in connection with FIG. 20. The system further is capable of performing a Delete To End of String operation, coded 1100. In this operation, only a portion of a string, following a designated group whose address is supplied by a user, is deleted. This operation is easily performed by utilizing the group address, supplied by the user, to retrieve the GL word, associated with such a group, and use the content of the FGL field of the GL word to point to the next group, which now represents the top group in the portion of the string to be deleted.

As seen from Table 2, the system of the present invention is capable of performing several coded operations which include a "Store" aspect. In each one of these the requesting user provides the MCS 50 with a data word which is supplied to the DR, via bus 100, and word address which is supplied to the AR via bus 105. When a Store Only operation is commanded, the MCS 50 performs an operation which is identical with a Write operation in any conventional computer. In the present case, the word in DR is transferred to the MDR and the address in the AR is transferred to the MAR. Then a Write control signal is provided by unit 65 and the received word is stored at the address supplied by the user.

The Store and Assign operation comprises two parts. In the Store part, a word received from the user, is stored at the address provided thereby, just as is done in the case of a Store Only operation. However, in Store and Assign, after the received word is stored, the Assign part is performed. In it, the address received from the user is interrogated to determine if it represents the address of the last word (W7) of a group. If it does not, the received address is incremented by one to represent the address of the next word in the addressed group. The new address is returned to the user. If, however, the received address is that of the last word of a group, the group's GL word is retrieved to locate the address of a group which succeeds the addressed group in a string of groups. It is the address of the first word (W0) of the succeeding group which is returned to the user. The capability to follow down a string of groups has been described in connection with FIG. 19.

If, however, when retrieving the GL word of the addressed group it is found that the addressed group is the last group in a string, a condition represented by an inactive FGL field of such a GL word, an Assign Group operation is undertaken. Then, assuming that a group is available for assignment, the assigned group is linked to the addressed group to form a string of groups in which the new assigned group follows the addressed group. Such group linking has been described in connection with FIG. 17. It is the address of the first word of the newly assigned group which is returned to the user after the new group is linked to the original addressed group.

In Store and Insert operation, similar steps are performed. However, in this operation when the address supplied by the user is found to be that of a last word in a group, the group's GL word is not retrieved to obtain the address of a following group if one is in existence. Rather, when the address supplied by the user is found to be that of a last word of a group, an attempt is made to insert a new group after the addressed group. Clearly, a group can be inserted only if a group is available for assignment. Assuming, however, that one is available, the new assigned group is inserted after the addressed group in a manner as described in connection with FIG. 18.

The Fetch Only operation is the same as a conventional Read operation. In the present invention, the requesting user supplies a word address to the MCS 50 via bus 105. The address is transferred to the MAR and then a Read control signal is provided. The word at the received address is transferred to the MDR and therefrom to the DR to be supplied to the user via bus 100.

In the Fetch and Follow operation, the Fetch part is the same as the Fetch Only aspect. However, in Fetch and Follow in addition to supplying the user with the word located at the address received therefrom, the Follow part is performed in which an address which is related to the received address is supplied to the user. The Follow aspect has been described in connection with FIG. 19. That is, if the address from which the word is fetched is not that of the last word in a group, the address of the word following the fetched word is returned to the user. If, however, the addressed word is the last in a group, the address of the first word of a following group is returned.

The Follow and Fetch operation is similar to the Fetch and Follow except that the address which is received from the user is used to obtain a following address from which a word is fetched. In Fetch and Reverse Follow a word is fetched from the address received from the user. However, the address which is returned to the user is that preceding the address received therefrom. When the received address is of a first word in a group, the address of the last word in a preceding group in a string is returned to the user. In Reverse Follow and Fetch, the address which is received from a user is used to obtain a preceding address from which a word is fetched.

From the foregoing description it should be appreciated that all the operations including Store and Assign, Store and Insert, Fetch and Follow and Follow and Fetch are capable of being performed by the system of the present invention due to its capability of forming strings of groups which are linked together by means of their GL words in the forward direction. Likewise, the capability of linking groups together in the backward direction enables the system to perform the Fetch and Reverse Follow and the Reverse Follow and Fetch operations.

The advantages which are derivable from the ability to form a string of groups which may belong to different pages (See FIG. 16) and use such a string to store words which are sequentially supplied by a user or retrieve words in a sequence defined by the string, should be apparent to those familiar with the art. In the prior art, if a selected succession of words has to be stored, a discrete portion of a memory with contiguous locations must be employed. If the locations are not contiguous, special programming steps must be taken to relate the various noncontiguous locations. In the present invention, all of these limitations are eliminated by the ability to form a string of groups which need not be contiguous nor be part of the same page. Yet the groups are linked together as if they were contiguous groups in the same page.

The manner in which the MCS 50 controls the performance of each coded operation (See Table 2) may best be explained by describing the unique sequence or sequences of steps which the MCS 50 controls by means of unit 65 for each operation. Although in FIG. 13, unit 65 is shown as a single block it should be thought of as comprising a separate control unit for each operation. The control unit which is used depends on the operation code which the user supplies the MCS 50 (FIG. 13) and which is decoded by decoder 66. Thus, for example, the control unit for the Assign Group operation is used when the decoded operation code indicates that such as operation is requested. For each of these operations it is assumed that the user provides the MCS 50 with its number in the UNR (FIG. 13).

The step sequences for each operation will be diagrammed as flow charts in which double-line oval-shaped blocks are used to designate the beginnings and ends of complete sequences of steps or operations. The beginnings and ends of subsequences or suboperations are designated by single-line oval-shaped blocks. Diamond-shaped blocks are used to designate steps in which the states of the various activity bits (AB's) associated with the various fields of the control words, shown in FIG. 5, are tested. As previously stated, an activity bit (AB) is active or valid if a meaningful address is located in its corresponding field. Rectangularly shaped blocks designate various steps. These may involve the transfer of the content of one or more fields from a designated register to one or more fields of another register. Arrows in these blocks point the transfer direction. Rectangular blocks are also used to designate a Write operation or step in which a data word, stored in the MDR (See FIG. 13), is written into the memory matrix at a location designated by the address in the MAR. A rectangular block is also used to designate a Read operation or step in which a word, located at the address specified by the address in the MAR, is read out into the MDR. The sequences of steps necessary to perform each of the operations listed in Table 2 will be described in the order of the operations in the table under a separate heading. The figures in brackets near each heading designate the figures in conjunction with which the operation is described.

ASSIGN A GROUP (FIGS. 22, 23, 24)

Figure 23:
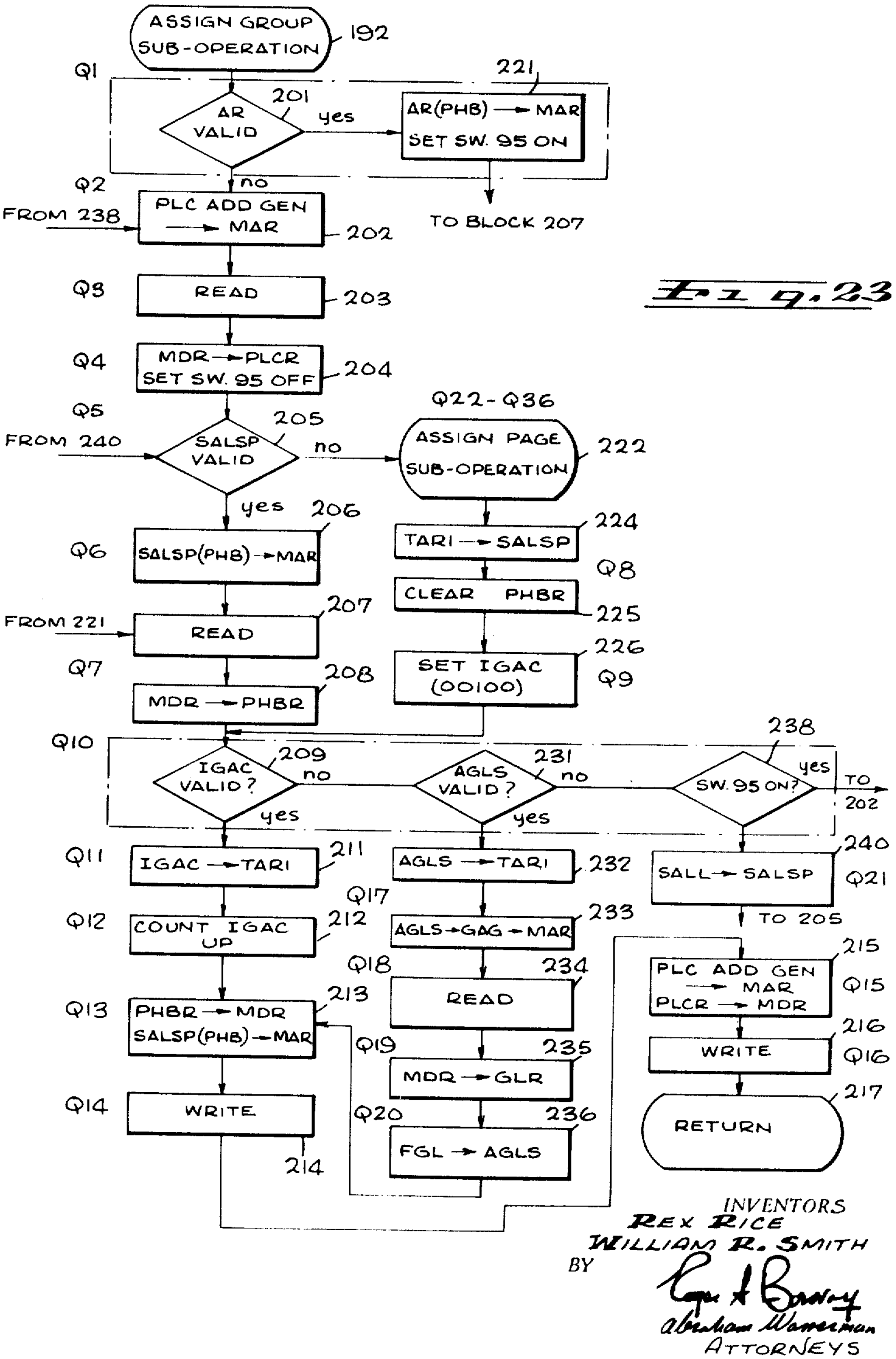
Figure 24:
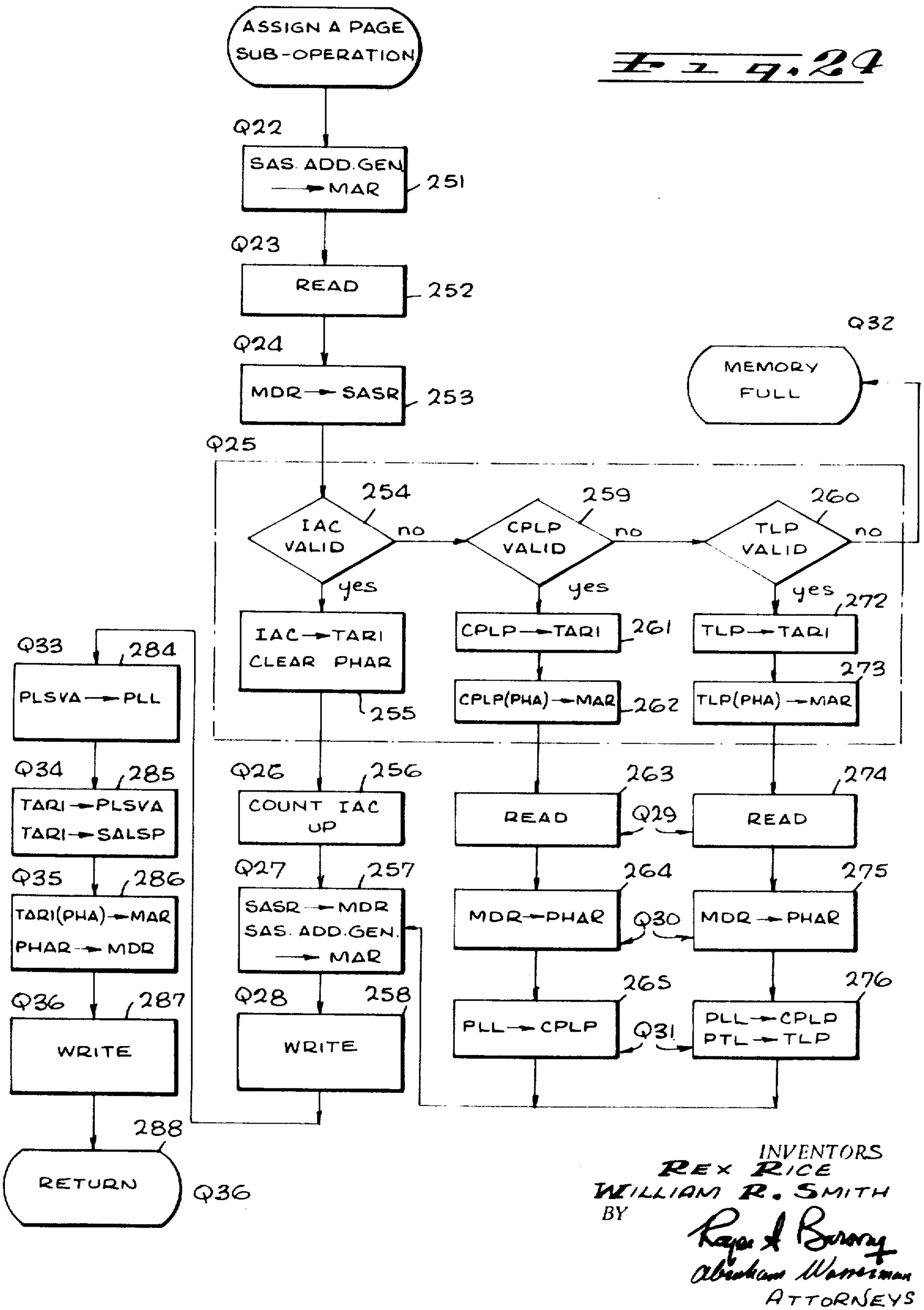

Reference is now made to FIGS. 22, 23 and 24, wherein FIG. 22 comprises the flow chart of the steps necessary to perform a complete Assign Group operation. FIG. 23 is the flow chart representing the sequence of steps necessary to perform an Assign Group suboperation, required in the performance of the Assign Group operation, as well as in the Insert Group, Store and Assign and Store and Insert operations. FIG. 24 is a flow chart representing the sequence of steps necessary to perform an Assign Page suboperation, which is required whenever a group has to be assigned to a requesting user and all the pages previously assigned thereto are found to be full, thereby creating the need for the assignment of a new page.

As seen from FIG. 22, the sequence of steps needed to perform the Assign Group operation, the start of which is represented by block 191, starts with the sequence of steps performed in the Assign Group suboperation, indicated by block 192. At the end of this suboperation, the address of the assigned group is located in TAR1. Thereafter, the content of TAR1 is transferred to the AR, a transfer which is represented by the arrow in block 193. The content of the latter is then transferred to the requesting user (block 194) via bus 105. This completes the Assign Group operation, as represented by block 195. The Assign Group suboperation is assumed to be performed during Q1–Q36 clock periods, while the steps represented by blocks 193, 194 and 195 are assumed to be performed during periods Q37 and Q38 as will be explained hereafter in conjunction with examples of logic circuitry of the type which can be incorporated in unit 65 to provide the necessary sequences of control signals.

As seen from FIG. 23, the first step performed in the Assign Group suboperation, involves the checking of the validity of the AR (block 201), to determine whether a valid address is located therein. This step is performed during clock period Q1. Q2–Q36 in FIG. 23 indicate the periods during which the other steps are performed. A valid address is located in the AR only if the requesting user, in addition to requesting that a group be assigned thereto, also provides an address of a page from which the group should preferably be assigned if space is available therein. Assuming that no such designation is provided by the requesting user, the AR is found to be invalid, as represented by the word "NO" below block 201. The next series of steps involves the retrieval of the requesting user's PLC word from memory and its insertion into the PLCR of the General Working Registers.

In the first step in said series, the user's number, decoded by decoder 72 (FIG. 13), is used to actuate the PLC address generator 70, to provide and supply the address of the requesting user's PLC word in the memory matrix to the MAR, (block 202). Thereafter, a Read operation is performed (block 203) in which the requesting user's PLC word is transferred from memory to the MDR. Then, the content of the MDR is transferred to the PLCR (block 104) and the switch 95 (FIG. 13) is set to OFF.

Once the PLC word of the requesting user is in the PLCR, the validity of any one of the three fields thereof, shown in FIGS. 5 and 13, as PLSVA, SALSP and SRLSP, may be determined by checking the validity of their corresponding activity bits. The validity of the activity bit of field SALSP is checked (block 205) to determine whether a valid page address is stored therein. A valid page address exists only if a Space Available List (SAL) is in existence for the user, with the page whose address is in the SALSP being the top page of the list. Assuming that the bit is valid, as represented by the word "YES" below block 205, the content of the SALSP field is transferred to the MAR to provide the PN address portion. At the same time PHB generator 80 is activated to provide the MAR with the RA portion of a PHB word. The double transfer to the MAR is represented by SALSP (PHB)MAR (block 206). Consequently, at the end of this step during Q6, MAR stores the address of the PHB word of the page whose address is stored in the SALSP, namely, the top page in the SAL. This word is then retrieved from the matrix and placed in the MDR by performing a Read step (block 207). Then, the content of MDR is transferred to the PHBR of the Working Registers (block 208). Thus, at this point the PHBR of the top page in the SAL in in the PHBR. This is analogous to the point between blocks 181 and 182 in FIG. 21.

As previously explained, the PHB word associated with each page includes two fields, designated IGAC and AGLS. The former, comprising a counter, is used in the initial assignment of groups in the page (See FIG. 14), while the latter is used in group reassignment (See FIGS. 15*a* and 15*b*). Once the PHB word of the page whose address is stored in the SALSP field of the PLC word is in its appropriate register, i.e., in PHBR, the content of the IGAC field is checked for validity. Namely, it is checked to determine whether a group is available in said page for initial assignment. This check is represented in FIG. 23 by block 209. Assuming that this is the case, as represented by the word YES below block 209, the group address, located in the IGAC field in register PHBR is transferred to a corresponding field in TAR1 (block 211), and the IGAC is incremented by one as explained in conjunction with FIG. 14. The incrementing is performed by the step represented by block 212. Thereafter, the two words in registers PHBR and PLCR are ready to be returned to the memory.

As shown in FIG. 23, the content of PHBR is transferred to MDR, while the content of SALSP and the output of PHB generator 80 (see FIG. 13) are transferred to the MAR (block 213), followed by write operation (block 214). Thus, the PHB word previously retrieved, is restored in the memory matrix, with its field incremented by one, since a group has been assigned from its page. Then, PLC address generator 70 is activated to supply the address of the PLC word of the requesting user to the MAR, while the content of PLCR is transferred to MDR (block 215). One the PLC word of the user is in the MDR and its address properly located in the MAR, a Write operation (block 216) is performed, resulting in the restoring of the PLC in memory. This completes the Assign Group suboperation, as represented by block 217 in which the word "Return" appears. The word RETURN implies a return to the sequence of steps in which the suboperation represents only a portion of the sequence. Thus, in the present example, after performing the Write step, (block 216), in the Assign Group suboperation, the next step to be performed is the one shown as block 193 in FIG. 22.

It should be appreciated, that the particular sequence of the foregoing described steps occurs only if the requesting user does not specify a particular page from which a group should be assigned as represented by the invalid AR, a determination made in block 201. Also, this sequence is followed only if space is available in one of the pages previously assigned to the requesting user, as indicated by a valid SALSP (block 205), and only if in the first page which is interrogated an initial group is available for assignment, as indicated by a valid IGAC field. This corresponds to a series of steps designated in FIG. 21 by blocks 171, 172, 173, 181, 182, 183 and 178.

If however, the requesting user designates a page from which a group should be assigned, if group space is available in said page during Q1, the AR is found to be valid, as indicated by the word YES next to block 201. Consequently, the sequence of steps proceeds to perform the steps, designated by block 221. The steps designated therein involve the transferring of the content or address of the designated page which is in the AR to MAR, while at the same time transferring the output of the PHB generator 80 thereto, so that the MAR stores the address of the PHB word of the designated page. This transfer is represented by AR (PHB)MAR. Also, switch 95 is set to ON. Thereafter, the sequence proceeds to the step designated by block 207 in which a Read operation is performed to retrieve the PHB word of the designated page in order to check whether space is available therein.

If, in the step designated by block 205, in which the SALSP field is interrogated, the field is found to be invalid (as indicated by NO) thereby indicating that none of the previously assigned pages to the requesting user contains available group space for assignment, the sequence of steps proceeds to perform an Assign Page suboperation, or subroutine, designated by oval-shaped block 222. The series of steps which are performed in the Assign Page suboperation during Q22–Q36 will be described later in conjunction with FIG. 24. However, for the present explanation, it is sufficient to point out that at the end of the Assign Page suboperation, assuming that a page is available for assignment, the address of the assigned page, i.e., the page number is stored in TAR1. The page address in TAR1 is then transferred to the SALSP field of PLCR (block 224). By this latter transfer, the number of the new page is used to start a new Space Available List (SAL).

Before the first group can be assigned from the new page it is necessary to initialize the IGAC field of its PHB word. This is achieved by first clearing PHBR (block 225), and then setting (block 226) the IGAC field to an initial state bit pattern which represents the group address of the first assignable group. As herebefore assumed in connection with FIG. 14, this pattern would be 00100 since this pattern represents the group address of data storing group 1. After setting the IGAC, the IGAC field is interrogated (block 209). Clearly found to be valid since it was just set with a valid address, the content of the IGAC, namely, the address of the newly assigned group is transferred to TAR1 (block 211) as herebefore explained.

If in interrogating the IGAC field of a PHB word the activity bit associated with the IGAC is invalid (See block 209) thereby indicating that all the groups of the page have been initially assigned, the sequence proceeds to interrogate the validity of the AGLS field (block 231) to determine whether the page includes reclaimed groups, which are available for assignment. Assuming that at least one reclaimed group is available, represented by a valid AGLS field, the address in the AGLS field is transferred to TAR1 (block 232). Since the address in AGLS represents the address of the top group of the reclaimed string of groups of the particular page, such as *n* in FIG. 15*a*, it is necessary to change the address in the AGLS field and insert therein the address of a succeeding group in the string, such as *m* in FIG. 15*a* and 15*b*.

This is done by first retrieving from memory the GL word associated with the group whose address is in the AGLS. This is accomplished by supplying the AGLS field content (such as in FIG. 15*a*—represented by *n*) to GAG 85, whose output represents the address of the GL word (such as GL*n*) associated with the group (*n*) whose address is located in AGLS. The output of GAG 85 is supplied to MAR (block 233) and thereafter a Read operation is performed (block 234), during which the GL word (such as GL*n*) associated with the assigned group (*n*) is read out from the matrix and transferred to MDR. The content of MDR is then transferred to GLR (block 235). Once the GL word is stored in the GLR, the content of the FGL field, representing the address of a succeeding group (such as *m*) in the reclaimed string of groups, is transferred to the AGLS field in the PHBR (block 236). These transfers are analogous to the changes in the content of the AGLS from *n* to *m*, as previously described in connection with FIGS. 15*a* and 15*b*. Thereafter, the sequence proceeds with the step represented by block 213.

If, however, during Q10 when interrogating the AGLS field (block 231) its corresponding activity bit is invalid, thereby indicating that the page does not include any reclaimed groups which could be assigned (block 231), the sequence of steps proceeds to interrogate the state of switch 95 (FIG. 13) and determine whether it is ON (block 238). The switch is ON only if the user designates a page from which a group should be assigned if one is available. If the switch is not ON, as represented by the word NO below block 238, i.e., the switch is OFF, the sequence proceeds (block 240) to transfer the content of the SALL field of the PHB word in PHBR to the SALSP field of the PLC word in PLCR. This step is necessary in order to update the content of the SALSP field by deleting therefrom the address of a page previously stored therein but found not to contain any group space available for assignment, and storing therein a succeeding page in the page list in which group space which is available for assignment may be found. The removal of a page previously forming part of the SAL has been previously explained in connection with blocks 185 and 186 of FIG. 21. After the content of SALSP is updated (See block 240) the sequence of operation proceeds to the step, represented by block 205, herebefore explained. If, however, in interrogating the state of switch 95 (see block 238) the switch is found to be ON, the sequence proceeds to perform steps starting with the step designated by block 202. That is, if the designated page does not have any groups available for assignment, the system continues to perform the Assign Group suboperation as if a page was not designated by the user.

The sequence of steps necessary to perform the Assign Page suboperation, represented in FIG. 23 by block 222, will now be explained in conjunction with the flow chart shown in FIG. 24. It should be recalled that from the following description, the availability of a page for assignment to a requesting user is determined by interrogating the state or content of one or more of the fields of the SAS word, whose format is shown in FIG. 5. Consequently, to perform Assign Page suboperation, it is first necessary to retrieve the SAS word from the memory matrix, a task performed by the steps represented in FIG. 24 by blocks 251, 252, 253. At the end of this task the SAS word is temporarily stored in the SASR of the Working Registers. The steps include activating SAS Address generator 60 (See FIG. 13) to transfer the SAS word address to MAR (block 251), followed by a Read step (block 252) and thereafter transferring the content of MDR to SASR (block 253).

Once the SAS word is located in its corresponding register, the IAC field forming the initial assignment counter is interrogated to determine whether an initial page exists for initial assignment. This interrogation is represented by block 254. If an initial page is available for assignment, namely, the IAC is valid, the content or number stored in the IAC is transferred to the temporary address register 1, TAR1 block 255. For convenience, in the same step (block 255), the PHAR is cleared for subsequent storing therein of an appropriate PHA word.

By transferring the content of the IAC to the TAR1, page assignment is in essence performed. To insure that the same page is not assigned twice, the IAC field is incremented by one (block 236). The assignment of a page from the IAC has been explained in conjunction with FIGS. 10*a* and 10*b*. After a page is assigned and the IAC is incremented, the SAS word in the SASR is transferred back to the memory matrix. This task requires the transfer of the content of SASR to MDR, as well as the storing of the address of the SAS word in the memory matrix in MAR (block 257) and thereafter performing a Write operation (block 258).

If, however, the IAC is invalid (See block 254), thereby indicating that all the pages in the matrix have been initially assigned, the sequence proceeds to interrogate the CPLP field of the SAS word in SASR to determine whether a page from a previously deleted page list is available for assignment. This interrogation is represented by block 259. The assignment of a page from CPLP has been described in conjunction with FIGS. 12*a*, 12*b* and 12*c*.

If the CPLP field is valid, the page address therein is transferred to TAR1 (block 261) thereby assigning the page whose address is located in the CPLP field. However, before the SAS word can be returned to the memory, it is necessary to update the content of CPLP field by storing therein the address of a page which succeeds, in the page list, the page just assigned. The address of such a page is located in the PHA word, and particularly in the PLL field of the PHA word of the page just assigned. Therefore, it is necessary to retrieve the PHA word of the page just assigned and transfer the content of the PLL field thereof to the CPLP field of the SAS word in SASR. This is accomplished by sequentially performing the steps, designated by blocks 262 through 265. Only thereafter can the SAS word be returned to the memory (see blocks 257 and 258).

If, however, the CPLP field of the SAS word is not valid, the TLP field is interrogated (block 260) to determine whether it points to any branches, representing page lists previously deleted by users and returned to the system for subsequent assignment. The manner in which the tree branches are accumulated has been previously explained in conjunction with FIGS. 11a, 11b and 11c while FIGS. 12a, 12b and 12c have been used to explain the manner of assigning a page from a previously deleted list. If the tree contains a branch, the TLP stores the address of the top page of a last, previously deleted page list (such as 7 of P7 of PL1 in FIG. 12a). Thus, this address is transferred to the TAR1 thereby comprising a page assignment (block 272). However, before the SAS word can be returned to the memory matrix, it is necessary to modify the contents of both its TLP and CPLP fields. The TLP field has to store the content of the PTL field of the PHA word of the page (P7) just assigned. The content is the address of a top page (P1) in a page list (PL2), deleted prior to the last deleted page list. Also, the CPLP field of the SAS word has to store the PLL field of the PHA word of the page (P7)just assigned. This content represents the second page (P10) from the top of the last deleted list (PL1). This is accomplished by the steps (represented by blocks 273–275 in FIG. 24), which involve the retrieval of the PHA word of the page (P7) just assigned (blocks 273–275), while the change in the content of the TLP field and the CPLP field of the SAS word is accomplished by the step represented by block 276.

It should be pointed out that after the SAS word is returned to the memory matrix, the Assign Page suboperation is not complete, until the newly assigned page is added to the top of the page list of the requesting user, and the address of the previous top page of the list, located in the PLSVA field of the requesting user's PLC word, is transferred to the PLL field of the PHA word of the newly assigned page in order to provide proper linking between the pages in the list. Also, it is necessary to enter the address of the newly assigned page in the SASLP field of the PLC word to indicate that the new page has space available for assignment.

The transfer of the content of PLSVA to PLL is performed by the step represented by block 284, while the address of the newly assigned page, located in TAR1 is stored in both the PLSVA and the SALSP (block 285). Thereafter, the address of the PHA word of the newly assigned page on the top of the list is generated and stored in MAR (block 286). This is done by supplying the page address or number from TAR1 to the MAR while at the same time actuating PHA generator 75 (FIG. 13) to transfer the RA portion of the PHA word address to MAR. In the same step, the content of PHAR is transferred to MDR. A Write operation is then performed (block 287) thereby returning the PHA word of the newly assigned page to the memory matrix. Then, the sequence of steps proceeds to the sequence of which the Assign Page suboperation forms one part. This is represented by block 288, in which the label RETURN is shown.

From a summary of the various steps, which may have to be performed in executing the Assign Group operation, it should be appreciated that these steps may involve most of the unique capabilities of the system as herebefore described, including nearly all the unique addressing methods, such as those described in conjunction with FIGS. 4b–4f. For example, if the user designates a page from which a group should be assigned (See Block 201 in FIG. 23) the page number in the AR and PHB generator 80 are activated to generate the address of the PHB word of the designated page, by the method explained in conjunction with FIG. 4c. Once this word is retrieved, its IGAC and AGLS fields are interrogated. If IGAC is valid a group is assigned as explained in connection with FIG. 14. If the AGLS field is valid a group is assigned as explained in connection with FIGS. 15a and 15b. When a group is assigned from the AGLS, it is in a sense removed from a string of groups, requiring the addressing of the group's GL word (block 233). This addressing uses GAG 85 in an addressing method like the one described in connection with FIG. 4e.

If the designated page is full, the user's PLC word is addressed (block 202 in FIG. 23) by the method described in conjunction with FIG. 4d. After being retrieved, the SALSP field is interrogated (block 205), (FIG. 23) and if found valid, an attempt is made to assign a group from the top page of the SAL, i.e., from the page whose number in the SALSP field. The attempt can only be executed after retrieving the PHA word of the top page, which is accomplished by addressing this word (block 206) by the method shown in FIG. 4d. If the top page is full it is removed from the SAL (block 240 in FIG. 23). The removal of a page from the SAL is analogous to the removal of a page from a page list as explained in connection with FIGS. 12b and 12c.

If in interrogating the SALSP of a PLC word (block 205) it is invalid or all the pages in the SAL are full, it is necessary to assign a new page. To do this it is first necessary to retrieve the SAS word (block 251, FIG. 24). This is done by generating the SAS word address with generator 70, by the method described in connection with FIG. 4f. Once the SAS word is retrieved a page is assigned, either from the IAC, as explained in connection with FIGS. 10a and 10b, or from the CPLP, as explained in connection with FIGS. 12b and 12c. If both the IAC and the CPLP fields are inactive, (See blocks 254 and 259 in FIG. 24), the TLP field is interrogated (See block 264) to see if any page lists, previously deleted by any of the users, are coupled thereto in a manner as explained in connection with FIGS. 11a, 11b and 11c. If one or more lists are connected to the TLP, the top list is transferred to the CPLP (block 276) and the top page of the transferred list is assigned.

The assigned page must now be added to the user's top page list or serve as the first page in the list (block 285), the page must also be added to the user's SAL (block 285). The addition of a page to a list has been described in connection with FIG. 7 and the addition of a page to the SAL has been described in connection with FIGS. 9a and 9b. From the added page a group is assigned by assigning the first data-storing group therein by means of the IGAC field (see blocks 225, 226, 209, 211 and 212). The Assign Group is completed by returning the PHB word of the new page (blocks 223 and 224, FIG. 23) to the memory by the addressing method of FIG. 4c and by returning the PLC word of the user (blocks 215 and 216, FIG. 23) to the memory, by the addressing method of FIG. 4d. Also, the SAS word is returned to the memory (blocks 257 and 258 of FIG. 24) and the address of the newly assigned group is supplied to the user (see blocks 193 and 194, FIG. 22).

Of all the foregoing described system capabilities, the only ones which are not directly used in the Assign Group operation are those related to the formation of a string of groups, with forward and backward linkings (see FIG. 16) the addition of a group to the end of a string (FIG. 17), and the insertion of a group in a string after a designated group (FIG. 18). Also, the capabilities which are not used include the ability to "Follow" (FIG. 19) addresses in groups which are strung together in a forward or backward direction, to delete a page list (FIGS. 11a and 11b), to delete a string of groups or reclaim individual groups in deleted strings (FIG. 20). It should, however, be pointed out that the group-stringing capability may be indirectly involved in the Assign Group operation if a group is assigned from the AGLS field of the PHB word of a page. In such a case, the assigned group is actually removed from a string of groups in a page, which are available for assignment.

It should be pointed out that although the Assign Group operation may, and often does, require a large number of steps, each step is quite simple. The step may involve generating an address by means of any one of a plurality of generators, interrogate an activity bit (AB) to determine if a field associated with the AB is valid or not, or the transfer of the content of a field or fields of one register to another. The ability to perform these steps at clock cycle speeds is due to the novel MCS 50 (FIG. 13) which includes all the generators necessary to generate the various addresses or address portions, as hereinbefore explained, all the registers necessary to hold the various control words and data words and the control unit 65. It is the latter which in response to a code, such as 0001, designating the Assign Group operation, supplies the necessary sequences of control signals in order to execute the steps diagrammed in FIGS. 22, 23 and 24 as herebefore explained.

Basically, unit 65, in FIG. 13, responds to the code 0001 representing the Assign Group operation, and provides a sequence of control signals which define clock periods. In FIG. 22, these periods are designated Q1–Q38, representing the maximum number of periods needed to perform the operation. During each period one or more of the steps herebefore described is performed. As diagrammed in FIG. 23, the interrogation of AR (block 201) and the steps designated by block 221 are assumed to be performed during period Q1. During Q2 the PLC address generator 70 is activated to supply the MAR with the address of the user's PLC word, while at Q3, the word at the address located in the MAR is read out. The other steps are performed during the other sequentially produced clock periods. It should be appreciated by those familiar with the computer art that various circuit design techniques may be employed to generate the required clock periods Q1–Q38 in order to control the sequential performance of the required steps in executing the Assign Group operation. One example of such circuitry will be described in conjunction with FIGS. 25–30. It should be appreciated, however, that the described circuitry is an example of but one embodiment of the needed circuitry, and that other circuit arrangements may be employed to perform the same functions.

In FIGS. 25–30 conventional logic designation is employed. That is, a block with a dot in the center represents an AND gate, while the plus (+) sign in a block represents an OR gate. An input line with a little circle adjacent the block indicates that the inverted input is true and the various blocks designated FF are assumed to represent flip-flops of the JK type.

JKFF is characterized by the following logical properties. If one assumes that $S_n$ is the state of the FF at clock period *n* and $S_{n+1}$ is the state of the FF during the following clock period, the following rules dictate the state of the FF as a function of the J and K inputs.

| J | K | $S_{n+1}$ |
|---|---|---|
| 0 | 0 | $S_n$ |
| 0 | 1 | 0 |
| 1 | 0 | 1 |
| 1 | 1 | $\bar{S}_n$ |

Figure 25:
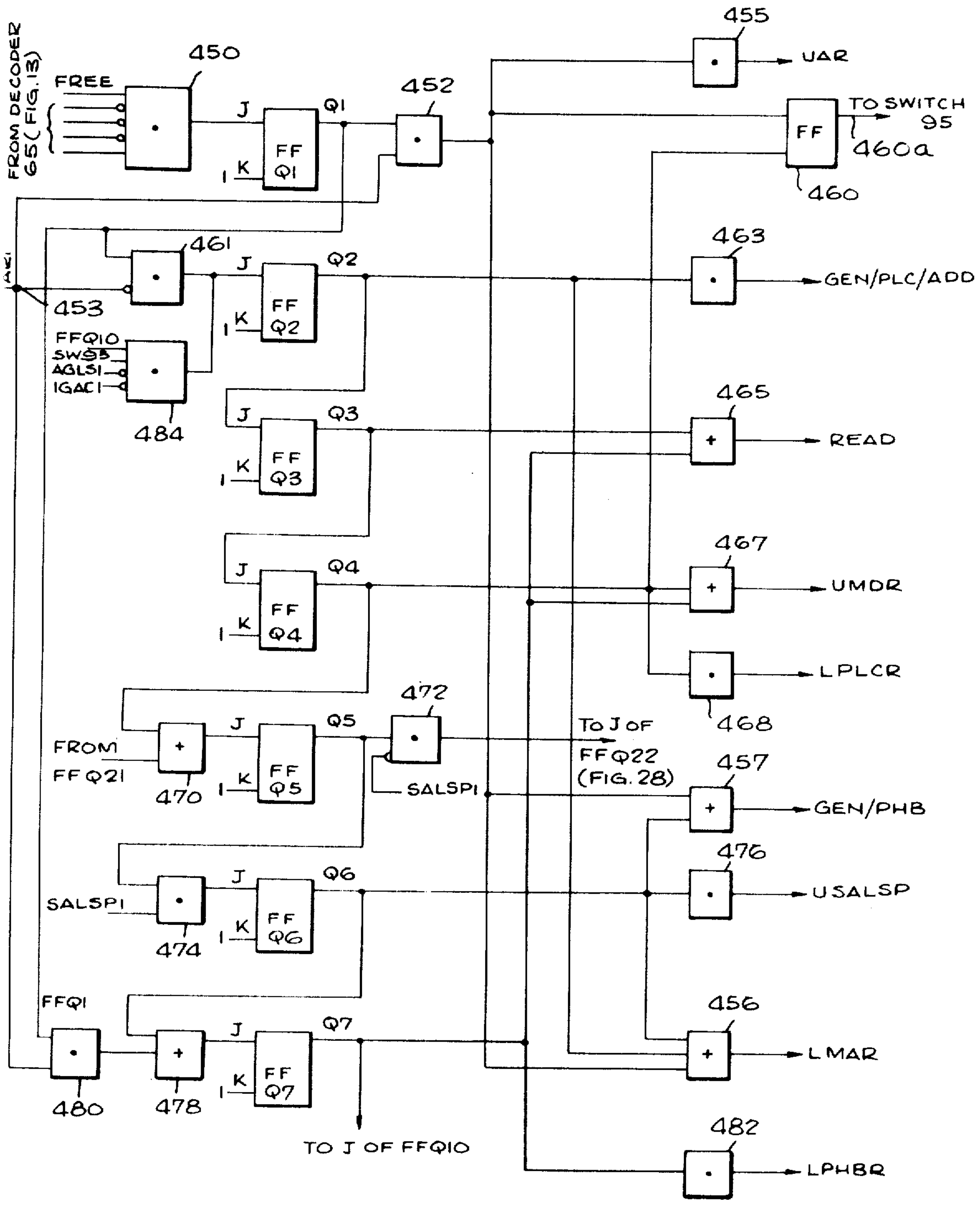
FIGS. 25–30 are logic diagrams of one embodiment of logic circuitry, required to control the execution of the Assign Group operation.

In FIG. 25 and the following FIGURES, the principle mode of operation involves K always set at "1". With K set to "1" the FF will normally be "0." When the J becomes "1," the FF will change state for the next timing period and become 1 or "1." This gives the basic Q*n* signal. While the FF is "1" the J input normally goes to the "0" state causing the state of the FF to return to the "0" state during the next clock period.

As connected in the logic circuitry embodiment, shown in FIGS. 25–30, 38 of the flip-flops are designated FFQ1–Q38, each one of which is designed to define a different, though equal, time or clock period, representing the period between two clock pulses. Q1 represents the period during which FFQ1 is a "1" or ON, Q2 the time period during which FFQ2 is ON, etc. It is during these defined time periods that the various steps required for the performance of the Assign Group operation are actually executed.

The logic circuitry, shown in FIGS. 25–30, will now be described in further detail, starting with the circuitry diagrammed in FIG. 25. As seen therefrom, the J input terminal of FFQ1 comprises the output of an AND-gate 450 having five input lines. The top line, labeled FREE, is assumed to be true whenever the memory control system is free to respond to any request from any of the users. The other four input lines of AND-gate 450 represent the four output lines (shown as one line in FIG. 13) of operation decoder 66 (see FIG. 13), which is connected to the control unit 65 to supply it with an operation code, whenever one is received from any of the users. Only when the operation code is 0001, representing a request for an Assign Group operation, are all the five inputs of gate 450 true, so that its output is true.

As seen from FIG. 22, once the Assign Group operation request is made, the first sequence of steps which have to be performed comprises the Assign Group suboperation, represented in FIG. 22 by block 192. The first step in the Assign Group suboperation is designated by reference numeral 201 in FIG. 23. When the output of AND-gate 450 (FIG. 25) is true, both the J and K input terminals of FFQ1 are true. Consequently, when the next clock pulse is received, FFQ1 is turned ON to provide a true output. The first clock period Q1 is represented by the period during which the output of FFQ1 is true.

The true output of FFQ1 is supplied to one input of an AND-gate 452, the other input of which is connected to a terminal 453, which is assumed to be connected to the first bit or stage of the AR. The first bit is represented by AR1. This bit is true only when a meaningful address is stored in the AR. Thus, only when AR is valid are both inputs to AND-gate 452 true, in which case its output is true.

As seen from FIG. 23, if the AR is valid (block 201), which in FIG. 25 is represented by a true output from AND-gate 452, several steps must be performed, all of which are represented in FIG. 23 by block 221. These include unloading the AR and transferring its content to the memory address register MAR, as well as activating the PHB generator 80 so as to store in the MAR the address of the PHB word of the page whose address is in the AR. Also, it is necessary to switch the switch 95 (see FIG. 13) to be ON. These acts or steps, all of which are represented in FIG. 23 by block 221, are performed by utilizing the true output of AND-gate 452 to provide several command signals. As shown in FIG. 25, the true output of AND-gate 452 is supplied to a single input AND-gate 455 whose output is a command signal UAR, designed to unload the AR. Hereafter, the letter U preceding a mnemonics of a register represents an unload command signal for that register, while the letter L represents a load command signal. It should be pointed out that AND-gate 455 is a single input gate. Its function, as well as that of other single input gates which will be referred to, is to isolate the logic circuitry, shown in FIGS. 25–30, from the circuits to which the control signals are supplied. Thus, gate 455 should be thought of as an isolation gate rather than as a logic-function-performing gate.

While the AR is unloaded by the command signal UAR, provided by AND-gate 455, the true output of gate 452 is also supplied to actuate an OR-gate 456 whose output LMAR represents a load main address register command signal. Also, the true output of AND-gate 452 is used to activate an OR-gate 457, whose output GEN/PHB represents a command signal to activate PHB generator 80. The setting of switch 95 to be ON is provided by using the true output of AND-gate 452 to switch a flip-flop 460 to be ON. Switch 95 is assumed to be ON whenever the output line 460*a* of a flip-flop 460 is true. However, when flip-flop 460 is OFF, and its output line is false, switch 95 is assumed to be switched to an OFF state. From the foregoing, it should thus be apparent that during the clock period Q1, when the output of AND-gate 452 is true, the various steps represented in FIG. 23 by blocks 201 and 221, are executed.

If, however, during Q1, the address in the main address register AR is invalid, i.e., the AR1 is false, the two inputs of an AND-gate 461 are true. Consequently, its output, which is connected to the J input terminal of FFQ2, is true. As a result, when the next clock pulse is received by the various flip-flops, FFQ2 is switched to be ON to provide a true output, which defines the succeeding clock period, Q2. As seen from FIG. 23, during Q2, the step represented by block 202 need be performed. This step involves the generation of the address of the PLC word of the requesting user and the storing of the user's PLC word address in the MAR. In the logic circuitry shown in FIG. 25, this is achieved by connecting the output of FFQ2, which is true during the Q2 period, to another input of OR-gate 456 to activate or load the MAR. Simultaneously therewith, the true output of FFQ2 is supplied to an AND-gate 463, whose output represents a command signal supplied to activate the PLC address generator 70 (see FIG. 13). The command signal is represented by GEN/PLC/ADD.

At the end of the second clock period Q2, FFQ3 is switched to be ON, while Q2 is turned OFF. FFQ3 remains ON to define the third clock period, Q3, during which the step represented in FIG. 23 by block 203 has to be performed. This step represents a Read operation. To accomplish the Read operation during Q3 the output of FFQ3 is connected to an OR-gate 465, whose output represents a READ command signal. The next clock pulse switches FFQ4 to ON (while switching the preceding flip-flop Q3 OFF). During period Q4, the various steps represented in FIG. 23 by block 204 need be performed. These include unloading the memory data register MDR and loading the PLCR with the content thereof. Also, it is necessary to set switch 95 to its OFF state. This is accomplished by connecting the true output of FFQ4 to an OR-gate 467 whose output provides an unload MDR command signal, represented by UMDR. FFQ4 is also connected to an AND-gate 468, whose output LPLCR represents a load PLCR command signal, and to the other input of flip-flop 460 to drive the flip-flop to its OFF state, so that its output line 460a is false. Consequently, switch 95 is switched to its OFF state.

After the Q4 period, the succeeding period Q5 is defined by providing a true input at the J input terminal of FFQ5 in order to set FFQ5 to true or ON. The J input terminal is connected to the output of an OR-gate 470 which is true either at the end of period Q4 or at the end of the period Q21, during which the step represented in FIG. 23 by block 240 is performed. This is necessary since during period Q5, the step represented by block 205 in FIG. 23 must be performed, either after the performance, during period Q4, of the step represented by block 204, or after the performance, during period Q21, of the step represented by block 240 in FIG. 23.

The output of FFQ5 is supplied to one input of an OR-gate 472, whose other input is true whenever SALSP1, representing the first bit of the SALSP field, is false, thereby indicating that the SALSP field is inactive. Only when this bit (SALSP1) is inactive, i.e., the SALSP is invalid, does the sequence proceed to perform the Assign Page suboperation, which is represented in FIG. 23 by block 222, and which is shown in greater detail, starting with the step represented by block 251, in FIG. 24. The output of gate 472 is connected to the J input terminal of FFQ22 (see FIG. 28). Thus, whenever the SALSP field is invalid, a determination which is made during the period Q5, the sequence of steps proceeds to perform the steps in period Q22, which represents the start of the Assign Page suboperation. This suboperation is performed during periods Q22–Q36 or any portion thereof.

If, however, during period Q5, the SALSP field is found to be valid, the output of AND-gate 472 (FIG. 25) is false, while the two inputs of an AND-gate 474 are true. Consequently, when the next clock pulse is received, FFQ6 is set to true to define the period Q6. As seen from FIG. 23, during period Q6, the steps represented by block 206 need be performed. These include unloading the SALSP field, activating the PHB generator and loading the MAR with the content of the SALSP field, as well as with the output of the PHB generator. This is accomplished during the period Q6 by utilizing the true output of FFQ6 to activate the OR-gate 457 in order to supply the PHB generator 80 with a command signal, GEN/PHB while at the same time activating the OR-gate 456 to provide a command signal, LMAR. Also, the true output of FFQ6 is supplied to an AND-gate 476, whose output, USALSP represents an unload SALSP command signal.

The J terminal of FFQ7 is controlled by the output of an OR-gate 478 which is supplied with the output of FFQ6, as well as with the output of an AND-gate 480. The latter is in turn supplied with the output of FFQ1, as well as with the level at terminal 453, which is true whenever AR1 is true, i.e., whenever the main address register AR is valid. This is necessary since the Read step operation, which is represented in FIG. 23 by block 207, and which need be performed during the clock period Q7, may have to be performed either following the various steps, represented in FIG. 23 by block 206 which are performed during period Q6, or after the performance of the various steps, represented in FIG. 23 by block 221, which are performed during period Q1, and only if the AR is valid.

During period Q7, the steps represented in FIG. 23 by blocks 207 and 208 are performed. This is accomplished by utilizing the true output of FFQ7 to enable the OR-gate 465 to provide a Read command signal. Also, the OR-gate 467 is enabled to provide a UMDR command signal, while at the same time an AND-gate 482, serving as an isolation gate, is enabled to provide a load PHBR command signal, LPHBR.

In addition to the foregoing described logic circuitry, shown in FIG. 25, the FIGURE is used to diagram a four-input AND-gate 484, whose output is connected to the J terminal of FFQ2. The four inputs of AND-gate 484 are connected to the output of FFQ10, the switch 95 and the first bit of each of the AGLS and IGAC fields. AND-gate 484 provides a true output, to the J terminal FFQ2, only when the output of FFQ10 is true, switch 95 is ON, and each of fields AGLS and IGAC is invalid. This is necessary, since, as seen from FIG. 23, the various steps which are assumed to be performed during period Q2, and which are represented in FIG. 23 by block 202, may have to be performed following the steps performed during period Q10, and only if switch 95 is ON, but neither the AGLS field nor the IGAC field is valid (see blocks 209, 231 and 238 in FIG. 23).

From the foregoing it should thus be appreciated that the logic circuitry shown in FIG. 25, is capable of defining 7 clock periods (Q1–Q7). During these periods appropriate command signals are provided by the control unit 65 (see FIG. 13) to the various registers or to the memory in order to perform the various steps, which in FIG. 23 are designated and assumed to be performed during periods Q1–Q7.

Figure 26:
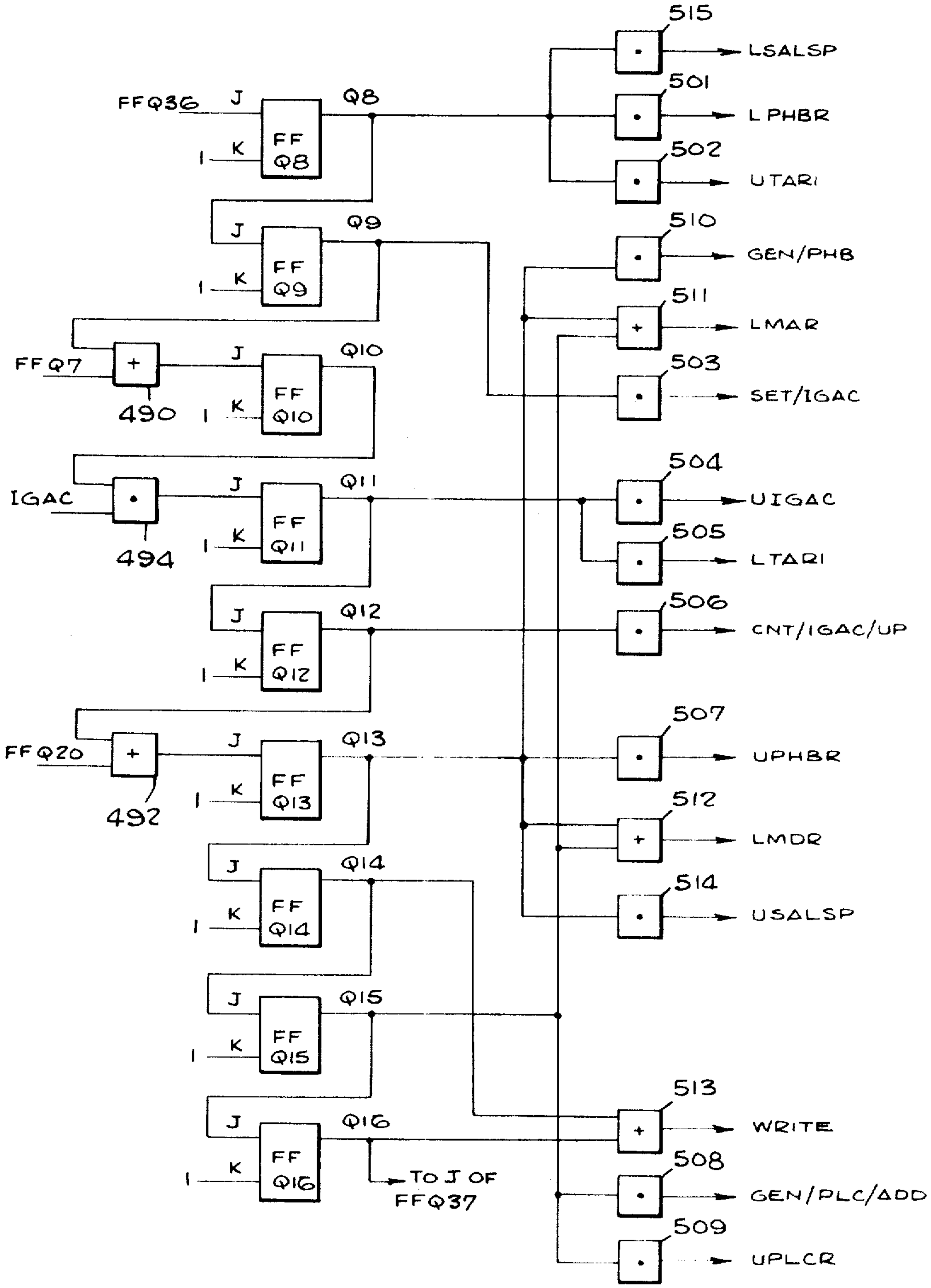

Similarly, the flip-flops FFQ8 through FFQ16, shown in FIG. 26 are utilized to define clock periods Q8–Q16. During each one of these periods, command signals are provided to perform the various steps which in FIG. 23 are designated as being performed during periods Q8–Q16. In FIG. 26 reference numeral 490 designates an OR gate which is used to control FFQ10 to define a clock period Q10 either after period Q9 or period Q7. This is necessary since as seen from FIG. 23, the steps to be performed during period Q10 may have to be performed either after the step performed during period Q7, which in FIG. 23 are designated by blocks 207 and 208, or after period Q9 when the steps designated therein by blocks 228 are performed.

Likewise, an OR-gate 492 controls FFQ13 to provide a true output, and thereby define period Q13, either after period Q12 or after period Q20, since the steps to be performed during period Q13 (see block 213 in FIG. 23) may have to be performed either after period Q12, or after period Q20. An AND-gate 494 is also shown in FIG. 26. The function of this gate is to control FFQ11 to define period Q11 after period Q10 only if the IGAC is valid, a validity which is determined during Q10 by the step, performed and designated in FIG. 23 by block 209. The J input terminal of FFQ8 is connected to the output of FFQ36 (see FIGS. 26 and 29), since the steps to be performed during period Q8, (see blocks 224 and 225 in FIG. 23) need be performed after the Assign Page suboperation is completed, which occurs during period Q36, assuming that a page is available for assignment and the memory is not full. If, however, a page is not available for assignment, the Assign Page suboperation ends during period Q32 by providing a "-Memory Full" signal (see FIG. 24).

Each of flip-flops FFQ8–FFQ16 (see FIG. 26) is connected to one or more of a plurality of command signal control gates 501–515, of which gates 501–510, 514 and 515 are single-input, isolation AND gates and gates 510–513 are OR gates.

Each of these gates provides a command signal which is designated by the legend near its output line. For example, as shown in FIG. 26, the output of FFQ8 is connected to gates 501, 502 and 515. Gate 501 provides a load PHBR command signal, LPHBR, in response to which the PHBR of the working registers is loaded. However, by not supplying it with any binary signals, it is loaded to an all-zero state, which in a sense represents a cleared PHBR. The step of clearing the PHBR is represented in FIG. 23 by block 225. Gate 502 provides an unload TAR1 command signal UTAR1, while gate 515 provides a load SALSP command signal LSALSP in order to perform during period Q8, the step shown in FIG. 23 by block 224.

The command signals supplied by the other command signal control gates shown in FIG. 26 are self-explanatory by the legends or mnemonics thereof. The legend SET/IGAC INDICATES A COMMAND SIGNAL TO SET THE IGAC field of a PHB word to store the relative address of the first data-storing group in a page, while the output of AND-gate 506, designated CNT/IGAC/UP, represents a command signal to increment by one the IGAC, as required by the step to be performed during period Q12, which is represented in FIG. 23 by block 212.

It should be pointed out that OR-gates 456 and 511, shown in FIGS. 25 and 26, respectively, produce the same output command signal LMAR, i.e., a load MAR signal. In practice, these two gates would be replaced by a single OR gate. Likewise, gates 457 and 510, OR-gates 463 and 408 in FIGS. 25 and 26, respectively, produce the same command signals, so that in practice they may be combined into single gates. However, in order to simplify FIGS. 25–30, separate command signal control gates are shown in each of them.

Figure 27:
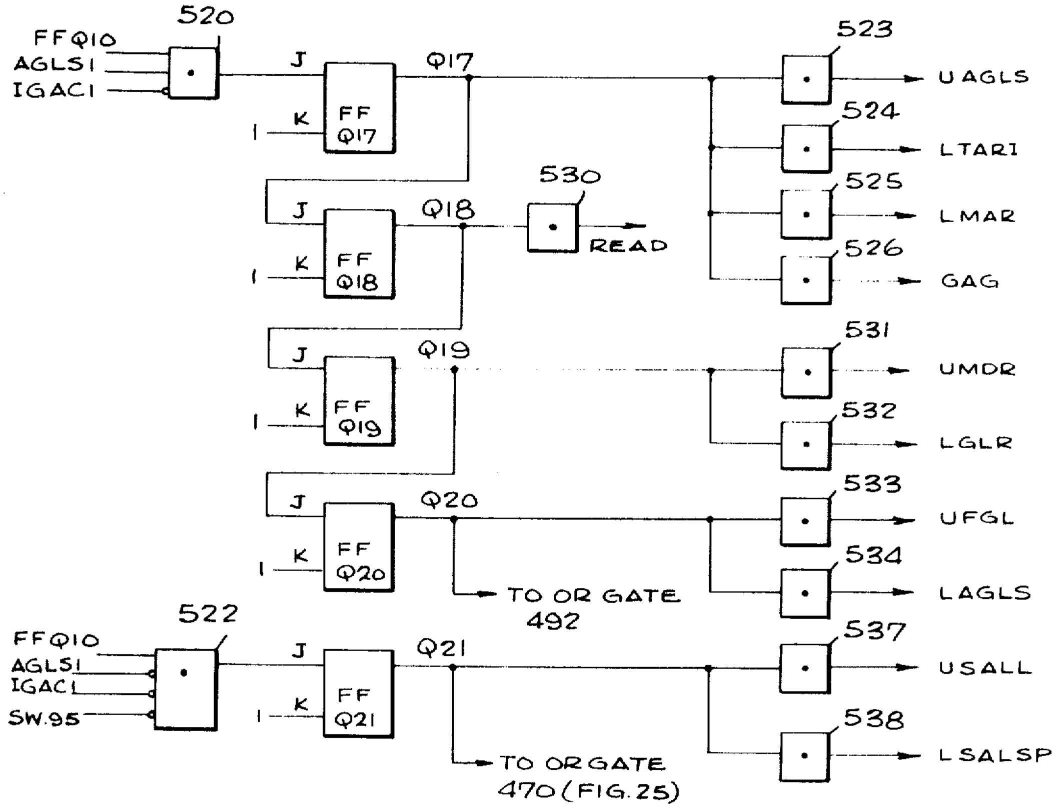

From the foregoing description, the manner in which flip-flops FFQ17–FFQ21, shown in FIG. 27, operate should be apparent. FFQ17 is enabled to define the period Q17 only if the output of AND-gate 520 is true. This is the case only during the period Q10 and only if bit 1 of the AGLS field is true, and the first bit of the IGAC is false, i.e., IGAC is inactive. Likewise, FFQ21 may be turned ON, to define period Q21, by the true output of an AND-gate 522. This output is true only during period Q10, and only if the first bit of each of fields AGLS and IGAC is false, thereby indicating that the two fields are inactive, and switch 95 is OFF.

The true output of FFQ17, during period Q17, enables each of AND-gates 523–526, each gate providing a different command signal, while during period Q18 AND-gate 530 is enabled to provide a Read command signal. During period Q19 AND-gates 531 and 532 are enabled, while during period Q20 and Q21, gates 533 and 534 and 537 and gate 538, respectively are activated.

Figure 28:
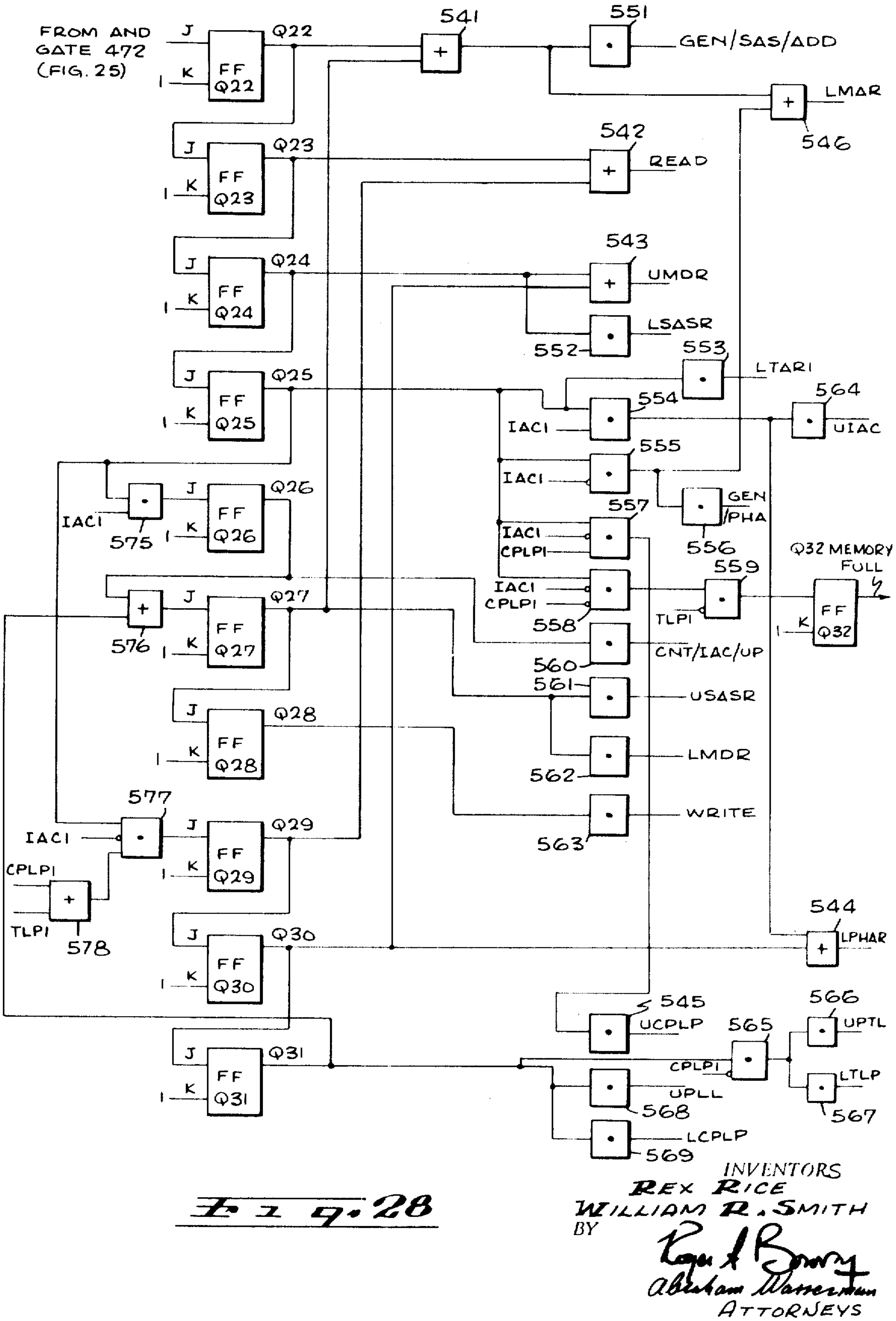
Figure 29:
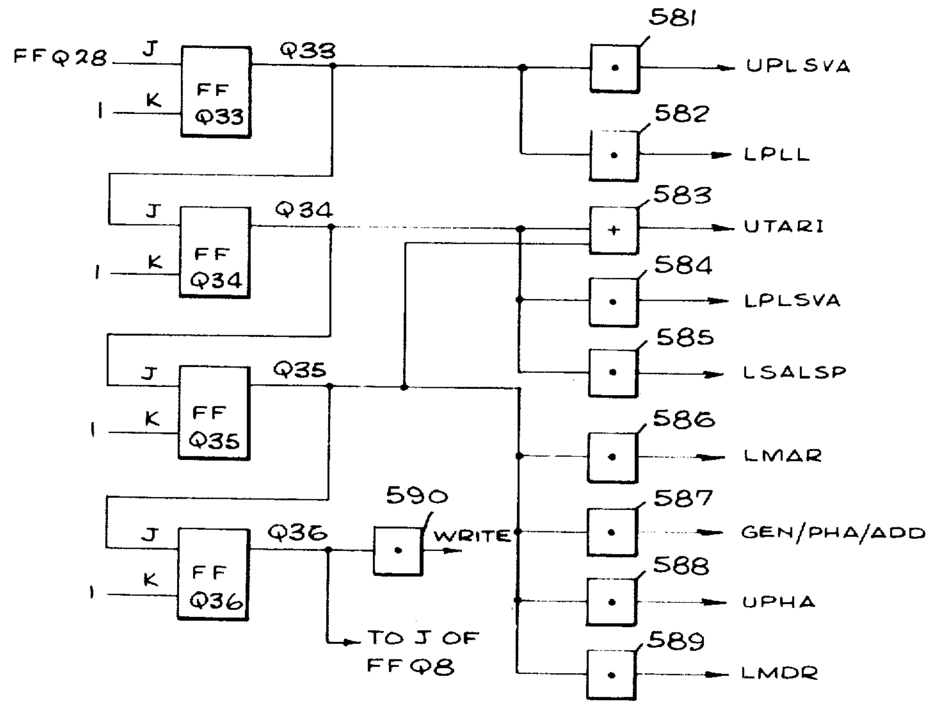
Figure 30:
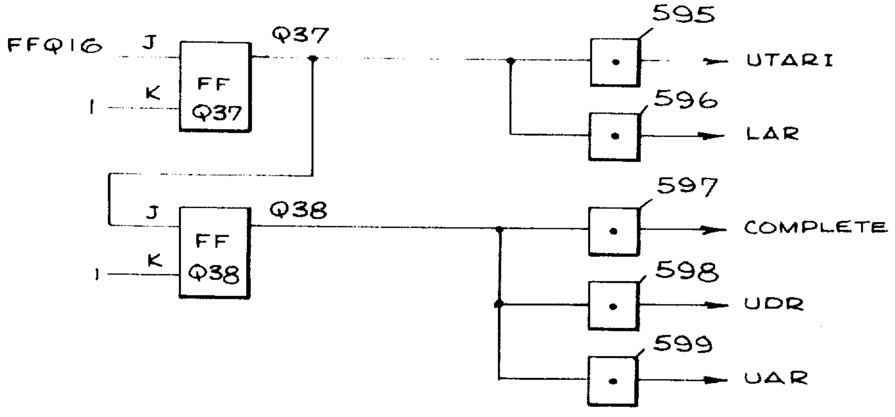

The logic circuitry shown in FIGS. 28 and 29 is used to define clock periods Q22 through Q36, which as shown in FIG. 23 are required only if the Assign Page suboperation, represented therein by block 222 has to be performed. As previously indicated, this is necessary only if during the performance of the Assign Group operation, space is not available in any of the previously assigned pages to a user, in which case a new page need be assigned thereto. The flow chart representing the series of steps necessary to perform the Assign Page suboperation is shown in FIG. 24. It should be pointed out, that if the memory is found to be full, namely, no page is available for assignment to the requesting user, the operation terminates during clock period Q32 when a "Memory Full" signal is supplied. If, however, a page is available for assignment, the sequence of steps continues, so that during period Q36, the Assign Page suboperation is completed and the system proceeds to perform the step, represented in FIG. 23 by block 224, which, as herebefore described, occurs during period Q8.

As seen from FIG. 28, flip-flops FFQ22 through FFQ31 control command signal control gates 541 through 546 and 551 through 569 to provide appropriate command signals, which are designated by the legends adjacent the gates' output lines. In addition, in FIG. 28, reference numerals 575 through 578 designate four gates which are used to control flip-flops FFQ26, FFQ27 and FFQ29 to define the clock periods Q26, Q27 and Q29, respectively, only under particular conditions. That is, period Q26 follows period Q25 only if the first bit of the IAC field is true, while period Q27 occurs either after period Q26 or after period Q31. Period Q29 follows period Q25 only if the first bit of the IAC is false (see gate 577) and either the CPLP or TLP field is true, as represented by a true first bit thereof. Likewise, as seen from FIG. 29, flip-flops FFQ33 through FFQ36 control command signal control gates 581 through 590 to provide appropriate command signals.

After the Assign Group suboperation represented in flow chart of FIG. 23 is completed during clock periods Q1–Q36, or any portion thereof, the Assign Group operation proceeds to perform the steps designated in FIG. 22 by block 193 during clock period Q37. This period is followed by the clock period Q28 during which the steps in blocks 194 and 195 are performed. Clock periods Q37 and Q38 are defined by the two flip-flops shown in FIG. 30 which control the command signal control gates 595 through 599. It is the output of AND-gate 597 which represents a "complete" signal supplied to the system, which indicates that the Assign Group operation, commanded by a requesting user, has been completed. It should again, however, be pointed out, that the Assign Group operation may be completed during period Q32, during which a "Memory Full" signal may be supplied, to indicate that a page is not available for assignment for the user from which a group may be assigned thereto.

From the foregoing it should thus be appreciated that the logic circuitry shown in FIGS. 25–30 is complete and sufficient to control the steps necessary for the performance of the Assign Group operation, which herebefore has been described in conjunction with flow charts of FIGS. 22–24. It should be appreciated by those familiar with the computer art, including those familiar with the design of logic circuitry, used to implement and control the performance of sequences of steps, that the technique employed in the design of the logic circuitry for controlling the Assign Group operation may be employed in the implementation of logic circuitry to control the sequential performance of steps involved in the execution of each of the other coded operations, such as Insert Group, Delete Page List, etc., which are listed in Table 2.

Consequently, control unit 65 should be regarded as comprising a plurality of control units, each one of which responds to a different code from decoder 66 (FIG. 13) to define a sequence of clock periods. During each clock period, one or more steps needed in the execution of the operation represented by the code is performed. Since the circuit technique employed to provide the control unit for the Assign Group operation (FIGS. 25–30) is quite simple, and since the same technique may be employed to provide the control units for the other operations, such units will not be described in further detail. In the following description the steps necessary to execute the other operations listed in Table 2 will now be described in conjunction with the following flow charts.

INSERT GROUP (FIG. 31)

As previously described, the Insert Group operation which a user may request by providing a unique code, such as 0010, is similar to the Assign Group operation, in that it includes all the steps of the latter. In addition, however, the Insert Group operation involves the linking of an assigned group to a specific group, whose address is provided by the user. The Insert Group operation has been described herebefore in conjunction with FIG. 18. Therein, it was assumed that a group $Gxx$, i.e., a group $x$ in page $x$ is inserted after a string of groups following a group $Gib$, i.e., a group $b$ in page $i$. In the present description, let it be assumed that the user supplies the control system with the address of $Gib$ after which a group which is automatically assigned by the system is to be inserted.

Figure 31:
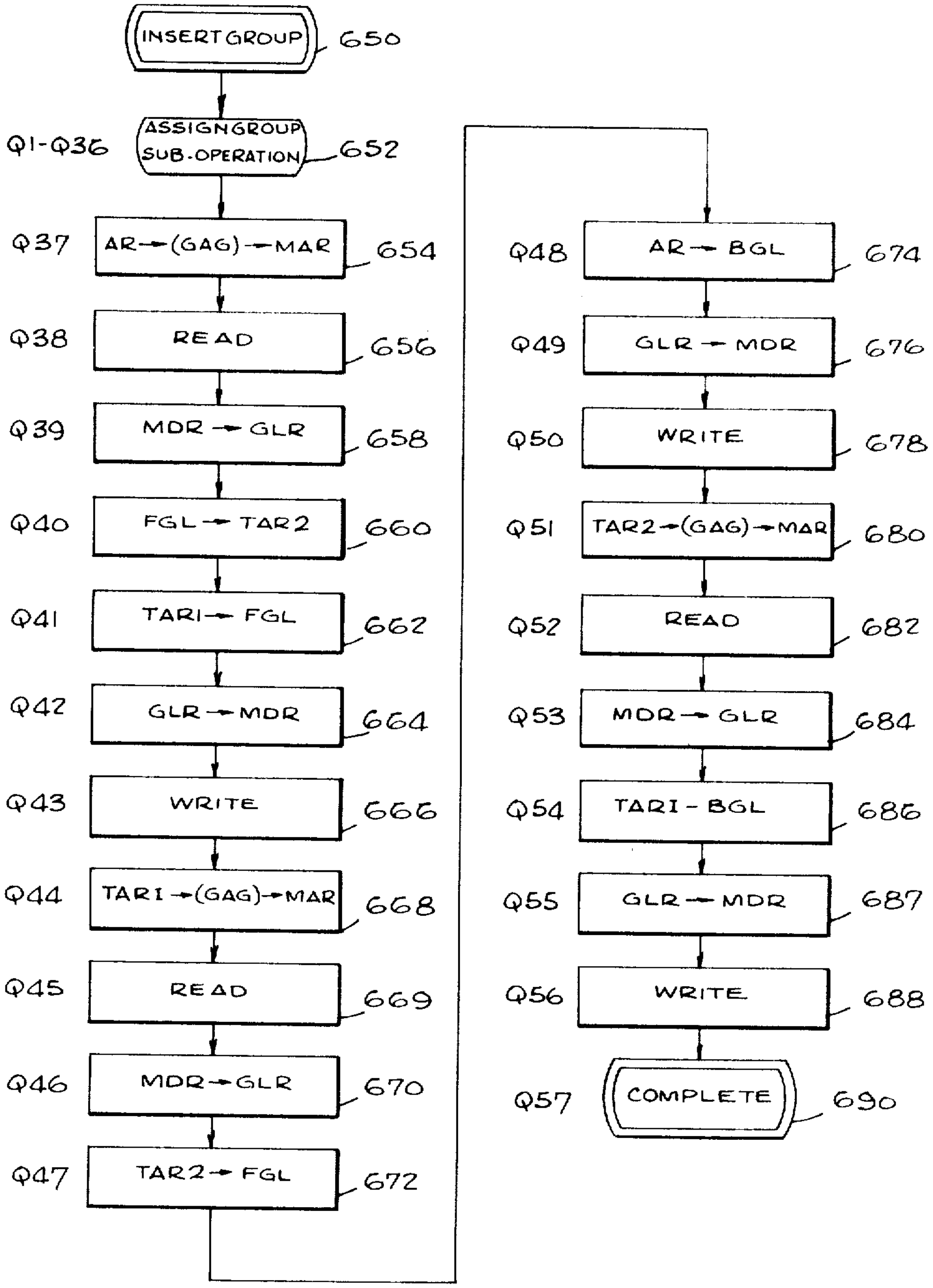
FIG. 31 is a flow chart of the Insert Group operation.

Referring to FIG. 31, when an Insert Group operation is commanded, represented by block 650, the Assign Group suboperation, previously described in connection with FIG. 23, is executed. This is represented by block 652. As previously pointed out this suboperation may involve the execution of the Assign Page suboperation (see block 232 in FIG. 23), herebefore described in connection with FIG. 24. Assuming that a group is available for assignment, either from a page previously assigned to the user or from a newly assigned page, at the end of the Assign Group suboperation, the address of the assigned group is in TAR1. See, for example, blocks 211, and 232 in FIG. 23.

Let it be assumed that in the execution of the Assign Group suboperation, Gxx is assigned and its address is in TAR1. After the Assign Group suboperation, the group address Gib in the AR is used to activate the GAG 85 (FIG. 13) and transfer the address of the GL word of Gib, i.e., GLib to the MAR (block 654). Then, a Read operation is executed (block 656) and the content of the MDR, representing GLib is transferred to the GLR (block 658). From FIG. 18, it should be seen that at this point the FGL of GLib stores the address jc of Gjc, forming the link designated by line 128. This address (jc) is temporarily stored in TAR2 (block 660) and thereafter the address (xx) of newly assigned group Gxx is transferred from the TAR1 to the FGL of GLR (block 662) to form the line 128a (FIG. 18). Then, GLib is ready to be restored in memory. This is accomplished by the steps represented in FIG. 31 by blocks 664 and 666.

Thereafter, the word GLxx of the newly assigned group is read out from memory and transferred to the GLR in order to enter the necessary addresses of the preceding and succeeding groups in the string between which the new group is inserted. This is accomplished by the steps shown by blocks 668–670. Then, the address (jc) of the succeeding group Gjc in TAR2 is transferred to FGL (block 672) to form the link 128b and the address (ib) of the group Gib, provided by the user which is in the AR, is transferred to the BGL (block 674) to form the link 132b. Thereafter, GLxx is ready to be restored in the memory, an operation performed by the steps shown in blocks 676 and 678.

The last few steps which have to be performed is to retrieve the word GLjc of the group Gjc, following the assigned group, and enter therein the address (xx) of the assigned group. This is achieved by using the address jc in TAR2, entered therein by the step in block 660, to generate the address of GLjc (block 680) read out the word from memory (block 682) and transfer it to the GLR (block 684). Then the content (xx) of TAR1 is stored in the BGL (block 686) to form the link 132a. Thereafter, GLjc is restored (blocks 687 and 688) and the Insert Group operation is completed (block 690).

It should be appreciated that in controlling the execution of this operation, the control unit 65 has to define clock periods Q1–Q36, during which the Assign Group suboperation is executed, as previously explained. In addition, several additional clock periods have to be defined to control the sequential execution of the steps represented in FIG. 31 by the blocks following block 652. For explanatory purposes only, these periods are designated in FIG. 31 as periods Q37–Q57, with the steps in each block being assumed to be performed during a different clock period. It should be pointed out that the periods Q37 and Q39 in FIG. 22 differ from those shown in FIG. 31. The periods Q37–Q39 in FIG. 22 represent the periods during which the last few steps of the Assign Group operation are executed, while Q37–Q39 in FIG. 31 represent three successive periods during which several steps, which are a part of the Insert Group operation, are executed.

DELETE PAGE LIST (FIG. 32)

As previously explained in conjunction with FIGS. 11a–11c, in performing the Delete Page List operation, several of the control words are involved. These include the SAS word, the PLC word of the requesting user and the PHA word of the top page of the list which is being deleted. Let it be assumed (see FIG. 11c) that a user x requests this operation and that, previously, the list of a user n was deleted. In this case, the control words which are involved in the execution of the operation in addition to the SAS word are PLCx and word PHA of page P7, the top page of the list of user x.

Figure 32:
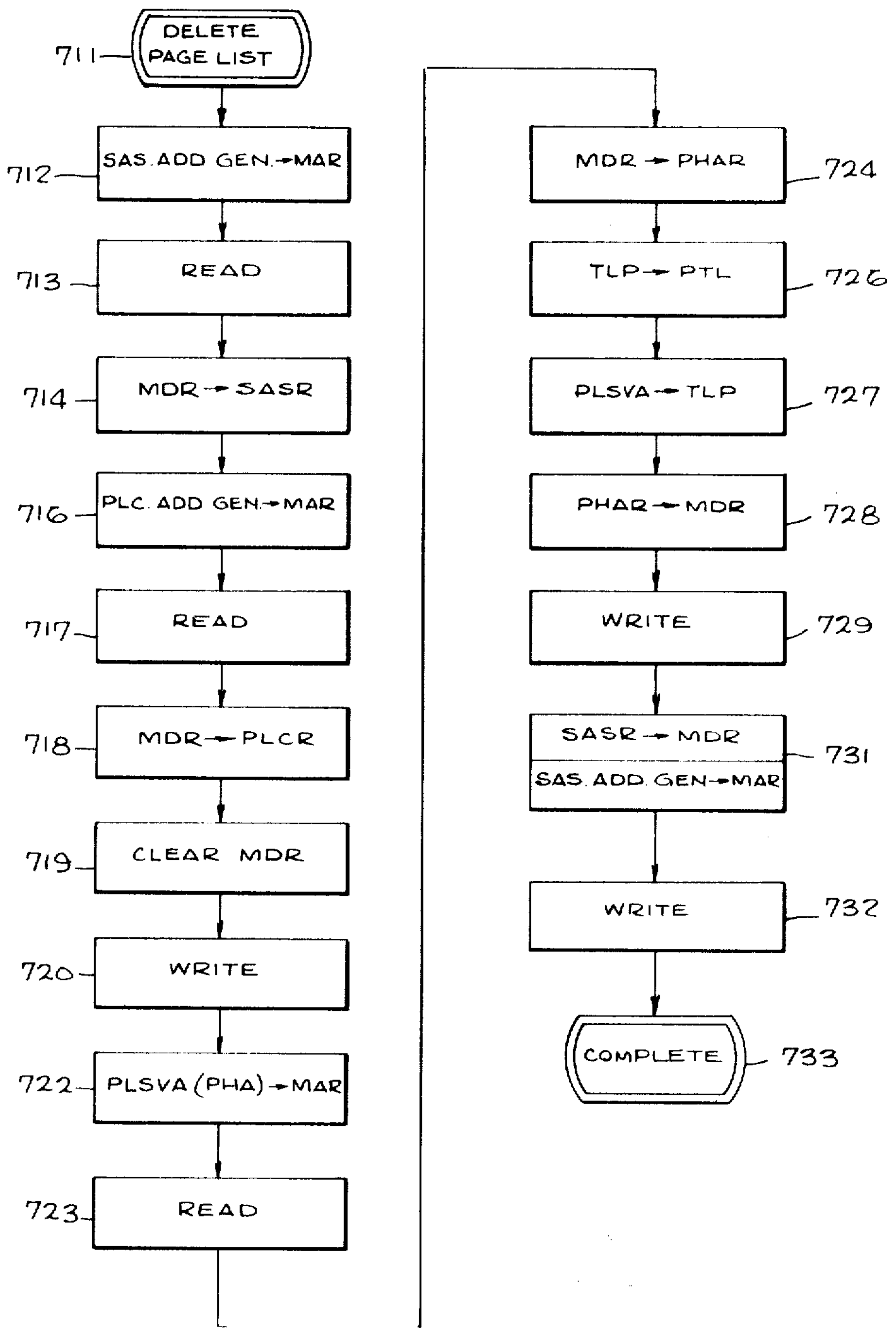
FIG. 32 is a flow chart of the Delete Page List operation.

The start of the operation is represented in FIG. 32 by block 711. Thereafter, the SAS word is retrieved from memory and stored in the SASR (blocks 712–714), followed by retrieving and storing PLCx in PLCR (blocks 716–718). Once this is accomplished, in the particular step sequence shown in FIG. 32, the MDR is cleared (block 719) to an all-zero state and the address of PLCx, still in the MAR (see block 716), is used during a subsequent Write step (block 720) to store PLCx in memory at its address, with all-zero representation, representing a clear state. The PHA word of the top page (P7) of the list which is being deleted is retrieved by using the address (7) of P7 in the PLSVA field in PLCR and activating PHA generator 75 to load the MAR (block 722) with the address of the PHA word of P7. This is followed by a Read operation (block 723) and by loading PHAR with the content of MDR (block 724). Thus, the PHA word of P7 is in PHAR.

Thereafter, the content of the TLP field of PLCR which in the present example is the address (1) of P1, the top page of the previously deleted list, (see FIG. 11b) is transferred to the PTL field of PHAR (block 226) to form the tree link, designated in FIG. 11c by line 734. Then, the PLSVA field content, which is the address (7) of P7, the top page of the list being deleted, is stored in TLP (block 727) to form the tree pointing link, designated in FIG. 11c by line 735. The PHA word of P7 is then rewritten into memory (block 729) followed by restoring the SAS word (block 731, 732). This completes the Delete Page List operation (block 733).

DELETE STRING (FIGURE 33)

Figure 33:
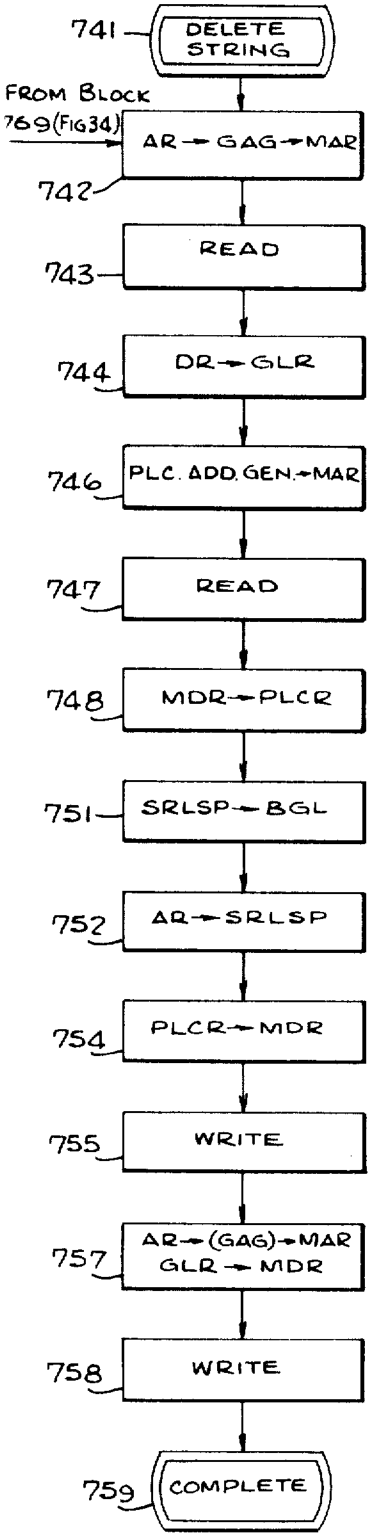
FIG. 33 is a flow chart of the Delete String operation.

The Delete String operation, which is next to be described in conjunction with FIG. 33 is similar to the Delete Page List operation. However, in the former operation, the address of a top group in a string is provided by the requesting user. The deleted string is returned or reclaimed by the user by inserting the address of the string's top group in the SRLSP field of the requesting user's PLC word, as previously explained in conjunction with FIG. 20. Thus, to perform the Delete String operation, it is necessary to retrieve the requesting user's PLC word and temporarily store it in the working register PLCR. However, in order to link the newly deleted string of groups with any string of groups, previously deleted, it is necessary to retrieve the group link word of the top group in the string to be deleted (such as the GLb word of group b in string S3 of FIG. 20) in order to insert in its BGL field the address (such as c) located in the SRLSP field, representing the top group (c) of the previously deleted string (S2).

Referring again to FIG. 33, therein oval-shaped block 741 represents the start of a Delete String operation. Blocks 742–744 represent the steps involved in the retrieval of the GL word, associated with the top group of the string to be deleted, whose address is provided by the requesting user and stored in the main address register AR. The retrieval of the requesting user's PLC word and its storage in its corresponding working register is performed by the steps designated by blocks 746–748. Therein, block 746 represents the step of generating the address of the requesting user's PLC word by generator 70 (see FIG. 13) and storing it in the memory address register (MAR), followed by a Read operation (block 747).

Once the requesting user's PLC word and the GL word, associated with the top group of the string to be deleted, are stored in their respective working registers, PLCR and GLR, the content of the SRLSP field of the PLC word is transferred to the BGL field of the GL word (block 751) and the address in the main address register, AR, representing the address of the top group of the string which is deleted is stored in the SRLSP field (block 752). The requesting user's PLC word is then restored in memory (blocks 754 and 755), followed by the restoring of the GL word of the top group of the string which is deleted (blocks 757 and 758). Thereafter, an operation COMPLETE signal is supplied to the requesting user (block 759).

DELETE TO END OF STRING (FIGURE 34)

Figure 34:
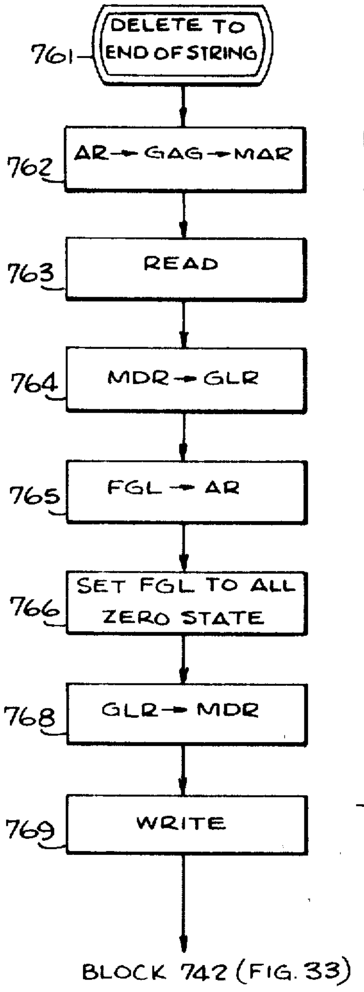
FIG. 34 is a flow chart of the Delete to End of String operation.

Before proceeding to describe the steps involved in performing a Delete to End of String operation, in conjunction with FIG. 34, it should be recalled that in such an operation, the user supplies the memory control system with the address of the last group in the string which should be retained, rather than the address of the first group of the string portion which should be deleted. Consequently, it is necessary to use the received group address in order to retrieve its corresponding GL word in which the FGL field stores the address of the first group of the string portion, which should be deleted. Also, it is necessary to set the FGL field of the GL word of the retained group to zero, since after this operation is completed, the addressed group comprises the last group of the remaining string portion.

These steps may best be explained in conjunction with FIG. 34 in which the start of Delete to End of String operation is represented by block 761. This block is followed by blocks 762–764 which represent the steps necessary to retrieve the GL word, associated with the group whose address is supplied by the user to the AR. Thereafter, the content of the FGL field of the GL word in GLR, representing the address of the top group in the string portion to be deleted, is transferred to the AR (block 765). This address is analogous to the address of a top group of a string which is supplied to the AR by the user when a Delete String operation is requested. After the content of the FGL field is transferred to AR, the FGL field in FGLR is set to an all-zero state (block 766), followed by two steps (blocks 768 and 769) which are used to restore the GL word of the address group in memory. After the GL word is properly restored, the AR contains the address of the top group of the string portion which is to be deleted. Such a deletion operation is performed by proceeding from the step represented by block 769 to the step shown in block 742 in FIG. 3. That is, a Delete String type operation is performed on a portion of the string, starting with the group whose address is located in the AR.

It should be pointed out that in all the foregoing described sequences, none of them involves steps in which a data word, received from the user in the main data register, is stored in the memory matrix or in which a data word is retrieved or fetched from the memory matrix, for supply to the user, via the main data register, MDR and bus 100. In the following sequences of steps to be described, the storing of a word or the retrieval thereof will also be involved, since all the rest of the operations which may be requested involve a Store or Fetch aspect.

STORE ONLY (FIGURE 35)

Figure 35:
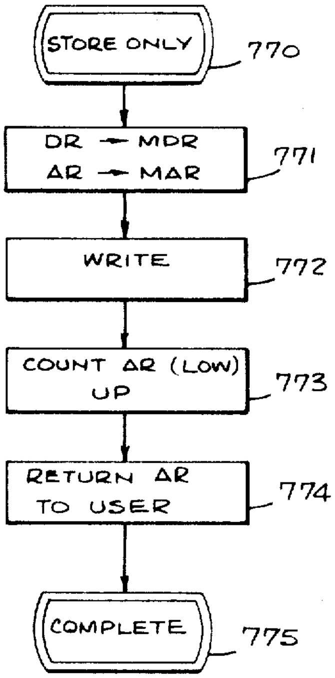
FIG. 35 is a flow chart of the Store Only operation.

Reference is now made to FIG. 35 in conjunction with which the steps required to perform the Store Only operation will be described. Therein, block 770 designates the request for a Store operation, in which a data word is received from the user and is temporarily held in the main data register, DR. The address in which the word is to be stored is received from the user and temporarily held in the main address register, AR. Then, the contents of the two are transferred to the MDR and the MAR, respectively, (block 771). Thereafter, a Write operation is performed (block 772) thereby storing the word received from the user in the designated address.

As previously assumed, each group includes eight separate data words. Consequently, it is assumed that the three lowest order bits in the AR are used to designate the specific address of a word within a group. In such an arrangement, after a word is written or stored in the furnished address, the address in the AR is incremented by one (block 773) and the new address in the AR is then returned to the user (block 774). The Store Only operation is completed by providing an operation Complete signal to the user (block 775). Thus, this operation may be deemed as a conventional Write operation except that the user is provided with a new address which represents the address previously received therefrom, plus one.

STORE AND ASSIGN (FIGURE 36)

Figure 36:
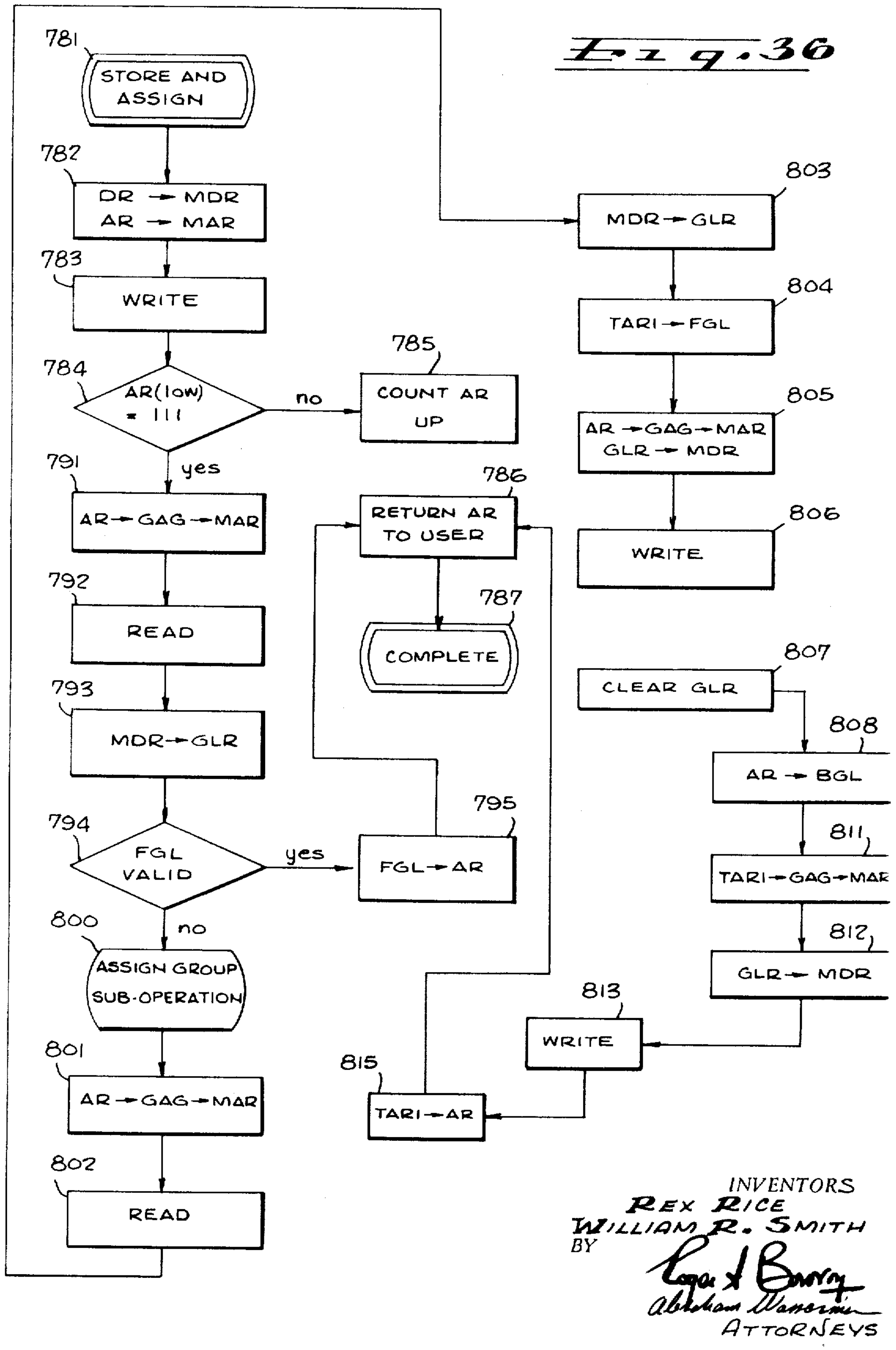
FIG. 36 is a flow chart of the Store and Assign operation.

Before proceeding to describe the steps required to perform the Store and Assign operation, which will be accomplished in conjunction with FIG. 36, to which reference is made herein, it should be recalled that in this operation, in addition to storing a word in a specific address received from the requesting user, the address following the received address is supplied to the user. If the received address represents the last word of a group, a new group has to be assigned which is linked to the group whose address is initially supplied by the user.

After a Store and Assign operation request is received (block 781 in FIG. 36), the data word supplied by the user to the DR and the address supplied by the user to the AR are transferred to MDR and MAR, respectively (block 782). Thereafter, a Write operation is performed (block 783), thereby completing the Store portion of the operation. The address which was received and is in the AR is then interrogated (block 784) to determine the status or state of the three lowest order bits, which represent the word portion of the address. If the three lowest order bits are other than 111, which indicates that the address is not of the eighth or last word of a group, the address in the counter is incremented by one (block 785), and the new address is returned to the user (block 786). This completes the Assign portion of the operation. The completion of the operation is indicated by a Complete signal (block 787) which is supplied to the user.

If, however, when interrogating the three lowest order bits of the received address (block 784), the three bits are in state 111, thereby indicating that the address received represents the address of a last word of a group, it is necessary to locate the address of the first word of a succeeding group in the string of groups, if the addressed group is not the last group of a string. If, however, the address received from the user represents the last word of the last group of a string, the Assign portion of the operation could only be completed by first assigning a new group, linking it to the addressed group by means of the group-linking words, and thereafter supplying the user with the first word of the newly assigned group.

As seen from FIG. 36, if the three lowest order bits are 111 (block 784) the sequence proceeds to retrieve and temporarily store in the GLR the GL word associated with the addressed group. This is accomplished by the steps represented by blocks 291–293. Thereafter, the FGL field in GLR is interrogated (block 794). If the FGL field is valid, indicating that the string of groups includes a group following the addressed group, the content of the FGL field representing the address of a succeeding group is transferred to the AR (block 795). Then the content of the AR is sent to the user, as shown in block 786.

If, however, the content of FGL field is invalid, indicating that the addressed group was the last of a string, a new group must be assigned. This is accomplished by performing the Assign Group suboperation, previously explained in conjunction with FIG. 23. As previously pointed out, at the end of the Assign Group suboperation, TAR1 holds the address of the assigned group. In FIG. 36, the entire Assign Group suboperation is represented by block 800.

Thereafter, the content of AR, which at this point still holds the address of the addressed group, is used as well as GAG (generator 85 in FIG. 13) to generate and store in MAR (block 801) the address of the GL word associated with the addressed group. A read operation (block 802) is performed and the content of MDR is stored in GLR (block 803). Thus, at this point the temporary address register 1, TAR1 stores the address of the newly assigned group, while GLR stores the GL word of the addressed group in which the word received from the requesting user is stored.

To produce proper linking between the newly assigned group and the previous group which was the last group of the string, the content of TAR1 is transferred to the FGL field of GLR (block 804). Thereafter, the GL word in GLR is restored in the memory matrix, a task performed by the steps designated by blocks 805 and 806. Thus, at this point, the AR register holds the address of the addressed group, and the TAR1 holds the address of the assigned group. Also, the GLR temporarily holds the address of the GL word associated with the addressed group. However, this word was restored in its proper place in the memory (blocks 805 and 806) after the address of the newly assigned group has been inserted in its FGL field.

Thereafter, the content of GLR is cleared (block 807), and the content of AR is stored in the BGL field of GLR (block 808), thereby inserting the address of the addressed group in the backward group link (BGL) field of the GL word of the assigned group. Then the content of the GLR is stored in memory in the address of the GL word, associated with the newly addressed group, whose address is located in TAR1. The storing of the GL word is performed by the three steps, represented by blocks 811–813. Then, the operation proceeds to transfer the content of TAR1, in which the address of the newly assigned group is located, to AR (block 815) for subsequent supply to the user, as previously explained in conjunction with block 786. Thus, the Store and Assign operation is completed.

STORE AND INSERT (FIGURE 37)

Figure 37:
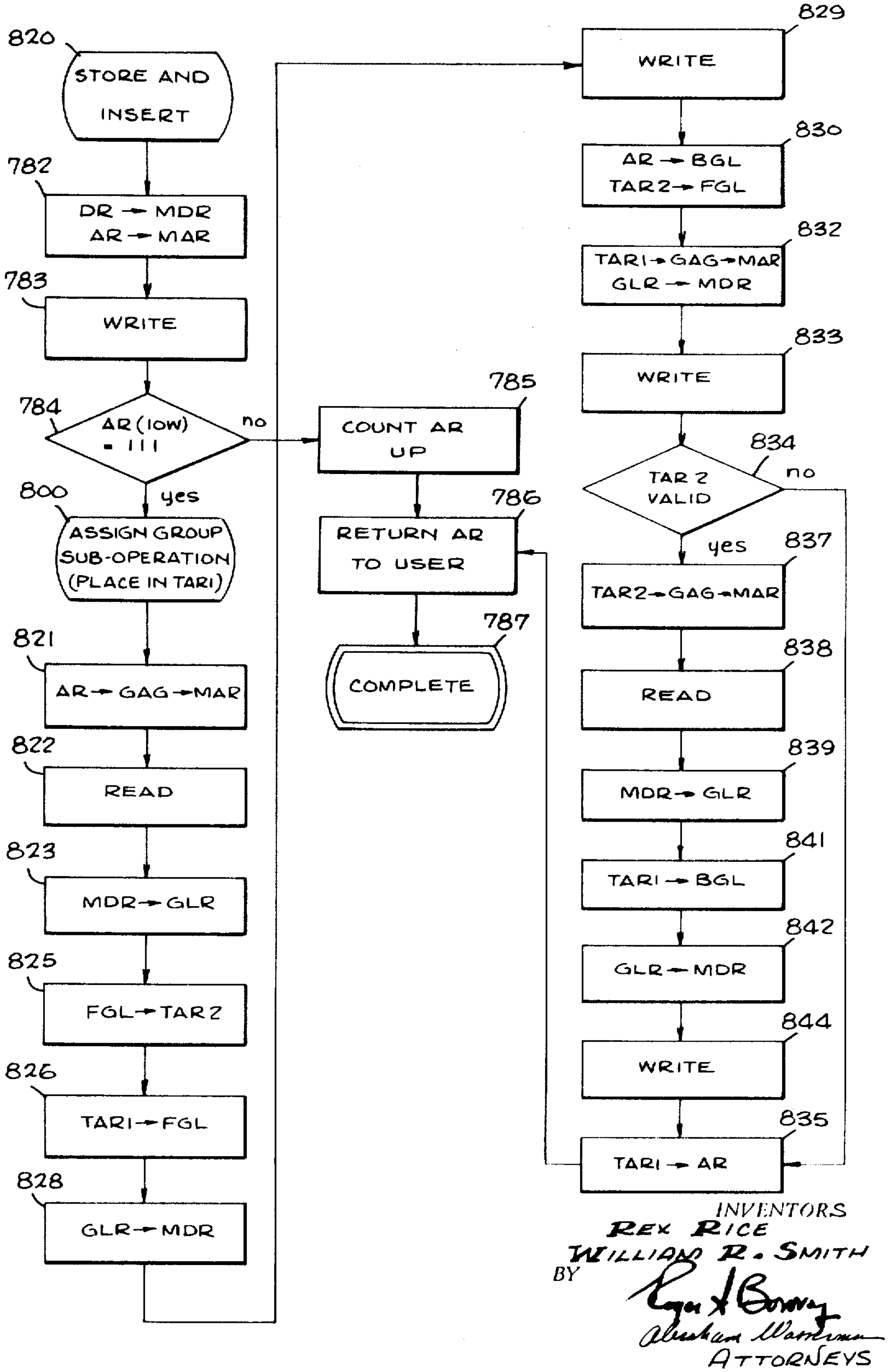
FIG. 37 is a flow chart of the Store and Insert operation.

Next, the sequence of steps which are necessary to perform the Store and Insert operation will be described in conjunction with FIG. 37. Since this operation is very similar to the Store and Assign operation just described in conjunction with FIG. 36, analogous steps will therefore be designated by blocks of like numerals. Briefly, in the Store and Insert operation, the word received from the user is first stored in the address provided by the user, and the address of a succeeding word is returned to the user if the address received therefrom does not represent the last or eighth word of a group.

If, however, the address does represent the eighth word of a group, as indicated by a 111 state of the three lowest order bits of the AR, it is first necessary to go through the Assign Group suboperation and find an available group for assignment, whose address is then stored in the TAR1. Thereafter, it is necessary to properly modify the content of the GL words associated with the addressed group and a following group in the old string of groups, if the addressed group was not the last in the string, as well as the content of the GL word of the newly assigned group in order to place the latter in the proper sequence in the string of groups. These functions have been previously described in conjunction with FIG. 18. However, in FIG. 37, they will be described as a sequence of steps.

Referring again to FIG. 37, therein block 820 designated a command to perform a Store and Insert operation, in which the steps represented by block 782 and 783 are performed to perform the Store portion. The steps in blocks 784 through 787 are performed if the address received from the user is other than the last or eighth word of a group. If, however, it is the last word, an Assign Group suboperation, represented by block 800, is performed.

At the end of this suboperation, the address of the assigned group is in TAR1. In FIG. 18 this group is designated G*xx*. In order to best explain the flow chart of FIG. 37, reference will be made hereafter to the various words and addresses shown in FIG. 18. Thereafter, the GL word associated with the addressed group which in FIG. 18 is represented by GL*ib*, is retrieved and stored in GLR. This is performed by the steps represented in FIG. 37 by blocks 821–823. Thereafter, the content of the FGL field in GLR, which in FIG. 18, is represented by the *jc*, is transferred and temporarily stored in a corresponding field in TAR2 (block 825). The content *xx* of TAR1, representing the address of the newly assigned group G*xx* is then transferred and stored in the FGL field of GLR (block 826), a step analogous to inserting the address *xx* of the newly assigned group in the FGL field of GL*ib*. Then, the content of GLR, representing GL*ib* is restored in memory (blocks 828 and 829).

Thereafter, the content of AR (*ib* in FIG. 18), representing the address of the addressed group, is stored in the BGL field in the GLR, a step, analogous to inserting the address *ib* therein, followed by the insertion of the content of TAR2, representing the address *jc*, saved by the step represented by block 825 in the GLR (block 830). Thus, at this point in the operation, the GLR contains the two addresses, required for the GL*xx* word of the newly assigned group G*xx*. Thereafter, the content of GLR is stored in memory at the address location of the GL word associated with the newly assigned group G*xx*, whose address is located in TAR1. This is performed by the steps represented by blocks 832 and 833.

It should be pointed out that if the addressed group, which in the example in connection with FIG. 18 is assumed to be G*ib*, were the last group in a string of groups, the initial content of its FGL field of its GL word, transferred to TAR2 in the step represented by block 825 would be zero. Consequently, it would only be necessary to link group G*xx* to group G*ib*, without producing the linking between group G*xx* and a following group, such as G*jc*. After the step represented by block 833 is completed, the content of TAR2 is interrogated. If it is invalid, thereby indicating that group G*ib* is the last group in the initial string, the sequence proceeds to transfer the content of TAR1, representing the address *xx* of the newly assigned group G*xx* and, more particularly, the first word thereof to AR (block 835), followed by the steps represented by blocks 786 and 787. If, however, TAR2 is valid, thereby indicating that group G*ib* is followed by a succeeding group, such as G*jc*, the GL word, GL*jc* has to be retrieved in order to properly link it backwardly to the newly assigned and inserted group G*xx*. Consequently, it is necessary to first retrieve the word, GL*jc* associated with the group whose address is located in TAR2 and store it in GLR. This is performed by the steps designated by blocks 837–839.

Thereafter, the content *xx* of TAR1, representing the address of the newly assigned group, is inserted in the BGL field in GLR (block 841), thereby inserting *xx* in the BGL field of GLR. Then, the content of GLR is transferred to MDR (block 842) and a Write operation is performed (blocks 844) restoring GL*jc* in memory. After the Write operation, the sequence proceeds to perform the steps, represented by blocks 835, 786 and 787.

FETCH ONLY

The performance of the Fetch Only operation is accomplished by a sequence of steps which are very analogous and nearly identical with the sequence shown in FIG. 35, in which the Store Only operation sequence is outlined. The only difference, however, is that in the Fetch Only operation, the user only supplies an address to AR which is then transferred to the MAR (see block 771 in FIG. 35). This is followed by a Read, rather than a Write operation (see block 772) during which the word located at the address, held in the MAR, is read out. Then, a step is added during which the content of the MDR is transferred to the DR (not shown) for subsequent supply to the user, via bus 100 (see FIG. 13).

FETCH AND FOLLOW (FIGURE 38)

Figure 38:
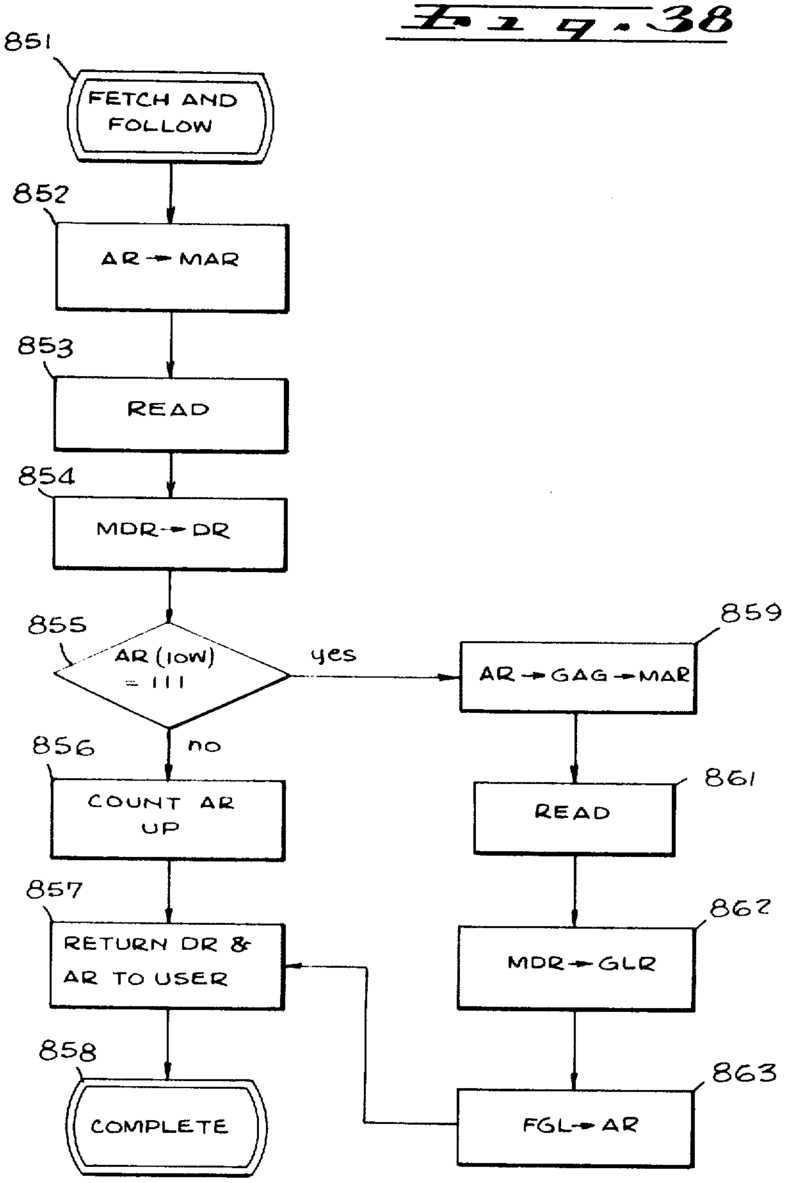
FIG. 38 is a flow chart of the Fetch and Follow operation.

The Fetch and Follow operation is performed by a sequence of steps outlined in FIG. 38, to which reference is made herein. The start of the operation, which is designated by block 851, first involves the fetching or retrieving of a word, whose address is supplied by the user to the AR. Then, the operation continues to provide the user with the address of a next word in the same group, if the address received from the user is not the address of the last eighth word of a group.

The fetching of the word from the location whose address is supplied by the user is performed by the steps shown in blocks 852–854, while the determination of whether the received address represents the address of a last word in a group or not is performed by the step designated by block 855. If the address is not one of a last word of a group, i.e., the three lowest order bits in the AR are not 111, the count in the AR is incremented by one (block 856). Thereafter, the content of DR, representing the fetched word, and the content of AR, representing the address of a following word, are supplied to the user (block 857), before a Complete operation signal (block 858) is provided.

If, however, the address received from the user represents the last word of a group (block 855), the group address, located in the AR, is used to actuate the GAG 85 to store the address of the GL word, associated with the addressed group in the MAR (block 859). This GL word is read out (block 861) and temporarily stored in GLR (block 862). The FGL field in GLR, representing the address of a succeeding or following group, is then transferred to AR (block 863) by the step represented by block 857 for supply to the user. If the FGL field is all zero it indicates to the user that the address received therefrom represented the address of a last word of the last group in a string.

FOLLOW AND FETCH (FIG. 39)

The follow and Fetch operation, the steps of which will be described in conjunction with FIG. 39 to which reference is made herein, is similar to the Fetch and Follow operation just described, except that in the former, the word which is fetched is not the one located at the address supplied by the user, but rather the word located at an address following the address which is supplied by the user. As seen from FIG. 39, wherein block 871 represents the start of the Follow and Fetch operation, the three lowest order bits of the address, supplied by the user and held in the AR, are interrogated (block 872). If they are not in an all-one state (111), thereby indicating that the received address is not that of the last word in a group, the count of AR is incremented by one (block 873) and the new address is then supplied to MAR (block 874).

This is followed by a Read operation (block 875) which results in the storing of the word whose address is in the MAR in MDR. The sequence continues to perform the step (block 877) in which the content of MDR is transferred to the DR. At this point, the DR contains the desired fetched word, while the AR contains its address, which is greater by one than the address, initially received from the user. The contents of both registers (DR and AR are then returned to the user (block 878) and a Complete operation signal is produced (block 879). If, however, when interrogating the three lowest order bits in the AR (see block 872), the three bits are in an all-one state (111), thereby indicating that the address received from the user represents the last word in a group, the address in the AR is then supplied to GAG 85 to generate the address of the GL word associated with the addressed group to store it in MAR (block 881). Thereafter, a Read operation is performed (block 882) and the GL word, which is entered during the Read operation in the MDR, is transferred to GLR (block 883). The FGL field, representing the address of a group, following the addressed group, is then transferred to the AR (block 884). The sequence proceeds to perform the step 874 and all the succeeding steps, just described.

FETCH AND REVERSE FOLLOW

REVERSE FOLLOW AND FETCH

The last two operations to be described include the Fetch and Reverse Follow and Reverse Follow and Fetch. These two are very similar to the Fetch and Follow and Follow and Fetch operations, respectively, just described in conjunction with FIGS. 38 and 39. As should be appreciated from the description in conjunction with FIG. 38, in the Fetch and Follow operation, the word whose address is supplied by the user is fetched and the address supplied to the user represents the address of a following word either in the same group or in a following forwardly linked group. In the Fetch and Reverse Follow, although the Fetch portion of the operation is the same, the address which is supplied to the user is one of a preceding word in a group or of the last word in a preceding or backwardly linked group.

In the Fetch and Reverse Follow, in the step designated in FIG. 38 by block 855, instead of interrogating the three lowest order bits for an all-one state (111), the interrogation is performed to determine whether the bits are in an all-zero state (000), which represents the first word in a group. If they are not in an all-zero state, thereby indicating that the address received from the user is not that of a first word in a group, the sequence continues to step 856. However, instead of incrementing the AR by one, it is decremented by one, so that the address supplied to the user represents that of a preceding word.

If, however, in interrogating the three lowest order bits (block 855) they are found to be in an all-zero state (000), the GL word associated with the addressed group is retrieved (blocks 859–862). But, instead of supplying the AR (see block 863, FIG. 38) with the FGL field content of the GLR, the content of the BGL field representing the address of a preceding group is supplied thereto. This enables the retrieval of a preceding group in the string.

Figure 39:
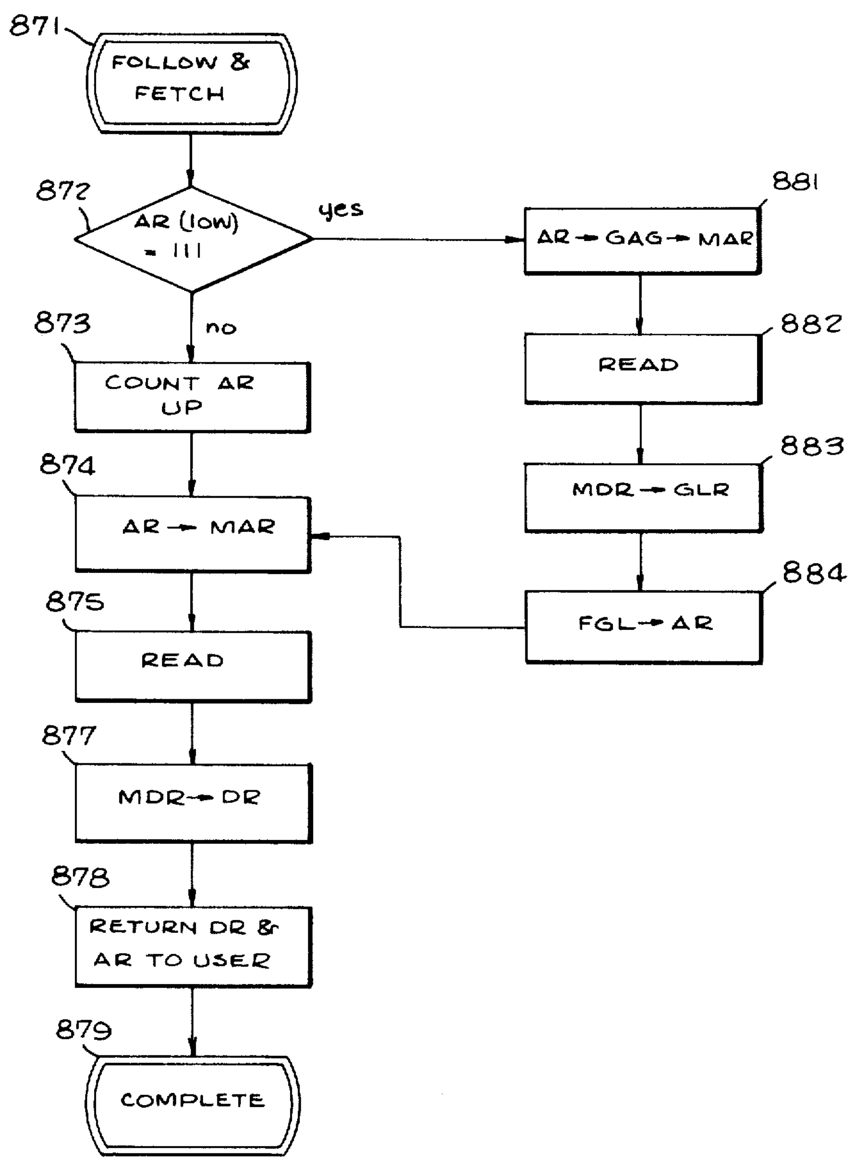
FIG. 39 is a flow chart of the Follow and Fetch operation.

Similarly, in the sequence required to perform the Reverse Follow and Fetch operation, which is very similar to the sequence shown in FIG. 39, instead of interrogating the three lowest order bits for an all-one state (111), as is done in the Follow and Fetch operation (block 872), the three bits are interrogated for an all-zero state (000). If they are not all zero in the step designated by block 873, the content of the AR is decremented by one and a word of an address, preceding the address supplied by the user, is read out. If, however, the three lowest order bits are in an all-zero state (000), the GL word associated with the addressed group is read out (blocks 881–883). However, instead of storing in the AR the content of the FGL field (see block 884), the BGL field content is entered in the AR.

The foregoing description completes the description of the various sequences of steps necessary to perform the various coded operation listed in the foregoing Table 2. Any one of these operations may be requested by a user by properly providing the desired operation's code, via bus 68 (FIG. 13), to the operation code register OCR. Preferably, the requesting user also supplies its number via bus 110, for storage in the user number register UNR. The number is required only if the operation involves the retrieval of the requesting user's PLC word, in which case the user's number, after proper decoding, is used to actuate PLC address generator 70 to provide the address of the requesting user's PLC word. As seen from FIG. 13, the operation code, received from a user and held in the OCR, is decoded in decoder 66 whose output, representing an operation start signal, is supplied to the control unit 65. The latter, depending on the operation start signal supplied thereto, i.e., depending on the requested operation, controls the sequence of steps, performed by the memory control system as hereinbefore explained.

It should again be pointed out, that although some operations require a relatively large number of steps, these are always performed in sequence. Each step in the sequence, however, is relatively very simple and is one of the various types, well known by those familiar with the operation of computers and other data processors. The steps include those in which the content of one or more fields of a register are transferred to one or more corresponding fields in another register, as well as those involving Read or Write operations which are basic to the retrieval and storing of information in a memory matrix. As hereinbefore indicated, such steps are represented by the rectangularly shaped blocks. In addition, some of the steps involve the interrogation of the binary states of several bits, such as the three lowest order bits of the AR to determine their states, the result of which determines which branch of the sequence is followed. Other steps, represented by the diamond-shaped blocks, involve the interrogation of active bits to determine the validity of the content of fields associated therewith. The interrogation of the states of several bits, as well as the interrogation to determine the validity or state of a single bit, are basic in the computer art. They are well known by those familiar with it, and therefore they will not be described hereafter in any further detail.

The foregoing description of the novel memory control system of the present invention may best be summarized by again referring to FIG. 13. Basically, the function of the memory control system is to control the communication between any one of a plurality of users and the memory matrix 30, which together with the memory address register, MAR, the memory data register, MDR, and the address decoder 32, form a conventional random-access memory, or RAM. The matrix 30 may comprise a conventional core matrix, a conventional LSI semiconductor-type matrix, or any other known means and techniques for storing a plurality of multibit words. As is appreciated by those familiar with the art, in a conventional RAM, A standard memory sequencing control unit is included, which is used to provide a capability of accessing any location or address in the matrix, defined by the content of the MAR to store data held in the MDR in such a location, or to retrieve data therefrom, by supplying it to the MDR.

In the foregoing example, the memory matrix of the RAM is organized in the form of a plurality of pages (such as *n*), each page comprising a plurality of data-storing groups (28), each group including a plurality of words (8). Each page also includes one or more page control words (PHA and PHB) and a separate group link (GL) word for each group. The memory also includes a system control word (SAS) and a user control word (PLC) for each user which may be located in special purpose pages. The memory control system includes a plurality of generators which are designed to dynamically generate at clock cycle speed a complete or a portion of an address of one of the control words for their retrieval from memory or for restoring them therein. The memory control system also includes a plurality of registers (such as the working registers, and TAR1 and TAR2) and a master control unit which is used to control the performance of any one of a plurality of operations, commanded by any of the users. These operations may involve the dynamic assignment of memory space to a user, the dynamic deletion of space no longer needed by a user, the reassignment of space and the reclamation of space.

As should be apparent from the foregoing examples the memory control system is operable to assign a group to a user from a page previously assigned thereto if space is available therein. All pages assigned to a user are assumed to form a page list. If group space is not available in any of the pages assigned to a user, a new page may be assigned thereto if one is available as determined by the content of the SAS word. Groups in pages, assigned to the same user, may be strung together to form group strings. A new group may be inserted after any group in a string. Pages assigned to a user may be deleted and returned to the system for subsequent page reassignment to users needing more pages, while group strings or portions thereof may be deleted by any user for subsequent reclamation by it.

By employing such a memory organization, the memory control system is capable of assigning memory space to any of the users as the need arises during program execution. Thus, it is not necessary to preassign memory space. Also, by using such a technique, any user has access to any portion of the memory matrix which is not assigned or used by another user. Also, such a technique enables the dynamic reclamation of space, such as deleted pages which are no longer needed by a user, for future use by any of the users. All of these advantages are realizable with the novel memory control system of the present invention which includes the various generators needed to practice the addressing techniques herebefore described in conjunction with FIGS. *4b–4f*.

Another unique feature of the present invention includes the capability to respond to an operation code received from a user, in order to store data received therefrom in an assigned address and provide the user with an interconnected or related address in which subsequent data may be stored. This capability is provided by the execution of either the Store and Assign or Store and Insert operations. Thus, the address supplied to the user may be used to store a succeeding data word. The address may also be used to retrieve the previously stored word by merely executing the Follow and Fetch operation. As a result, the memory control system allows both efficient assignment of memory space and efficient later reaccess with a direct address to the stored data itself. Such a combination tends to provide maximum memory efficiency and flexibility of operation.

The ability to automatically and dynamically assign space as the need arises, as well as the ability to automatically reclaim space assigned to a user for subsequent use thereby, or to reclaim all the space previously assigned to a user and return it to the system for subsequent use by any of the users are most advantageous. The hardware arrangement of the memory system providing such capabilities is unique. The uniqueness is clearly apparent when considering prior art memory control techniques in which stored program methods are employed. In such methods instructions have to be accessed, either from the main memory matrix or from read-only or other auxiliary memory units, in order to know what to do next for a previously assigned memory space or how to reclaim space, and where such reclaimed space should be assigned.

As previously explained, in accordance with the teachings of the present invention, the memory control system is capable of automatically reclaiming groups which have been deleted by a user for subsequent use by the same user. The deletion of groups as a complete string or a part thereof have been explained in conjunction with FIGS. 20, 33 and 34. In essence, the reclamation is achieved by first successively determining the page to which each of the various deleted groups belongs, and thereafter modifying the PHB word of each page to indicate the availability of the reclaimed group for assignment therein.

Group reclamation need not be performed in response to a specific command by a user. It may, for example, be performed immediately after a Delete String command is received from a user, if sufficient time is available, or during memory idle time, when the memory is not used by any of the users. For explanatory purposes, let it be assumed that during such idle time the system itself provides a Space Reclamation List, SRL signal for each user, such as user No. 1, in order to initiate the reclamation of all previously deleted groups by transferring them to their respective pages for reassignment.

Figure 40:
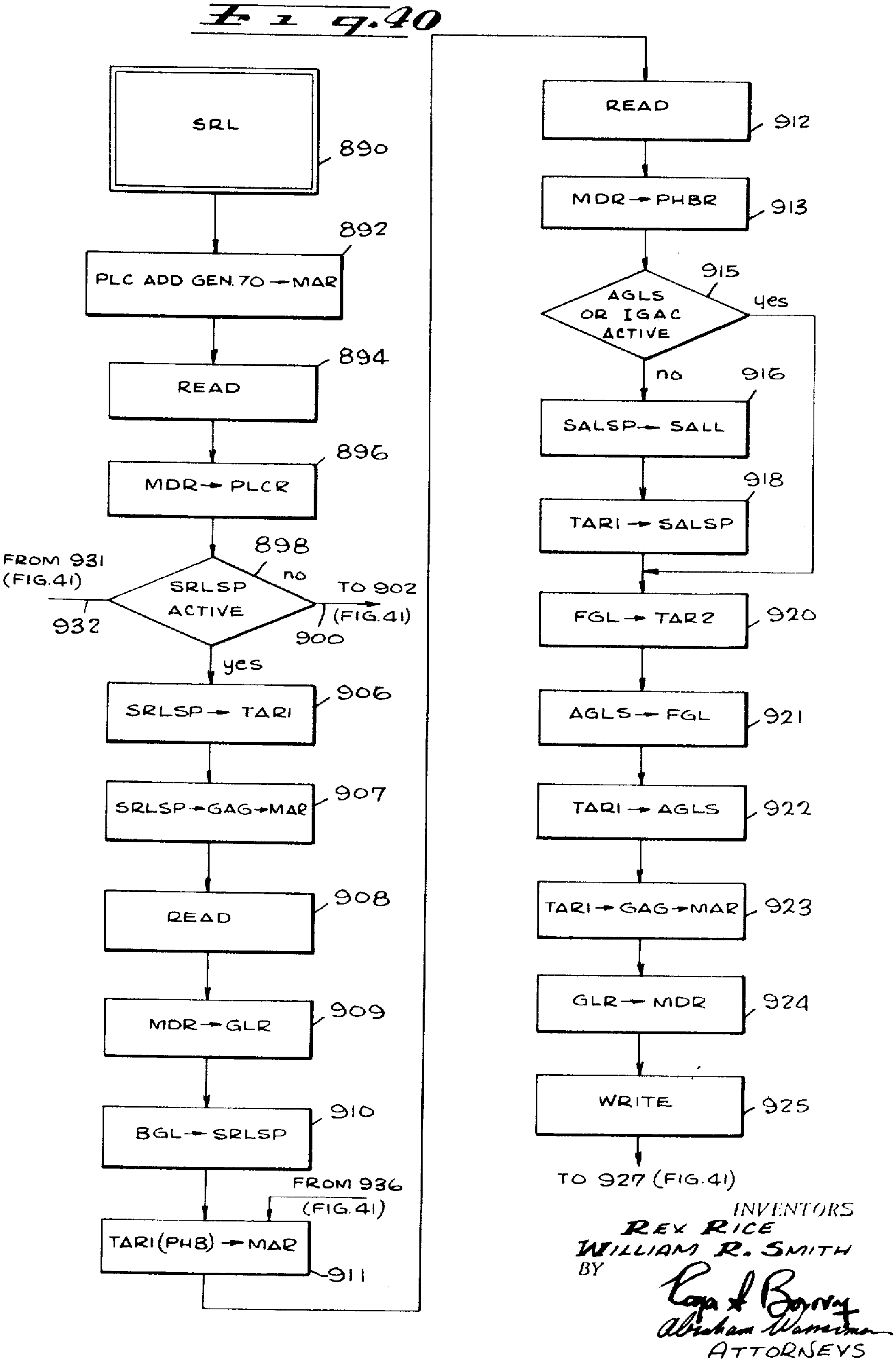
FIGS. 40 and 41 are flow charts of an Automatic Group Reclamation operation.
Figure 41:
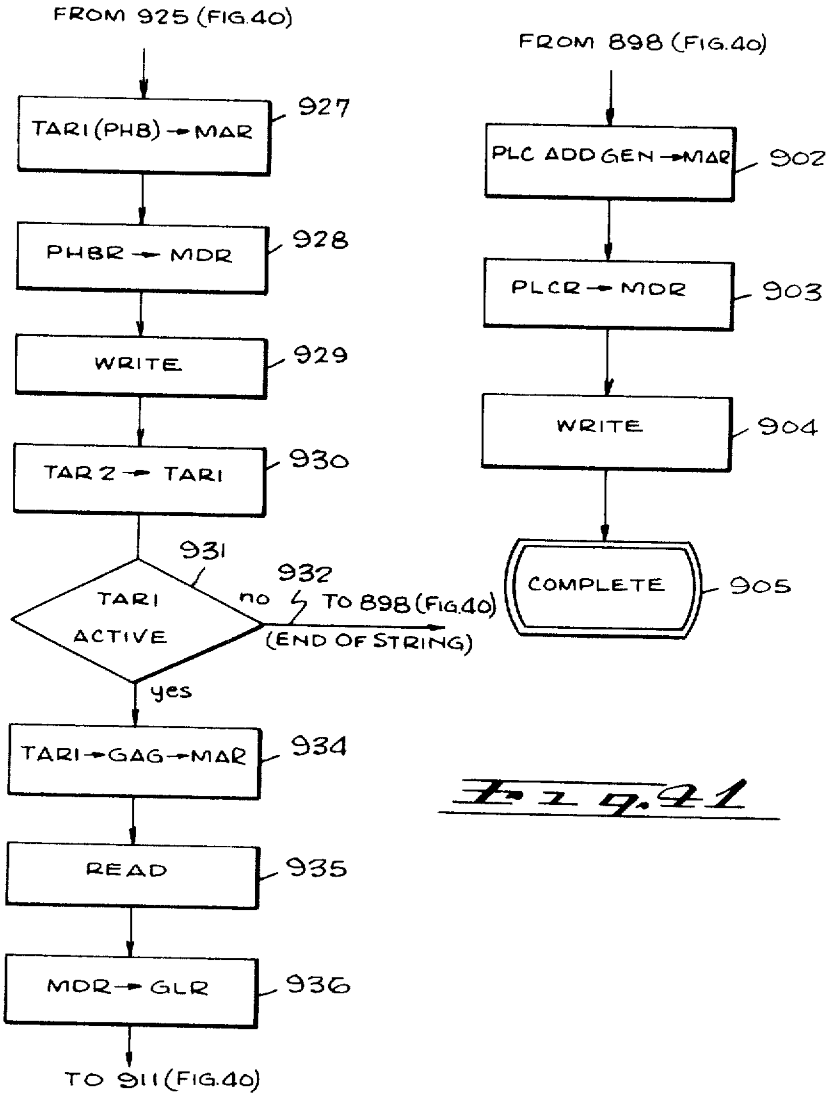

Reference is now made to FIGS. 40 and 41 which are flow charts, useful in explaining the sequence of steps performed by the memory control system during the reclamation of groups of a specific user. Therein block 890 represents the presence or existence of a SRL signal for one of the users. To indicate that the SRL signal is not necessarily a command signal from a user, block 930 is shown as a double-line rectangular block, rather than as a double-line oval-shaped block which, herebefore, has been used to designate a coded command signal from a user, used to initiate the performance of an operation.

When the SRL signal is sensed, the address of the user's PLC word is generated by generator 70 (see FIG. 13) and is supplied to the MAR, a step represented by block 892. Thereafter, a Read operation is performed (block 894) and the user's PLC word, which at the end of the Read operation is in the MDR, is transferred to the PLCR of the Working Registers (block 896). Then, the SRLSP field in the PLCR is interrogated to determine whether it is active. It is active only if previously the user deleted at least one string of groups or a portion of a string of groups. This interrogation is represented by block 898.

If the field is not active (line 900), it indicates that none of the strings of groups of the user or any portion of a string has been previously deleted. Consequently, there are no groups to be reclaimed. In such a case, the sequence of steps proceeds to return the PLC word of the particular user, which is now stored in the PLCR to memory. This is accomplished by sequentially performing the three steps represented by blocks 902–904, shown in FIG. 41. Once the PLC is rewritten in memory, the reclamation, if any, of groups of the particular use is completed, as represented by block 905.

If, however, in interrogating the SRLSP field (see block 898 in FIG. 40), the field is active, the last deleted string or string portion, such as string S3 in FIG. 20, as represented by the address of the top group *b*, stored in the SRLSP field, is removed. This is accomplished by the steps designated by blocks 906–910. Briefly, the SRLSP content (*b* in the example of FIG. 20) in PLCR is transferred to TAR1. This content represents the address of the top group (*b*) in the last deleted string (S3) or string portion. This address is also used together with the GAG 85 (see FIG. 13) to generate the address of the GL word (GL*b*) associated with the top group (*b*) in the last deleted string (S3) and store it in the MAR (block 907). Thereafter, the Read operation is performed (block 908) and its content, after being transferred during the Read operation to the MDR, is then transferred to the GLR (block 909).

The function of reading out the GL word of the top group of the string just removed is to determine whether an address, such as *c*, is located in the BGL field thereof. Such an address would represent the address of a top group (*c*) of a string (S2) deleted prior to the deletion of the string (S3) just removed from the SRLSP field. Thus, the removal of a string from the SRLSP field is only completed after the BGL field content (*c*) is stored in the SRLSP (block 910).

Once a string (such as S3) is removed from the SRLSP field, it is necessary to sequentially address the pages of the groups (such as *b* and *d*) in the string and sequentially modify their PHB words to indicate the addition or availability of the reclaimed groups therein. As to the string removed from the SRLSP field, the group address stored in TAR1, representing the address of the top group of the removed string, is used to actuate the PHB generator 80 (see FIG. 13) in order to store the address of the PHB word of the page of the top group (*b*) in the MAR (block 911). Thereafter, the PHB word is retrieved from memory and stored in PHBR (blocks 912 and 913).

Then, the AGLS and the IGAC fields of the PHB word are interrogated. If neither one of them is active, thereby representing that at this point in the operation, the page is assumed to be full, having no group space available, since the top group which is being reclaimed would represent available group space, it is necessary to modify the SALSP field of the user's PLC word and store the content of SALSP in the SALL field of the PHB word. This is accomplished by transferring the content of the SALSP field to SALL (block 916) and, thereafter, transferring the page address in TAR1 (block 918) to the SALSP field. It should be pointed out that if either of fields AGLS or IGAC is active (block 915), thereby indicating that the page of the group being reclaimed has at least one other available group for assignment, the steps represented by blocks 916 and 918 are omitted.

After performing the step represented by block 918, or after the step represented by block 915, in case either of the fields is active, it is necessary to link the reclaimed group in the page to any other available groups therein, if any. This process is in essence the reverse of the assignment of a group from a page, previously described in conjunction with FIGS. **15*a* and 15*b*. This is accomplished by the steps represented by blocks 920–925. First, the FGL field is transferred to TAR2 (block 920) and, thereafter, the AGLS is transferred to the FGL portion of the GL register, GLR, block 921. Thus, the address of the previous top group in the page which was available for assignment is now stored in the FGL field of the GL word of the newly reclaimed group of the page. Then, the content of TAR1, representing the address of the group being reclaimed, is transferred to the AGLS (block 922). In the next three steps, the GL word associated with the newly reclaimed group, is rewritten into memory, by utilizing the address stored in TAR1, which represents the reclaimed group address, to generate the GL word address, and thereafter, transferring the content of GLR to MDR, (block 924) followed by a Write step (block 925**).

After the GL word associated with the reclaimed group is restored in memory, the PHB word of the page of the reclaimed group is also restored in memory, an operation performed by the steps represented by blocks 927–929 in FIG. 41. The content of TAR2 is then transferred to TAR1 (block 930), and a determination is made whether TAR1 is active (block 931). TAR1 is active only if the previously reclaimed group was not the last one of a string. If it was the last one of a string, as represented by line 932, the sequence of steps proceeds to perform step 998. That is, SRLSP is interrogated to determine whether there is another group of strings which should be reclaimed.

If, however, TAR1 is active (block 931, FIG. 41), which, as just stated, indicates that the previously reclaimed group was not the last one of a string, the address in TAR1, representing the address of a succeeding group (such as group *d* in S3 of FIG. 20) to be reclaimed, is then utilized to generate the address of the GL word of the succeeding group (block 934). The last step is then followed in sequence by two steps (blocks 935 and 936) in which the GL word, associated with the next group to be reclaimed, is read out from memory and stored in the GLR. Therefrom, the sequence proceeds to perform the step represented by block 911 and those succeeding it.

It should be pointed out, that after the last group to be reclaimed is actually reclaimed, TAR1 (see block 931) is inactive, causing the sequence to proceed to block 898 in which the SRLSP field is interrogated. After the last group is reclaimed, this field, i.e., SRLSP is inactive. Consequently, the sequence proceeds (via line 900) to perform steps 902 through 905 (see FIG. 41) to restore the user's PLC word in memory, and thereby terminate the automatic group reclamation for the particular user.

From the foregoing, it should thus be appreciated that the sequence of steps described in conjunction with FIGS. 40 and 41 enables the reclamation of any group, previously assigned to a user and thereafter deleted thereby, as part of a complete deleted string or portion thereof. The reclamation of the groups is accomplished by reassigning each group to its respective page and making the group available for subsequent assignment. It should be pointed out, however, that whereas in the reassignment of previously deleted pages as part of a page list, a page may be reassigned to any of the users, in reclaiming groups, they are transferred back to their respective pages for use only by the user to which these pages are assigned.

From the foregoing, it should thus be appreciated, that each of the coded operations which may be requested by a user, or the group reclamation operation, is performed as a sequence of steps, herebefore described in conjunction with the various flow charts. The sequence of steps necessary to perform each operation is assumed to be controlled by controlling signals from the operation-sequencing control unit 65 (see FIG. 13). As previously stated, unit 65 is assumed to include all the required logic circuitry, which is necessary to control the step sequences. Control unit 65 is assumed to comprise a plurality of control units, each one of which includes different circuit arrangement required to control a different one of the operations. The operations include those which may be commanded by a user or the group reclamation operation, which as heretofore assumed, takes place automatically during idle time, rather than under user command.

It should be appreciated that in light of the foregoing described teachings, those familiar with the art may make modifications in the teachings, herebefore disclosed, without departing from the true spirit of the invention. For example, the page sizes, the number of groups per page and the group sizes may be made to vary by dynamic hardware control as operation progresses. Also, the memory matrix may be organized to include pages of different sizes. The operations which can be commanded by a user may include a specific Assign Page operation, rather, than as hereinbefore described, where the Assign Page is a suboperation (see FIG. 24), which may have to be performed only as part of an Assign Group operation. The operations may include an operation to delete a portion of a page list analogous to the Delete to End of String operation. A user may command a page of a desired length to be assigned thereto, with the page length being related to the expected number of groups which may be required. Also, if desired, each group may include more or less than eight words, herebefore assumed to be included in each group. It should be stressed again that the sizes of the pages, the number of groups per page and the number of words per group, previously referred to, have been presented for explanatory purposes, rather than to limit the teachings taught herein. Also, as herebefore explained in conjunction with FIG. 3, the various control words need not be stored in the same memory matrix in which data words are stored.

Another modification, which may be made in the foregoing teachings, without departing from the spirit of the invention, may involve the manner of adding a page to a page list. Herebefore it has been assumed that a page, when assigned to a user, is added to the top of the page list. The sequence of steps and the logic circuitry necessary to control the page addition sequence may be modified so that any newly assigned page is inserted at the bottom of the page list. Also, instead of being formed as open loops (see FIGS. 6 and 7) by means of their page header words, each page list may be arranged as a closed loop in which a page header word of each page in the list contains an address of another page in the list, and the linkage of the page list to the PLC word of the user may be to any of the pages, rather than to either the top or bottom page in the list.

Furthermore, in such a closed loop page list system, a newly assigned page may be added after any desired page in the list in a manner similar and analogous to the insertion of a group in response to an Insert Group commanded operation, in which a group is inserted after a group whose address is specifically designated by a user. Also, if desired, pages in a list may be linked to each other in forward and backward directions, similar to the linkings of groups in a string.

Figure 42:
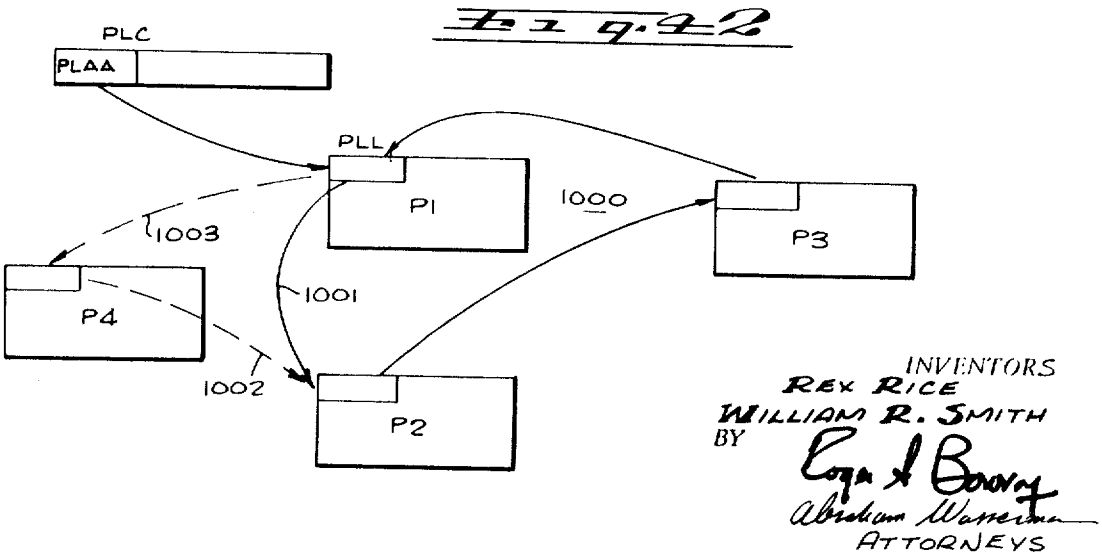
FIG. 42 is a simplified multipage format diagram of a closed loop Page List.

A simple example of a closed loop page list is diagrammed in FIG. 42 wherein a list comprising three pages P1, P2 and P3 is designated by reference numeral 1000. The PLC word of the user to which list 1000 is assigned is also shown therein. In such a closed loop page list, the PLL fields of the PHA word of pages P1, P2 and P3 are assumed to store the addresses of pages P2, P3 and P1, respectively. Also, the address of P1 is assumed to be stored in a field, PLAA in the PLC word, where PLAA is assumed to replace the field PLSVA, herebefore explained.

In such a system, a page P4 may be added to the list after any of three pages, for example, after page P1 and before P2. This is easily accomplished by storing the address which is in the PLL field of P1, representing the address of P2, which in FIG. 42 is designated by line 1001, in the PLL field of the newly added or inserted page P4. This insertion is represented in FIG. 42 by line 1002. Thereafter, the address of P4 is stored in the PLL field of P1, a linkage represented in FIG. 42 by line 1003. When the last-mentioned step is completed, the closed loop page list 1000 consists of pages P1, P4 and P2 and P3.

The modifications herebefore enumerated are clearly not the only ones which could be made without departing from the true spirit of the invention, which comprises the novel memory control system capable of controlling the communication between a plurality of users and a memory. The memory control system controls the storing and retrieval of data from the memory, the dynamic assignment of memory space to a user during program execution at clock cycle speed, the dynamic deletion of space no longer needed by a user, as well as the automatic reclamation of space. The capability of the memory control system to operate as herebefore described is realized by including hardware therein in the form of a plurality of generators, designed to generate at clock cycle speed the addresses of various control words which are used in the dynamic assignment, deletion and reclamation of memory space.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A method for dynamically locating memory storage locations, comprising:

receiving a unit of data of a sequence of such units from a user;

assigning a storage location to said unit of data in a computer memory;

associating a group link word to said unit of data, said group link word containing information denoting the locations in the memory of the previous and subsequent data units in said sequence of data units;

referring to one of said group link words to ascertain the location of one of said units in said sequence of data units; and finding said one of said sequence of data units and using it to locate one or more additional units of data in said sequence of units of data.

2. The method of claim 1 further characterized by the assignment of a storage location into said unit of data being carried out by referring to a system control word whose content is indicative of the availability of locations in said memory for said user.

3. The method of claim 1 further characterized by the additional step of ascertaining the locations previously assigned to said user and the availability of previously assigned locations for use by said user by means of reference to a list control word also assigned to said user.

4. The method of claim 1 further characterized by the assignment of a storage location to said unit of data in the computer memory being within a plurality of user storage pages assigned to said user, each page having a page header word which includes a page list link portion denoting the location of a different related page assigned to the same user, said related page also having a page header word including a page list link portion denoting another different related page assigned to the same user, said page and all said related pages thereby defining a list of pages assigned to the same user.

5. The method of claim 4 further characterized by said user storage pages including a plurality of groups of locations for storing data words and a location for storing said page header and the content of a part of said page header word being indicative of groups of locations available for storing data from the user to which the page is assigned.

* * * * *